United States Patent
Suzuki et al.

(10) Patent No.: US 10,372,267 B2
(45) Date of Patent: Aug. 6, 2019

(54) FORCE DETECTION APPARATUS

(71) Applicant: Japan Display Inc., Tokyo (JP)

(72) Inventors: Takafumi Suzuki, Tokyo (JP); Shota Hosaka, Tokyo (JP); Koji Noguchi, Tokyo (JP); Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/661,248

(22) Filed: Jul. 27, 2017

(65) Prior Publication Data

US 2018/0032209 A1    Feb. 1, 2018

(30) Foreign Application Priority Data

Jul. 29, 2016    (JP) .................. 2016-150606

(51) Int. Cl.
*G01L 1/14* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0414* (2013.01); *G06F 3/0416* (2013.01); *G01L 1/14* (2013.01); *G06F 2203/04108* (2013.01)

(58) Field of Classification Search
CPC .... G06F 3/0418; G06F 3/0414; G06F 3/0416; G06F 3/044; G06F 2203/04108; G01L 1/14
See application file for complete search history.

(56) References Cited

U.S. PATENT DOCUMENTS

| 2014/0218317 A1* | 8/2014 | Aberg | G06F 3/0488 345/173 |
| 2015/0002447 A1* | 1/2015 | Schediwy | G06F 1/1692 345/174 |
| 2016/0202800 A1* | 7/2016 | Itaya | G06F 3/044 345/174 |
| 2016/0320914 A1 | 11/2016 | Tachikawa et al. | |

FOREIGN PATENT DOCUMENTS

JP    2015-127657 A    7/2015

* cited by examiner

*Primary Examiner* — Brent D Castiaux
(74) *Attorney, Agent, or Firm* — K&L Gates LLP

(57) ABSTRACT

A force detection apparatus includes: a force detector that includes an electrode and a conductor facing the electrode across a first and a second layers and outputs a force signal value before correction; and a force detection controller outputting a force signal value after correction having a linear relationship with a force. In a first range of force in which the first layer is deformed and the second layer is not deformed, the force detection controller calculates the force signal value after correction, based on a product of the force and a first constant. In a second range of force in which the first and second layers are deformed, the force detection controller calculates the force signal value after correction, based on a sum of a product of a threshold and the first constant and a product of a difference between the force and the threshold and a second constant.

4 Claims, 38 Drawing Sheets

| CAPACITANCE | FORCE SIGNAL VALUE |
|---|---|
| ○○○ | ××× |
| △△△ | □□□ |
| ⋮ | ⋮ |

52a1

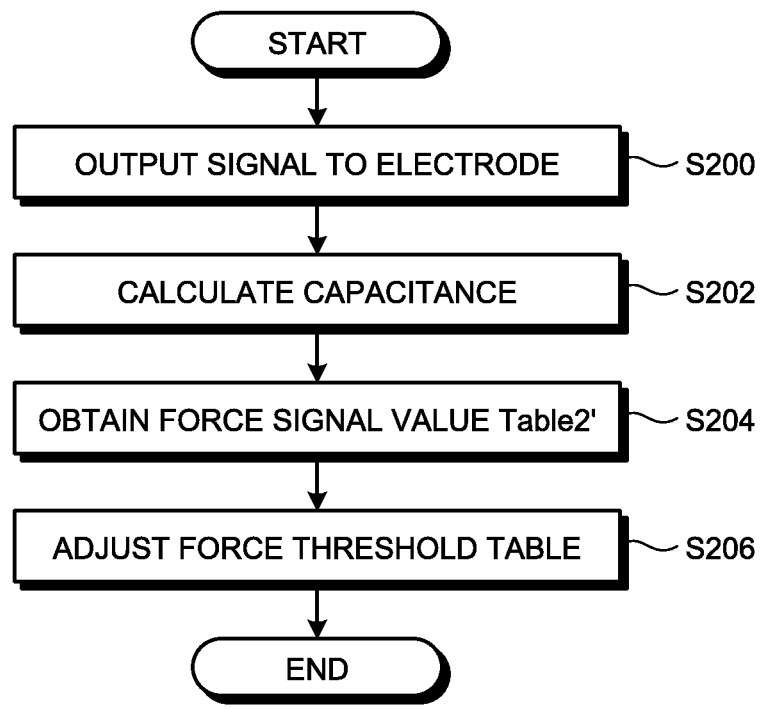
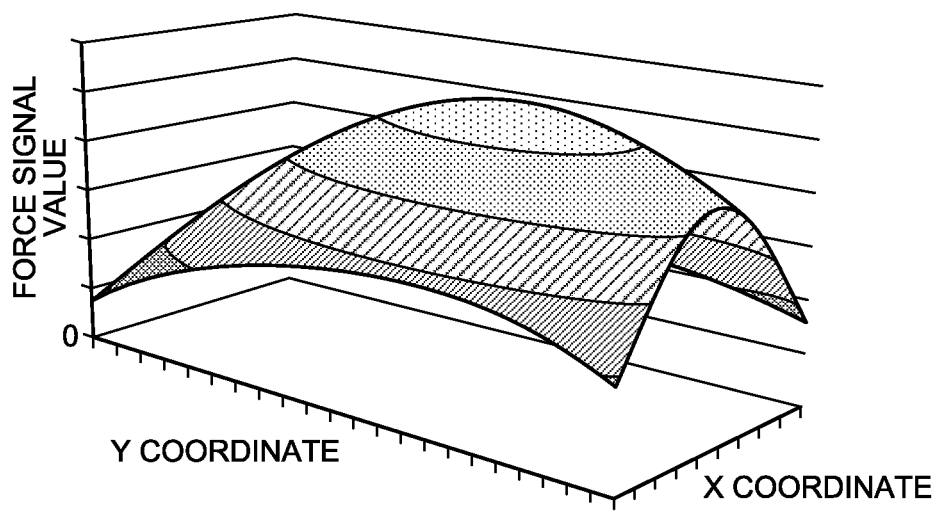

FORCE DETECTION APPARATUS

CROSS-REFERENCE TO RELATED APPLICATIONS

This application claims priority from Japanese Application No. 2016-150606, filed on Jul. 29, 2016, the contents of which are incorporated by reference herein in its entirety.

BACKGROUND

1. Technical Field

The present invention relates to a force detection apparatus capable of detecting force.

2. Description of the Related Art

In recent years, touch detection apparatuses, what are called touch panels, capable of detecting an external in-proximity object, have attracted attention. A touch panel is mounted on a display apparatus such as a liquid crystal display apparatus or integrated with the display apparatus, and the apparatus is used as a display apparatus with a touch detection function. The display apparatus with a touch detection function displays various button images and the like in the display apparatus to enable an information input, using the touch panel as a substitute for typical mechanical buttons.

Force detection apparatuses capable of detecting force, in addition to touch, have also been used.

As a related technology, Japanese Patent Application Laid-open No. 2015-127657 describes an input apparatus that linearizes an output characteristic of a pressure sensor, using an inverse function of an output characteristic function of the pressure sensor.

There is a force detection apparatus that detects force on the basis of change of capacitance between a first conductor and a second conductor, the first conductor being provided on an input surface side of a touch panel, and the second conductor being provided on a back surface side of the touch panel. When force is applied to the input surface of the detection apparatus, the touch panel is bent, an air layer between the first conductor and the second conductor becomes thin, a distance between the first conductor and the second conductor becomes short, and the capacitance between the first conductor and the second conductor is increased. The force detection apparatus outputs a force signal value on the basis of the change of the capacitance.

By the way, if only the air layer exists between the first conductor and the second conductor, the thickness of the air layer reaches zero when strong force is applied to the input surface, and thus the detection apparatus cannot detect the strong force. Therefore, providing a cushion layer between the first conductor and the second conductor, in addition to the air layer, can be considered. In doing so, when weak force is applied to the input surface, only the air layer becomes thin and the cushion layer is not deformed. Therefore, the force detection apparatus can favorably detect the weak force. When the strong force is applied to the input surface, the thickness of the air layer reaches zero and the cushion layer is elastically deformed according to the force. Therefore, the force detection apparatus can favorably detect the strong force.

In a first range in which only the air layer becomes thin and the cushion layer is not deformed, a relationship between the force and the force signal value becomes linear. Similarly, even in a second range in which the thickness of the air layer reaches zero and the cushion layer is elastically deformed according to the force, the relationship between the force and the force signal value becomes linear. However, permittivity of the air layer and permittivity of the cushion layer are different. Further, the degree of change of the thickness of the air layer with respect to the force and the degree of change of the thickness of the cushion layer with respect to the force are different. Therefore, an inflection point occurs in the relationship between the force and the force signal value in a boundary between the first range and the second range. Therefore, the relationship between the force and the force signal value is not linear in the entire range that is a combination of the first range and the second range. Therefore, the force detection apparatus cannot favorably detect the force.

For the foregoing reasons, there is a need for a force detection apparatus that can favorably detect force.

SUMMARY

According to an aspect, a force detection apparatus includes: a force detector that outputs a force signal value before correction that indicates a force applied to an input surface by an object to be detected; and a force detection controller that outputs a force signal value after correction having a linear relationship with the force. The force detector includes: an electrode facing the input surface, and a conductor facing the electrode across a first layer and a second layer that are deformable by the force. In a first range of force in which the first layer is deformed and the second layer is not deformed, the force detection controller calculates the force signal value after correction, based on a product of the force and a predetermined first constant. In a second range of force in which the first layer and the second layer are deformed, the force detection controller calculates the force signal value after correction, based on a sum of a first product and a second product. The first product is a product of a force threshold corresponding to a boundary between the first range and the second range and the first constant, and the second product is a product of a difference between the force and the force threshold and a predetermined second constant.

BRIEF DESCRIPTION OF THE DRAWINGS

FIG. 48 is a flowchart illustrating processing executed by the force detection controller of the display apparatus with a touch detection function according to the embodiment;

FIG. 49 is a graph plotting force signal values obtained when the same force is applied to each region in a force detection region of the display apparatus with a touch detection function;

DETAILED DESCRIPTION

Embodiments of the present invention will be described in detail with reference to the drawings. The present invention is not limited by content described in the embodiments below. Configuration elements described below include elements easily arrived at by a person skilled in the art and elements substantially the same. Further, the configuration elements described below can be appropriately combined. What is disclosed herein is merely an example, and appropriate modifications which maintain the points of the invention, and which can be easily conceived by a person skilled in the art, are obviously included in the scope of the present invention. To make description more clear, the drawings may be schematically illustrated in the width, thickness, shapes, and the like of respective portions, compared with actual forms. However, such illustration is merely an example, and does not limit the construction of the present invention. In the present specification and drawings, elements similar to those described with respect to the drawings that have already been mentioned are denoted with the same reference signs, and detailed description may be appropriately omitted.

In this disclosure, when an element is described as being "on" another element, the element can be directly on the other element, or there can be one or more elements between the element and the other element.

Embodiment

Figure 1:
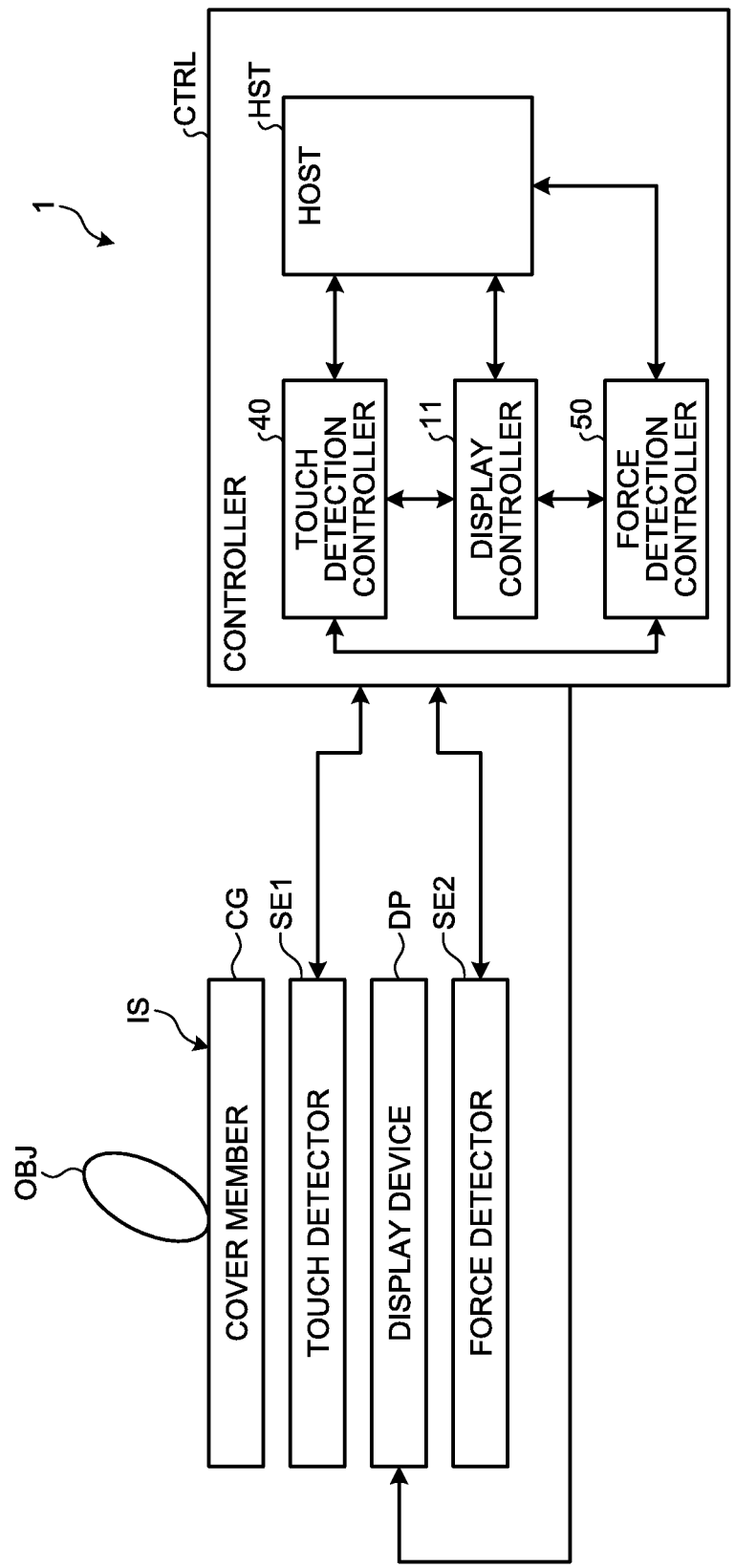
FIG. 1 is a block diagram illustrating a configuration of a display apparatus with a touch detection function according to an embodiment.

FIG. 1 is a block diagram illustrating a configuration of a display apparatus with a touch detection function according to an embodiment of the present invention.

A display apparatus 1 with a touch detection function according to the present embodiment includes a touch detector SE1, a display device DP, a force detector SE2, and a controller CTRL. A combination of the force detector SE2 and the controller CTRL in the display apparatus 1 with a touch detection function is an example of a force detection apparatus of the present invention.

The touch detector SE1 detects contact or proximity of an object to be detected OBJ with or to an input surface IS of a cover member CG. To be specific, the touch detector SE1 outputs a signal value according to the contact with or proximity to a region in the input surface IS, with which the object to be detected OBJ overlaps, in a direction perpendicular to the input surface IS, to the controller CTRL.

The object to be detected OBJ may be a first-type object that is deformed when coming in contact with the input surface IS, or may be a second-type object that is not deformed or has less deformation than the first-type object when coming in contact with the input surface IS. Examples of the first-type object include, but are not limited to, a finger. Examples of the second-type object include, but are not limited to, a resin or metal stylus pen.

The number of the objects to be detected that are detectable by the touch detector SE1 is not limited to one. The touch detector SE1 may be configured to detect two or more objects to be detected.

Examples of the touch detector SE1 include, but are not limited to, a capacitive sensor and a resistive film sensor. Examples of the capacitive sensor include a mutual-capacitive sensor and a self-capacitive sensor.

The display device DP displays an image toward an input surface IS side. Examples of the display device DP include, but are not limited to, a liquid crystal display device and an organic electro-luminescence display device.

The touch detector SE1 and the display device DP may be integrated into an in-cell-type or hybrid-type device. The touch detector SE1 and the display device DP may make up an on-cell-type device having the touch detector SE1 mounted on the display device DP.

The force detector SE2 detects force applied by the object to be detected OBJ to the input surface IS. To be specific, the force detector SE2 outputs a signal according to the force applied by the object to be detected OBJ to the input surface IS, to the controller CTRL.

Examples of the force detector SE2 include a capacitive sensor.

The controller CTRL calculates a force signal value that indicates force on the basis of the signal output from the force detector SE2.

The controller CTRL includes a display controller 11, a touch detection controller 40, a force detection controller 50, and a host HST.

Examples of the display controller 11 include an IC chip mounted on a glass substrate of the display device DP. Examples of the touch detection controller 40 include an IC chip mounted on a printed substrate (for example, a flexible printed substrate) coupled with the glass substrate of the display device DP. Examples of the force detection controller 50 include an IC chip mounted on the printed substrate coupled with the glass substrate of the display device DP. Examples of the host HST include a central processing unit (CPU). The display controller 11, the touch detection controller 40, the force detection controller 50, and the host HST control the touch detector SE1, the display device DP, and the force detector SE2 in cooperation with one another.

Processing for calculating the force signal value, executed by the controller CTRL, may be executed by the display controller 11, by the touch detection controller 40, by the force detection controller 50, by the host HST, or by two or more of the display controller 11, the touch detection controller 40, the force detection controller 50, and the host HST in cooperation with one another.

Hereinafter, specific configuration examples of the touch detector SE1, the display device DP, and the force detector SE2 will be described. However, the embodiments are not limited to these configuration examples.

1. Configuration Examples of Touch Detector and Display Device

Figure 2:
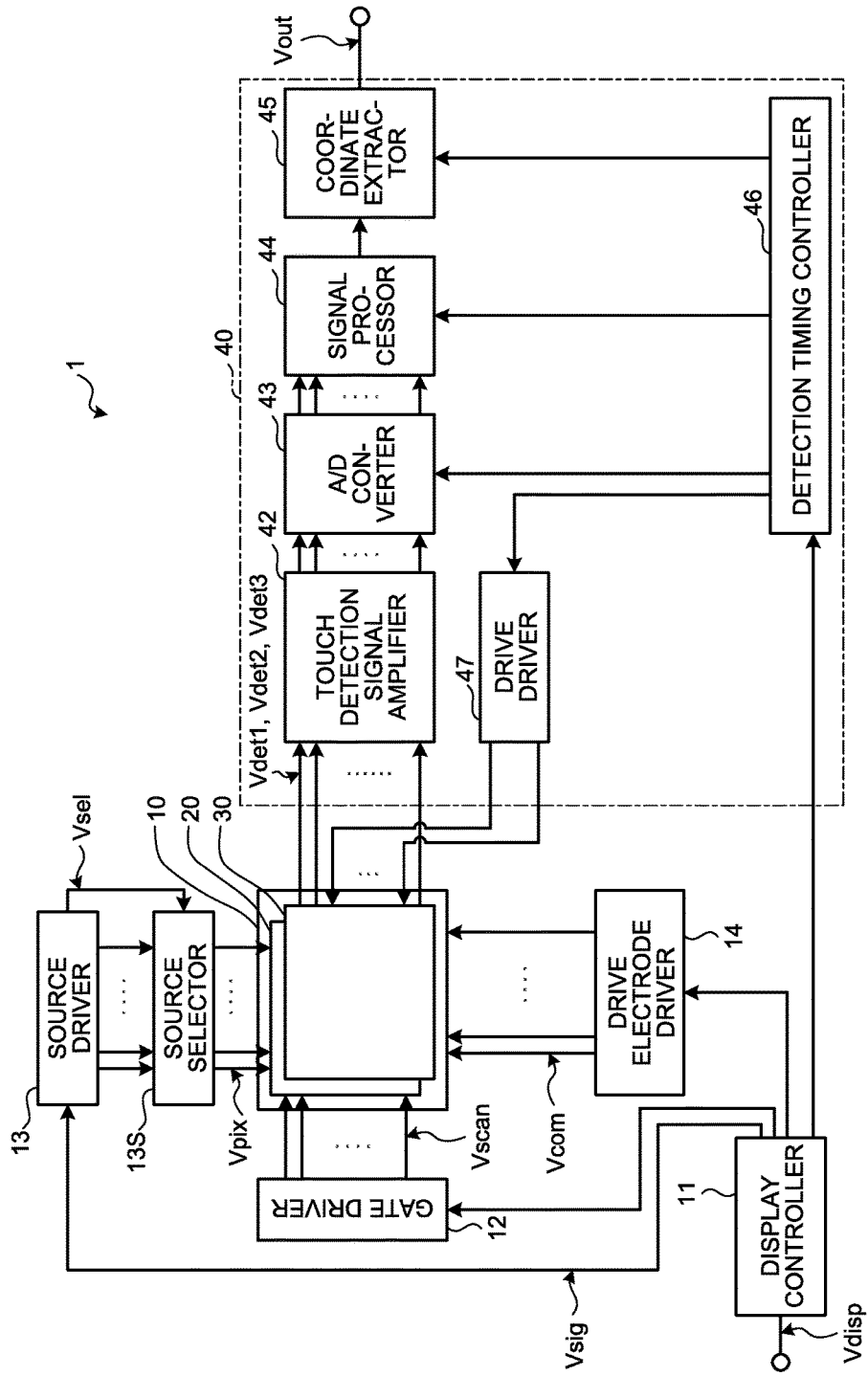
FIG. 2 is a block diagram illustrating configuration examples of a touch detector and a display device of the display apparatus with a touch detection function according to the embodiment.

FIG. 2 is a block diagram illustrating configuration examples of the touch detector and the display device of the display apparatus with a touch detection function according to the embodiment. The display apparatus 1 with a touch detection function illustrated in FIG. 2 is an apparatus that detects coordinates and a contact area of the object to be detected OBJ by mutual-capacitive detection or self-capacitive detection.

The display apparatus 1 with a touch detection function includes a display device 10 with a touch detection function, the display controller 11, a gate driver 12, a source driver 13, a source selector 13S, a drive electrode driver 14, and the touch detection controller 40.

The display device 10 with a touch detection function is an in-cell-type or hybrid-type device obtained by incorporating a capacitive touch detection device 30 into a liquid crystal display device 20 such that the liquid crystal display device 20 and the capacitive touch detection device 30 are integrated. The liquid crystal display device 20 is a device that uses a liquid crystal display element as a display element. Incorporating the capacitive touch detection device 30 into the liquid crystal display device 20 such that the liquid crystal display device 20 and the capacitive touch detection device 30 are integrated includes, for example, using several members such as a substrate and electrodes for both the liquid crystal display device 20 and the touch detection device 30.

The liquid crystal display device 20 corresponds to the display device DP of FIG. 1. The touch detection device 30 corresponds to the touch detector SE1 of FIG. 1.

The display device 10 with a touch detection function may be an on-cell-type device having the capacitive touch detection device 30 mounted on the upper side of the liquid crystal display device 20 that uses a liquid crystal display element as a display element. In a case of the on-cell-type device, the touch detection device 30 may be provided directly on the liquid crystal display device 20, or the touch detection device 30 may be provided above the liquid crystal display device 20 and an intervening layer, instead of directly on the liquid crystal display device 20.

In the present configuration example, the liquid crystal display device 20 is employed as the display device DP. However, the display device DP may employ an organic EL element. In this case, one of an anode and a cathode that form the organic EL element may be used as a drive electrode COML related to touch detection described below.

The liquid crystal display device 20 is a device that sequentially scans one horizontal line at a time and performs display, according to a scanning signal Vscan supplied from the gate driver 12, as described below.

The display controller 11 is a circuit that respectively supplies control signals to the gate driver 12, the source driver 13, the drive electrode driver 14, and the touch detection controller 40 on the basis of a video signal Vdisp supplied from the host HST, and controls the aforementioned drivers and controller to be operated in synchronization with one another. The display controller 11 generates an image signal Vsig from the video signals Vdisp of one horizontal line. The image signal Vsig is obtained by time-division multiplexing pixel signals Vpix for sub-pixels SPix of the liquid crystal display device 20. The display controller 11 supplies the generated image signal Vsig to the source driver 13.

The controller CTRL in the present disclosure includes the display controller 11, the gate driver 12, the source driver 13, and the drive electrode driver 14.

The gate driver 12 has a function to sequentially select one horizontal line to be displayed and driven, of the display device 10 with a touch detection function, on the basis of the control signal supplied from the display controller 11.

The source driver 13 is a circuit that supplies the pixel signal Vpix to pixels Pix (sub-pixels SPix) of the display device 10 with a touch detection function, on the basis of the control signal supplied from the display controller 11. For example, six-bit image signals Vsig of red (R), green (G), and blue (B) are provided to the source driver 13.

The source driver 13 receives the image signal Vsig from the display controller 11, and supplies the image signal Vsig to the source selector 13S. The source driver 13 generates a switch control signal Vsel, which is necessary to separate the pixel signals Vpix multiplexed into the image signal Vsig, and supplies the generated switch control signal Vsel together with the pixel signals Vpix to the source selector 13S. The source selector 13S can reduce the number of wires between the source driver 13 and the display controller 11. The source selector 13S may not be included. A part of control of the source driver 13 may be performed by the display controller 11, and only the source selector 13S may be arranged.

The drive electrode driver 14 is a circuit that supplies drive signals Vcom to the drive electrode COML described below of the display device 10 with a touch detection function, on the basis of the control signal supplied from the display controller 11. The drive signals Vcom include a drive signal (touch drive signal) Vcomtm for mutual-capacitive touch detection, a drive signal Vcomts2 for self-capacitive touch detection, and a display drive voltage VcomDC as a display voltage.

The touch detection controller 40 includes a drive driver 47 that supplies a drive signal Vcomts1 to a touch detection electrode TDL described below in performing a self-capacitive touch detection operation.

The touch detection device 30 is operated on the basis of a basic principle of mutual-capacitive touch detection, and the touch detection electrode TDL outputs a detection signal Vdet1. The touch detection device 30 is operated on the basis of a basic principle of self-capacitive touch detection, and the touch detection electrode TDL outputs a detection signal Vdet2. The touch detection device 30 is operated on the basis of the basic principle of self-capacitive touch detection, and the drive electrode COML outputs a detection signal Vdet3.

The touch detection device 30 can be configured to perform touch detection only using mutual-capacitive touch detection technology. However, to favorably reduce an influence of moisture beads and the like adhering to the input surface IS and to favorably detect a stylus pen or the like, the touch detection device 30 executes both the mutual-capacitive touch detection and the self-capacitive touch detection in the present configuration example. Note that the embodiments are not limited to the case of executing both the mutual-capacitive touch detection and the self-capacitive touch detection.

The basic principle of mutual-capacitive touch detection of the display apparatus 1 with a touch detection function of the present configuration example will be described with reference to FIGS. 3 to 5.

Figure 3:
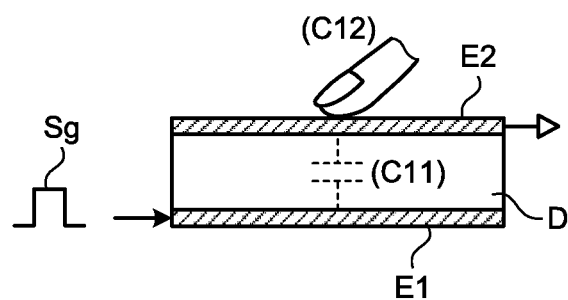
FIG. 3 is an explanatory diagram illustrating a state in which an object to be detected is in contact with or in proximity to a touch detection electrode, for describing a basic principle of mutual-capacitive touch detection.

FIG. 3 is an explanatory diagram illustrating a state in which an object to be detected is in contact with or in proximity to a touch detection electrode, for describing the basic principle of mutual-capacitive touch detection. FIG. 4 is an explanatory diagram illustrating an example of an equivalent circuit of mutual-capacitive touch detection. FIG. 5 is a diagram illustrating an example of waveforms of the drive signal and the detection signal of mutual-capacitive touch detection. FIG. 4 also illustrates a detection circuit.

For example, as illustrated in FIG. 3, a capacitance element C11 includes a drive electrode E1 and a touch detection electrode E2 that are a pair of electrodes arranged to face each other across a dielectric D. As illustrated in FIG. 4, the capacitance element C11 has one end coupled with an alternating-current signal source (drive signal source) S and the other end coupled with a voltage detector (touch detector) DET. The voltage detector DET is an integrated circuit included in a touch detection signal amplifier 42 illustrated in FIG. 2, for example.

When an alternating-current rectangular wave Sg of a predetermined frequency (a frequency on the order of several kHz to several hundreds of kHz, for example) is applied from the alternating-current signal source S to the drive electrode E1 (one end of the capacitance element C11), an output wave form (detection signal Vdet1) appears through the voltage detector DET coupled with the touch detection electrode E2 (the other end of the capacitance element C11). This alternating-current rectangular wave Sg corresponds to the drive signal Vcomtm, described below.

In a state in which the object to be detected is not in contact with or in proximity to the touch detection electrode E2 (non-contact state), a current $I_0$ according to a capacitance value of the capacitance element C11 flows with charge and discharge from/to the capacitance element C11. As illustrated in FIG. 5, the voltage detector DET converts variation of the current $I_0$ according to the alternating-current rectangular wave Sg into variation of voltage (a waveform $V_0$ in the solid line).

Meanwhile, in a state in which the object to be detected is in contact with (or in proximity to) the touch detection electrode E2 (in a contact state), capacitance C12 formed with a finger is in contact with or in proximity to the touch detection electrode E2, as illustrated in FIG. 3, so that fringe capacitance between the drive electrode E1 and the touch detection electrode E2 is interrupted. Due to this, the capacitive element functions as a capacitance element C11' having a smaller capacitance value than the capacitance element C11. Then, as seen in the equivalent circuit illustrated in FIG. 4, a current $I_1$ flows in the capacitance element C11'.

Figure 5:
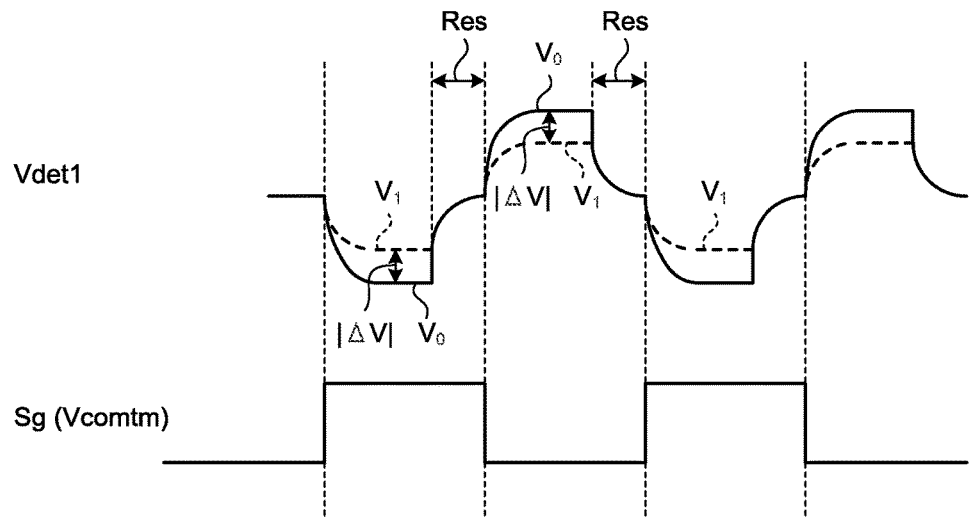
FIG. 5 is a diagram illustrating an example of waveforms of a drive signal and a detection signal of mutual-capacitive touch detection.

As illustrated in FIG. 5, the voltage detector DET converts variation of the current according to the alternating-current rectangular wave Sg into variation of voltage (the waveform $V_1$ in the dotted line). In this case, the waveform $V_1$ has smaller amplitude than the above-described waveform $V_0$. Accordingly, an absolute value $|\Delta V|$ of a voltage difference between the waveform $V_0$ and the waveform $V_1$ is changed according to an influence of the object to be detected. To accurately detect the absolute value $|\Delta V|$ of a voltage difference between the waveform $V_0$ and the waveform $V_1$, it is more favorable that the voltage detector DET performs an operation provided with a period Res to reset charge and discharge of a capacitor in accordance with the frequency of the alternating-current rectangular wave Sg by switching in the circuit.

Referring back to FIG. 2, the touch detection device 30 sequentially scans one detection block at a time according to the drive signal Vcomtm supplied from the drive electrode driver 14, and outputs the detection signal Vdet1.

Next, the basic principle of self-capacitive touch detection of the display apparatus 1 with a touch detection function of the present configuration example will be described with reference to FIGS. 6 to 9.

Figure 6:
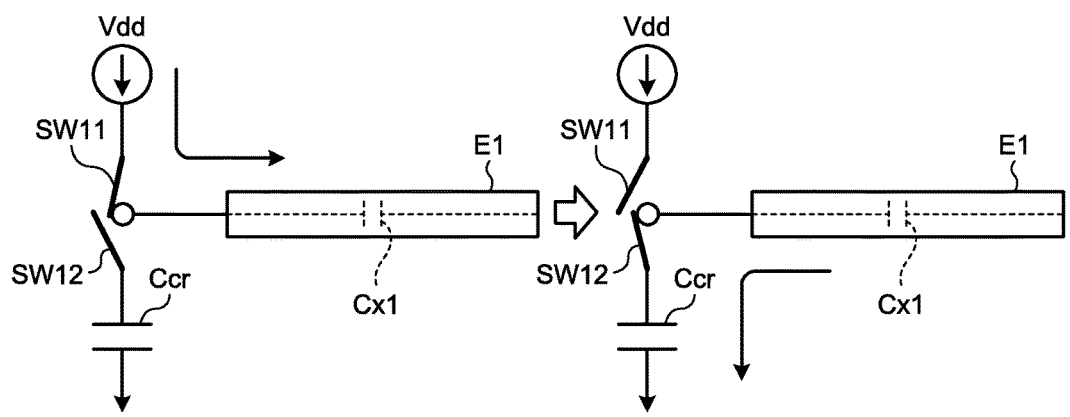
FIG. 6 is an explanatory diagram illustrating a state in which an object to be detected is neither in contact with nor in proximity to a detection electrode, for describing a basic principle of self-capacitive touch detection.
Figure 7:
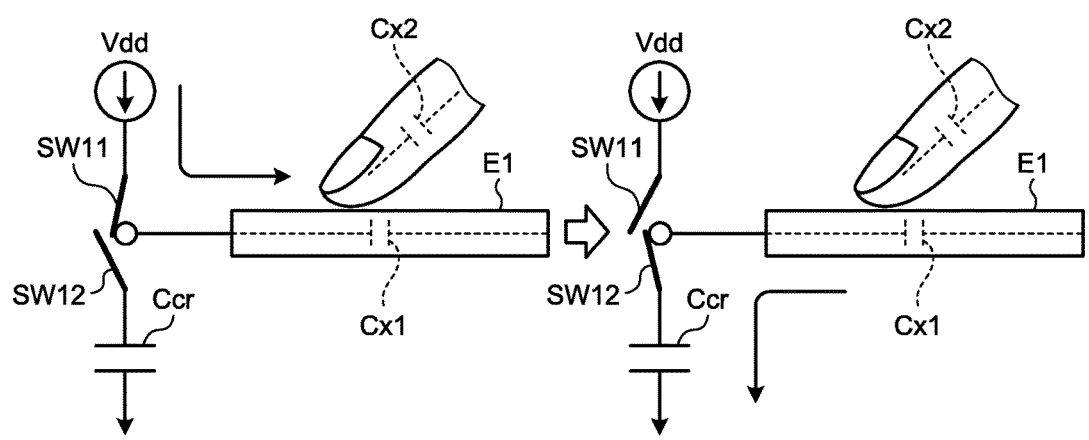
FIG. 7 is an explanatory diagram illustrating a state in which an object to be detected is in contact with or in proximity to the detection electrode, for describing the basic principle of self-capacitive touch detection.
Figure 8:
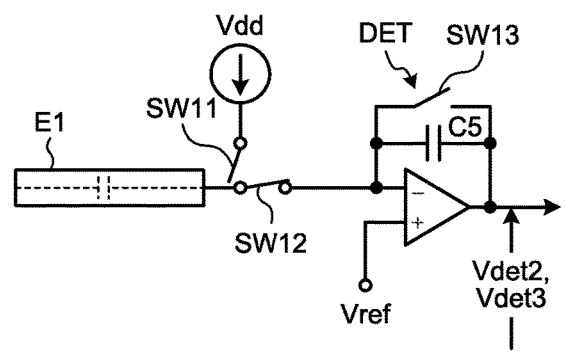
FIG. 8 is an explanatory diagram illustrating an example of an equivalent circuit of self-capacitive touch detection.
Figure 9:
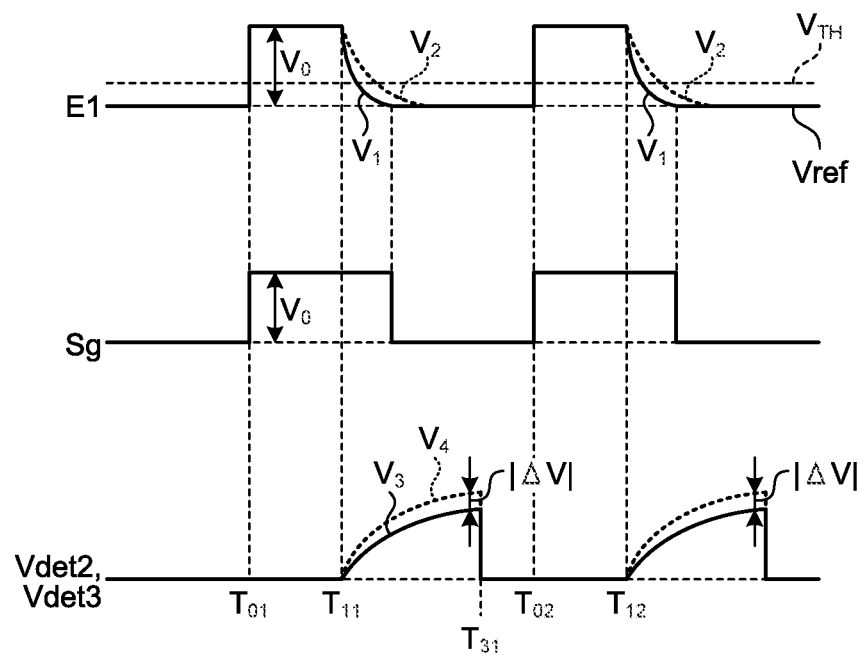
FIG. 9 is a diagram illustrating an example of waveforms of a drive signal and a detection signal of self-capacitive touch detection.

FIG. 6 is an explanatory diagram illustrating a state in which an object to be detected is neither in contact with nor in proximity to a detection electrode, for describing the basic principle of self-capacitive touch detection. FIG. 7 is an explanatory diagram illustrating a state in which an object to be detected is in contact with or in proximity to the detection electrode, for describing the basic principle of self-capacitive touch detection. FIG. 8 is an explanatory diagram illustrating an example of an equivalent circuit of self-capacitive touch detection. FIG. 9 is a diagram illustrating an example of waveforms of the drive signal and the detection signal of self-capacitive touch detection.

The left diagram in FIG. 6 illustrates a state in which a power source Vdd is coupled with the detection electrode E1 by a switch SW11, and the detection electrode E1 is not coupled with a capacitor Ccr by a switch SW12, in a state in which the object to be detected is neither in contact with nor in proximity to the detection electrode E1. In this state, a capacitance Cx1 included in the detection electrode E1 is charged. The right diagram in FIG. 6 illustrates a state in which the power source Vdd is decoupled from the detection electrode E1 by the switch SW11, and the detection electrode E1 is coupled with the capacitor Ccr by the switch SW12. In this state, an electric charge of the capacitance Cx1 is discharged through the capacitor Ccr.

The left diagram in FIG. 7 illustrates a state in which the power source Vdd is coupled with the detection electrode E1 by the switch SW11, and the detection electrode E1 is not coupled with the capacitor Ccr by the switch SW12, in a state in which the object to be detected is in contact with or in proximity to the detection electrode E1. In this state, capacitance Cx2 caused by the object to be detected in proximity to the detection electrode E1 is also charged, in addition to the capacitance Cx1 included in the detection electrode E1. The right diagram in FIG. 7 illustrates a state in which the power source Vdd is decoupled from the detection electrode E1 by the switch SW11, and the detection electrode E1 is coupled with the capacitor Ccr by the switch SW12. In this state, the electric charge of the capacitance Cx1 and the electric charge of the capacitance Cx2 are discharged through the capacitor Ccr.

A voltage change characteristic of the capacitor Ccr at the time of discharge (in the state in which the object to be detected is in contact with or in proximity to the detection electrode E1) illustrated in the right diagram in FIG. 7 is distinctly different due to existence of the capacitance Cx2, from a voltage change characteristic of the capacitor Ccr at the time of discharge (in the state in which the object to be detected is neither in contact with nor in proximity to the detection electrode E1) illustrated in the right diagram in FIG. 6. Therefore, in the self-capacitive touch detection, existence or non-existence of contact or proximity of the object to be detected is determined using the difference of the voltage change characteristic of the capacitor Ccr between existence and non-existence of the capacitance Cx2.

To be specific, an alternating-current rectangular wave Sg (see FIG. 9) of a predetermined frequency (a frequency on the order of several kHz to several hundreds of kHz, for example) is applied to the detection electrode E1. The voltage detector DET illustrated in FIG. 8 converts variation of current according to the alternating-current rectangular wave Sg into variation (waveforms $V_3$ and $V_4$) of voltage. The voltage detector DET is an integrated circuit included in the touch detection signal amplifier 42 illustrated in FIG. 2, for example.

As described above, the detection electrode E1 can be decoupled from other elements by the switch SW11 and the switch SW12. In FIG. 9, the alternating-current rectangular wave Sg rises to a voltage level equivalent to the voltage $V_0$ at timing of time $T_{01}$. At this time, the switch SW11 is ON and the switch SW12 is OFF. Therefore, the voltage of the detection electrode E1 rises to the voltage $V_0$.

Next, the switch SW11 is turned OFF before timing of time $T_{11}$. At this time, while the detection electrode E1 is in an electrically floating condition, the potential $V_0$ of the detection electrode E1 is maintained by the capacitance Cx1 of the detection electrode E1 (see FIG. 6) or capacitance (Cx1+Cx2, see FIG. 7) that is obtained by adding the capacitance Cx2 due to the contact or proximity of the object to be detected with or to the capacitance Cx1 of the detection electrode E1. Further, a switch SW13 is turned ON before timing of time $T_{11}$ and is turned OFF after a lapse of a predetermined time to reset the voltage detector DET. With this reset operation, the output voltage (detection signal) Vdet of the voltage detector DET becomes substantially equal to a reference voltage Vref.

Next, when the switch SW12 is turned ON at timing of time $T_{11}$, the voltage of an inversion input side of the voltage detector DET becomes the voltage $V_0$ of the detection electrode E1. After that, the voltage of the inversion input side of the voltage detector DET is decreased to the reference voltage Vref according to time constants of the capacitance Cx1 (or Cx1+Cx2) of the detection electrode E1 and capacitance C5 in the voltage detector DET. At this time, the electric charge accumulated in the capacitance Cx1 (or Cx1+Cx2) of the detection electrode E1 is moved to the capacitance C5 in the voltage detector DET. Therefore, the output voltages (detection signals) Vdet2 and Vdet3 of the voltage detector DET are increased.

When the object to be detected is neither in contact with nor in proximity to the detection electrode E1, the output voltage Vdet2 of the voltage detector DET has the waveform $V_3$ illustrated by the solid line and Vdet2=Cx1×V0/C5 is established. Similarly, when the object to be detected is neither in contact with nor in proximity to the detection electrode E1, the output voltage Vdet3 of the voltage detector DET has the waveform $V_3$ illustrated by the solid line and Vdet3=Cx1×V0/C5 is established.

When the capacitance due to an influence of the object to be detected is added, the output voltage Vdet2 of the voltage detector DET has the waveform $V_4$ illustrated by the dotted line and Vdet2=(Cx1+Cx2)×V0/C5 is established. Similarly, when the capacitance due to an influence of the object to be detected is added, the output voltage Vdet3 of the voltage detector DET has the waveform $V_4$ illustrated by the dotted line and Vdet3=(Cx1+Cx2)×V0/C5 is established.

After that, the switch SW12 is turned off at timing of time $T_{31}$ after the electric charge of the capacitance Cx1 (or Cx1+Cx2) of the detection electrode E1 is sufficiently moved to the capacitance C5, and the switch SW11 and the switch SW13 are turned ON. Due to this, the potential of the detection electrode E1 becomes a low level, which is the same potential as the alternating-current rectangular wave Sg, and the voltage detector DET is reset. The timing to turn ON the switch SW11 may be any timing after the switch SW12 is turned OFF and before a time $T_{02}$. The timing to reset the voltage detector DET may be any timing after the switch SW12 is turned OFF and before a time $T_{12}$.

The above operation is repeated at a predetermined frequency (a frequency on the order of several kHz to several hundreds of kHz, for example). Existence or non-existence of the object to be detected (existence or non-existence of touch) can be detected on the basis of an absolute value |ΔV| of a difference between the waveform $V_3$ and the waveform $V_4$. As illustrated in FIG. 9, the potential of the detection electrode E1 has the waveform $V_1$ when the object to be detected is not in proximity, and has the waveform $V_2$ when the capacitance Cx2 due to an influence of the object to be detected is added. Existence or non-existence of an external proximity object (existence or non-existence of touch) can be determined by measurement of time until the waveform $V_1$ and the waveform $V_2$ go down to a predetermined threshold voltage $V_{TH}$.

In the present configuration example, in the touch detection device 30, the electric charge is supplied to the touch detection electrodes TDL according to the drive signal Vcomts1 supplied from the drive driver 47 illustrated in FIG. 2 such that the self-capacitive touch detection is performed, and the touch detection electrodes TDL outputs the detection signals Vdet2. In the touch detection device 30, the electric charge is supplied to the drive electrodes COML according to the drive signal Vcomts2 supplied from the drive electrode driver 14 illustrated in FIG. 2 such that the self-capacitive touch detection is performed, and the drive electrodes COML output the detection signals Vdet3.

Referring back to FIG. 2, the touch detection controller 40 is a circuit that detects existence or non-existence of touch (the above-described contact state) to the touch detection device 30 on the basis of the control signal supplied from the display controller 11 and the detection signals Vdet1, Vdet2, and Vdet3 supplied from the touch detection device 30 of the display device 10 with a touch detection function, and obtains coordinates and a contact area of a touch detection region when there is the touch.

The touch detection controller 40 includes the touch detection signal amplifier 42, an analog/digital (A/D) converter 43, a signal processor 44, a coordinate extractor 45, and a detection timing controller 46.

In the mutual-capacitive touch detection, the touch detection device 30 outputs and supplies the detection signals Vdet1 to the touch detection signal amplifier 42 of the touch detection controller 40 from a plurality of the touch detection electrodes TDL described below through the voltage detector DET illustrated in FIG. 4.

In the self-capacitive touch detection, the touch detection device 30 outputs and supplies the detection signal Vdet2 to the touch detection signal amplifier 42 of the touch detection controller 40 from the plurality of touch detection electrodes TDL described below through the voltage detector DET illustrated in FIG. 8. In the self-capacitive touch detection, the touch detection device 30 outputs and supplies the detection signal Vdet3 to the touch detection signal amplifier 42 of the touch detection controller 40 from a plurality of the drive electrodes COML described below through the voltage detector DET illustrated in FIG. 8.

The touch detection signal amplifier 42 amplifies the detection signals Vdet1, Vdet2, and Vdet3 supplied from the touch detection device 30. The touch detection signals amplified by the touch detection signal amplifier 42 are supplied to the A/D converter 43. The touch detection signal amplifier 42 may include a low-pass analog filter that removes a high-frequency component (noise component) included in the detection signals Vdet1, Vdet2, and Vdet3, extracts touch components, and outputs the touch components. The touch detection controller 40 may not include the touch detection signal amplifier 42. That is, the detection signals Vdet1, Vdet2, and Vdet3 from the touch detection device 30 may be supplied to the A/D converter 43.

The A/D converter 43 is a circuit that samples analog signals output from the touch detection signal amplifier 42 and converts the analog signals into digital signals at timing in synchronization with the drive signals Vcomtm, Vcomts1, and Vcomts2.

The signal processor 44 includes a digital filter that decreases frequency components (noise components) other than the frequency at which the drive signals Vcomtm, Vcomts1, and Vcomts2 are sampled, the frequency components being included in the output signals of the A/D converter 43.

The signal processor 44 is a logic circuit that detects existence or non-existence of touch to the touch detection device 30 on the basis of the output signals of the A/D converter 43. The signal processor 44 performs processing of extracting only a signal of a difference caused by a finger. This signal of a difference caused by a finger is the above-described absolute value $|\Delta V|$ of a difference between the waveform $V_0$ and the waveform $V_1$.

The signal processor 44 may perform calculation to average absolute values $|\Delta V|$ per one detection block to obtain an average value of the absolute values $|\Delta V|$. With this calculation, the signal processor 44 can decrease the influence due to noise.

The signal processor 44 compares the detected signal of a difference due to a finger with a predetermined threshold voltage Vth and determines the con-contact state of the external proximity object when the detected signal of a difference is equal to or greater than the threshold voltage Vth.

The signal processor 44 compares the detected signal of a difference with the predetermined threshold voltage Vth and determines the contact state of the external proximity object when the detected signal of a difference is less than the threshold voltage Vth. In this way, the touch detection controller 40 can detect touch.

The coordinate extractor 45 is a logic circuit that obtains touch panel coordinates of touch when the touch is detected by the signal processor 44. The detection timing controller 46 controls the A/D converter 43, the signal processor 44, and the coordinate extractor 45 to be operated in synchronization with one another. The coordinate extractor 45 outputs the touch panel coordinates as a signal Vout.

Figure 10:
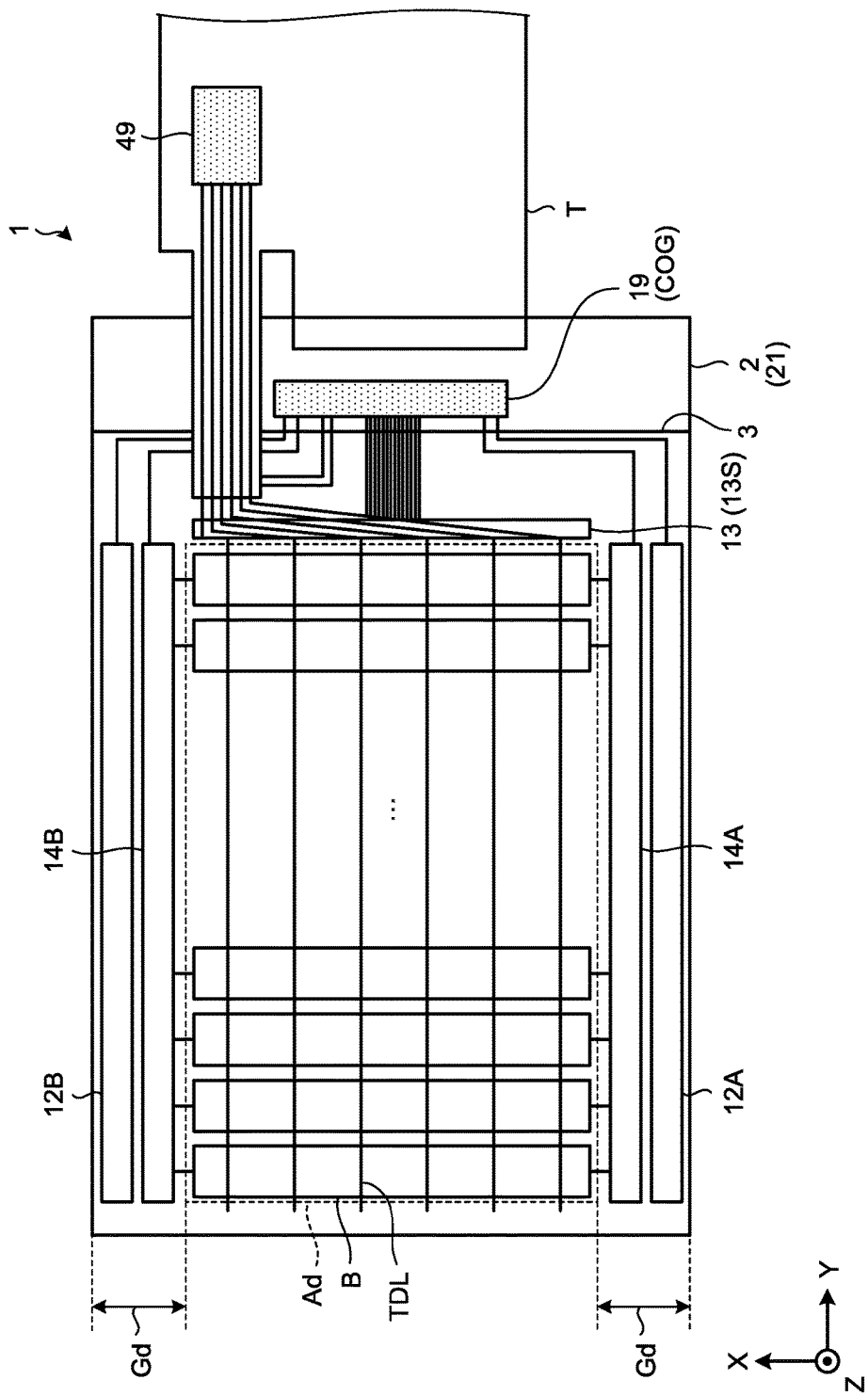
FIG. 10 is a diagram illustrating an example of a module on which the display apparatus with a touch detection function according to the embodiment is mounted.

FIG. 10 is a diagram illustrating an example of a module on which the display apparatus with a touch detection function according to the embodiment is mounted. The display apparatus 1 with a touch detection function includes a first substrate (for example, a pixel substrate 2) and a printed substrate (for example, a flexible printed substrate) T.

The pixel substrate 2 includes a first insulating substrate (for example, a TFT substrate 21). The TFT substrate 21 is, for example, a glass substrate or a film substrate. A drive IC chip (for example, a chip on glass (COG) 19) is mounted on the TFT substrate 21. A display region Ad of the liquid crystal display device 20 and a frame Gd are arranged on the pixel substrate 2 (TFT substrate 21).

The COG 19 is an IC chip that is a driver mounted on the TFT substrate 21, and is a control device including circuits necessary for a display operation, such as the display controller 11 illustrated in FIG. 2.

In the present configuration example, the source driver 13 and the source selector 13S are arranged on the TFT substrate 21. The source driver 13 and the source selector 13S may be included in the COG 19.

Drive electrode scanners 14A and 14B that are a part of the drive electrode driver 14 are arranged on the TFT substrate 21.

The gate driver 12 is provided as gate drivers 12A and 12B on the TFT substrate 21.

The COG 19 of the display apparatus 1 with a touch detection function may include the circuits of the drive electrode scanners 14A and 14B and the gate driver 12. The COG 19 is merely one embodiment of mounting and the embodiment is not limited thereto. For example, a configuration having a function similar to the COG 19 may be mounted on the flexible printed substrate T as a chip on film or a chip on flexible (COF).

As illustrated in FIG. 10, drive electrode blocks B of the drive electrodes COML and the touch detection electrodes TDL are arranged to three-dimensionally intersect with each other in a direction perpendicular to a surface of the TFT substrate 21.

The drive electrodes COML are divided into a plurality of stripe electrode patterns extending in one direction. In performing the touch detection operation, the drive signal VcomAC is sequentially supplied by the drive electrode driver 14 to the electrode patterns. The plurality of stripe electrode patterns, each of which is made up of one or more drive electrodes COML to which the drive signal VcomAC is supplied at the same time, correspond to the drive electrodes block B illustrated in FIG. 10.

The drive electrode blocks B (drive electrodes COML) are arranged in a direction parallel to a short side of the display device 10 with a touch detection function. The touch detection electrodes TDL described below are arranged in a direction intersecting with the extending direction of the drive electrode blocks B and are arranged in a direction parallel to a long side of the display device 10 with a touch detection function, for example.

The touch detection electrodes TDL are coupled with a touch IC 49 mounted on the flexible printed substrate T coupled with the short side of the display device 10 with a touch detection function. The touch IC 49 is an IC chip that is a driver mounted on the flexible printed substrate T, and is a control device including circuits necessary for a touch operation, such as the touch detection controller 40 illustrated in FIG. 2. Thus, the touch IC 49 is mounted on the flexible printed substrate T and is coupled with the touch detection electrodes TDL arranged in parallel. The flexible printed substrate T is not limited to a substrate as long as it is a terminal. In this case, the touch IC 49 is provided outside the module. The touch IC 49 is arranged on the flexible printed substrate T, but the arrangement of the touch IC 49 is not limited thereto. The touch IC 49 may be arranged on the TFT substrate 21 or a second insulating substrate 31.

In the present configuration example, the touch IC 49 is a control device that functions as the touch detection controller 40. However, a part of the function of the touch detection controller 40 may be provided as a function of another MPU.

To be specific, a part (for example, noise removal) of various functions such as A/D conversion and the noise removal, which can be provided as functions of an IC chip as a touch driver, may be performed in a circuit of an MPU or the like separately provided from the IC chip as a touch driver. In a case where one IC chip as a driver (one chip configuration) is employed, the detection signal may be transmitted to the IC chip as a touch driver on an array substrate through wiring of the flexible printed substrate T or the like.

The source selector 13S is arranged near the display region Ad on the TFT substrate 21, using a TFT element. A plurality of pixels Pix described below are arranged in the display region Ad in a matrix (row-column configuration). The frame Gd is a region where no pixel Pix is arranged as the surface of the TFT substrate 21 is viewed in a perpendicular direction. The gate driver 12 and the drive electrode scanners 14A and 14B, of the drive electrode driver 14, are arranged in the frame Gd.

The gate driver 12 includes, for example, the gate drivers 12A and 12B, and is arranged on the TFT substrate 21, using a TFT element. The gate drivers 12A and 12B are arranged on opposite sides of the display region Ad where the sub-pixels SPix (pixels) described below are arranged in a matrix (row-column configuration), and configured to drive the pixels from both sides. Scanning lines are arrayed between the gate driver 12A and the gate driver 12B. Therefore, the scanning lines extend in the direction parallel to the extending direction of the drive electrode COML, in the direction perpendicular to the surface of the TFT substrate 21.

In the present configuration example, the gate driver 12 includes the two circuits: the gate drivers 12A and 12B. However, this is an example of a specific configuration of the gate driver 12 and the embodiment is not limited thereto. For example, the gate driver 12 may be one circuit provided at only one end of each of the scanning lines.

The drive electrode driver 14 includes, for example, the drive electrode scanners 14A and 14B, and is arranged on the TFT substrate 21, using a TFT element. The drive electrode scanners 14A and 14B are configured to receive the display drive voltage VcomDC from the COG 19, and receive the drive signals Vcomtm and Vcomts2. The drive electrode scanners 14A and 14B can drive the plurality of drive electrode blocks B arranged in parallel, from both sides.

In the present configuration example, the drive electrode driver 14 includes the two circuits: the drive electrode scanners 14A and 14B. However, this is an example of a specific configuration of the drive electrode driver 14 and the embodiment is not limited thereto. For example, the drive electrode driver 14 may be one circuit provided at only one end of each of the drive electrode blocks B.

The display apparatus 1 with a touch detection function outputs the above-described detection signals Vdet1, Vdet2, and Vdet3 from the short side of the display device 10 with a touch detection function. This configuration facilitates routing of wiring in the display apparatus 1 with a touch detection function, when the wiring is coupled with the touch detection controller 40 through the flexible printed substrate T as a terminal.

Figure 11:
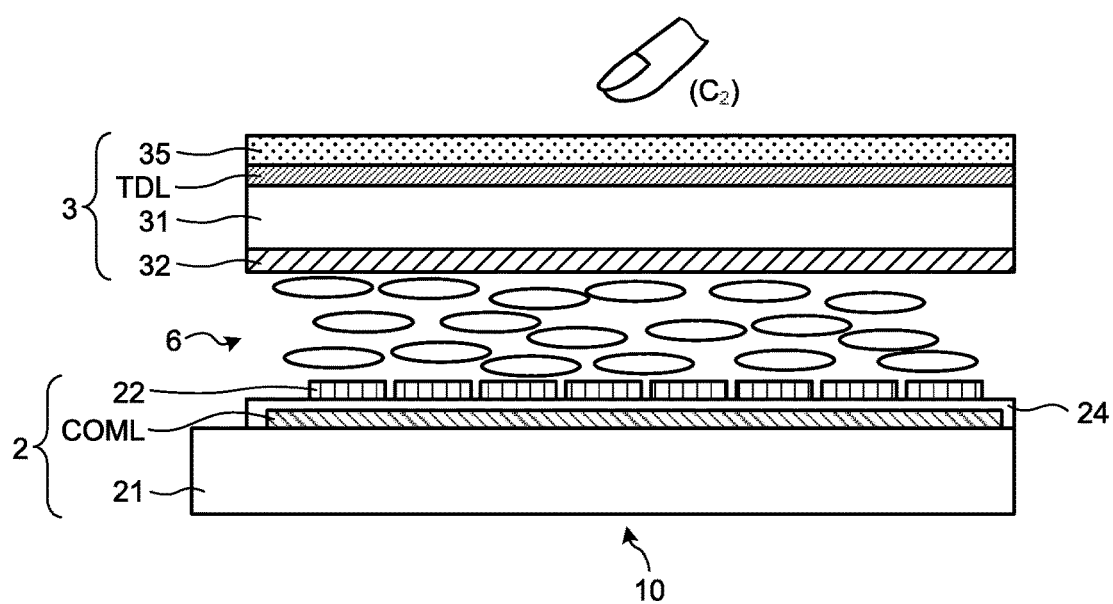
FIG. 11 is a sectional view illustrating a schematic section structure of a display device with a touch detection function.
Figure 12:
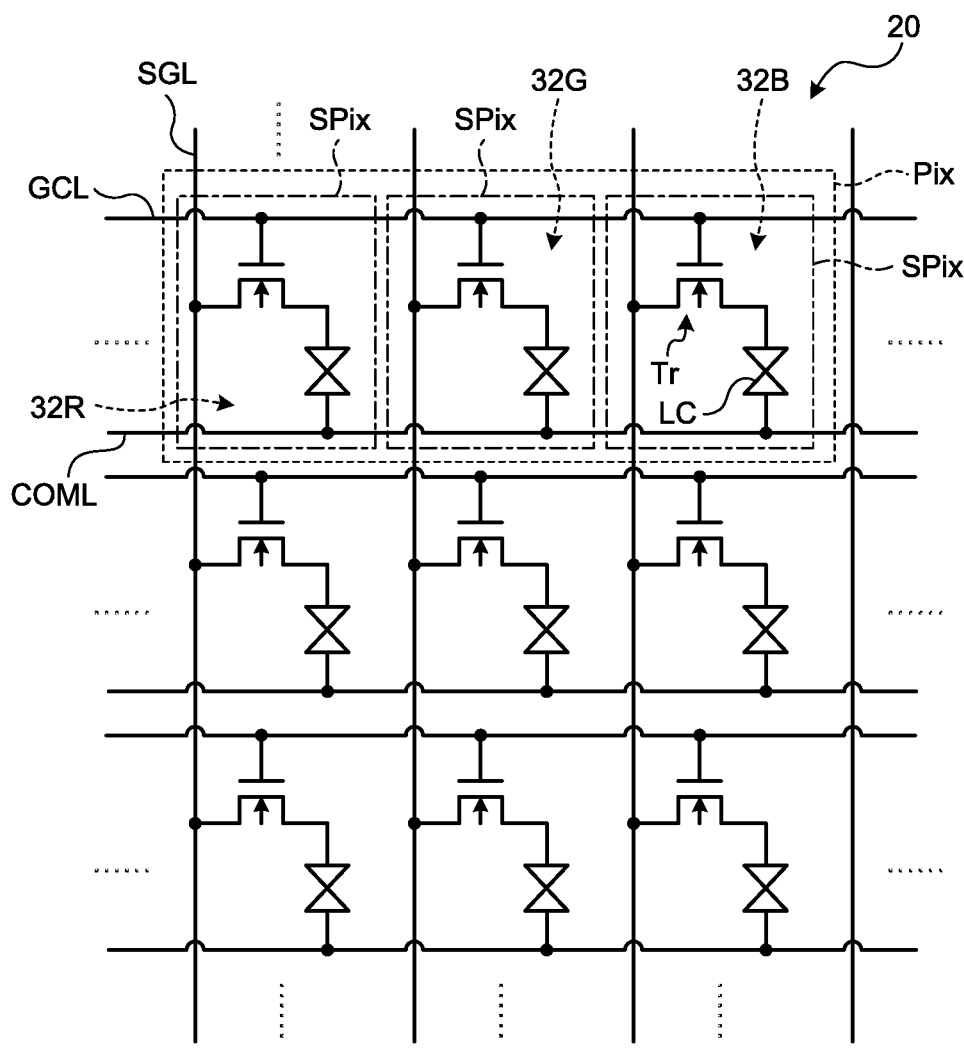
FIG. 12 is a circuit diagram illustrating a pixel arrangement of the display device with a touch detection function.

FIG. 11 is a sectional view illustrating a schematic section structure of the display device with a touch detection function. FIG. 12 is a circuit diagram illustrating a pixel arrangement of the display device with a touch detection function. The display device 10 with a touch detection function includes the pixel substrate 2, a second substrate (a counter substrate 3, for example) and a display function layer (a liquid crystal layer 6, for example). The counter substrate 3 is arranged to face the pixel substrate 2 in the direction perpendicular to the surface of the pixel substrate 2, and the liquid crystal layer 6 is arranged between the pixel substrate 2 and the counter substrate 3.

The pixel substrate 2 includes a TFT substrate 21 as a circuit substrate, a plurality of pixel electrodes 22, the drive electrodes COML, and an insulating layer 24. The pixel electrodes 22 are arranged in a matrix (row-column configuration) on the TFT substrate 21. The drive electrodes COML are arranged between the TFT substrate 21 and the pixel electrode 22. The insulating layer 24 insulates the pixel electrodes 22 and the drive electrodes COML.

As illustrated in FIG. 12, thin film transistor (TFT) elements Tr of the sub-pixels SPix, and wiring such as pixel signal lines SGL and scanning signal lines GCL are arranged on the TFT substrate 21. The pixel signal lines SGL supply the pixel signals Vpix to the pixel electrodes 22. The scanning signal lines GCL drive the TFT elements Tr. The pixel signal line SGL extends in a plane parallel to the surface of the TFT substrate 21, and supplies the pixel signal Vpix for displaying an image to the sub-pixels SPix. The sub-pixel SPix corresponds to a configuration unit that is controlled with the pixel signal Vpix. The sub-pixel SPix is a region surrounded by the pixel signal lines SGL and the scanning signal lines GCL, and corresponds to a configuration unit that is controlled by the TFT element Tr.

As illustrated in FIG. 12, the liquid crystal display device 20 includes a plurality of the sub-pixels SPix arranged in a matrix (row-column configuration). The sub-pixels SPix each include the TFT element Tr and the liquid crystal element LC. The TFT element Tr is fabricated from a thin film transistor material. The TFT element Tr in this example is fabricated from an n-channel metal oxide semiconductor (MOS) TFT material.

One of a source and a drain of the TFT element Tr is coupled with the pixel signal line SGL, a gate is coupled with the scanning signal line GCL, and the other of the source and the drain is coupled with one end of the liquid crystal element LC. The liquid crystal element LC has one end coupled with the drain of the TFT element Tr and the other end coupled with the drive electrode COML, for example. In FIG. 11, the pixel electrodes 22, the insulating layer 24, and the drive electrode COML are layered in this order on the TFT substrate 21. However, the embodiment is not limited thereto. The drive electrode COML, the insulating layer 24, and the pixel electrodes 22 may be layered in this order on the TFT substrate 21, or the drive electrode COML and the pixel electrodes 22 may be arranged on the same layer through the insulating layer 24.

The sub-pixel SPix is coupled with other sub-pixels SPix belonging to the same row of the liquid crystal display device 20, by the scanning signal line GCL. The scanning signal line GCL is coupled with the gate driver 12, and is supplied with the scanning signal Vscan from the gate driver 12.

The sub-pixel SPix is coupled with other sub-pixels SPix belonging to the same column of the liquid crystal display device 20, by the pixel signal line SGL. The pixel signal line SGL is coupled with the source driver 13, and is supplied with the pixel signal Vpix from the source driver 13.

Further, the sub-pixel SPix is coupled with other sub-pixels SPix belonging to the same row of the liquid crystal display device 20, by the drive electrode COML. The drive electrode COML is coupled with the drive electrode driver 14, and is supplied with the drive signal Vcom from the drive electrode driver 14. That is, in this example, the sub-pixels SPix belonging to the same row share one drive electrode COML.

The direction in which the drive electrode COML of the present configuration example extends is parallel to the direction in which the scanning signal line GCL extends. The direction in which the drive electrode COML extends is not limited thereto. For example, the direction in which the drive electrode COML extends may be a direction parallel to the direction in which the pixel signal line SGL extends. The direction in which the touch detection electrode TDL extends is not limited to the direction in which the pixel signal line SGL extends. The direction in which the touch detection electrode TDL extends may be direction parallel to the direction in which the scanning signal line GCL extends.

The gate driver 12 illustrated in FIG. 2 applies the scanning signal Vscan to the gate of the TFT elements Tr of the pixels Pix through the scanning signal line GCL illustrated in FIG. 12, to sequentially select one row (one horizontal line) as a target to be driven and displayed, of the sub-pixels SPix arranged in a matrix (row-column configuration) in the liquid crystal display device 20.

The source driver 13 illustrated in FIG. 2 supplies, through the pixel signal lines SGL illustrated in FIG. 12, the pixel signals Vpix to the corresponding sub-pixels SPix included in the one horizontal line sequentially selected by the gate driver 12. Then, these sub-pixels SPix allow display of the one horizontal line according to the supplied pixel signals Vpix.

The drive electrode driver 14 illustrated in FIG. 2 applies the drive signal Vcom to each block that includes a predetermined number of drive electrodes COML to drive the drive electrodes COML in units of blocks.

As described above, in the liquid crystal display device 20, the gate driver 12 drives the scanning signal lines GCL to sequentially linearly scan the scanning signal lines GCL in a time division manner, such that one horizontal line is sequentially selected. In the liquid crystal display device 20, one horizontal line performs display at a time when the source driver 13 supplies the pixel signals Vpix to the sub-pixels SPix belonging to the one horizontal line. In this display operation, the drive electrode driver 14 applies the drive signal Vcom to the block including one or more drive electrodes COML corresponding to the one horizontal line.

The liquid crystal layer 6 modulates light that passes through the liquid crystal layer 6 according to conditions of the electric field. At time of driving the drive electrode COML, a voltage according to the pixel signal Vpix supplied to the pixel electrode 22 is applied to the liquid crystal layer 6, and the electric field is caused. Then, the liquid crystal of the liquid crystal layer 6 exhibits orientation according to the electric field and modulates the light that passes through the liquid crystal layer 6.

In this way, the pixel electrode 22 and the drive electrode COML function as a pair of electrodes causing the electric field in the liquid crystal layer 6. That is, the liquid crystal display device 20 functions as the display device DP in which the display image is changed according to the electric charge provided for the pair of electrodes. One of the pixel electrodes 22 is arranged in at least every pixel Pix or sub-pixel SPix, and one of the drive electrodes COML is arranged in at least every plurality of pixels Pix or sub-pixels SPix.

In the present configuration example, as the liquid crystal display device 20, a liquid crystal display device using horizontal field-mode liquid crystal such as in-plane switching (IPS) including fringe field switching (FFS) is used, for example. Oriented films may be respectively arranged between the liquid crystal layer 6 and the pixel substrate 2, and between the liquid crystal layer 6 and the counter substrate 3, illustrated in FIG. 11.

The liquid crystal display device 20 has a configuration for the horizontal field mode. However, the liquid crystal display device 20 may have a configuration for another display mode. For example, the liquid crystal display device 20 may have a configuration for a mode mainly using a vertical field caused between principal planes of the substrate, such as a twisted nematic (TN) mode, an optically compensated bend (OCB) mode, or a vertical aligned (VA) mode. As the display mode using the vertical field, a configuration in which the pixel electrodes 22 are provided at the pixel substrate 2 and the drive electrodes COML are provided at the counter substrate 3 is applicable.

The counter substrate 3 includes the second insulating substrate 31, and a color filter 32 arranged on one surface of the second insulating substrate 31. The touch detection electrode TDL as the detection electrode of the touch detection device 30 is arranged on the other surface of the second insulating substrate 31, and a polarizing plate 35 is arranged on the touch detection electrode TDL.

A mounting method of the color filter 32 may be a color-filter on array (COA) method in which the color filter 32 is arranged on the pixel substrate 2 as an array substrate.

The color filter 32 illustrated in FIG. 11 is configured such that color regions colored in three colors of red (R), green (G), and blue (B) of the color filter are periodically arranged. The three color regions 32R, 32G, and 32B colored in R, G, and B correspond to the sub-pixels SPix, and one set of three color regions 32R, 32G, and 32B corresponds to one pixel Pix.

The pixels Pix are arranged in a matrix (row-column configuration) along a direction parallel to the scanning signal lines GCL and a direction parallel to the pixel signal lines SGL to form the display region Ad described below. The color filter 32 faces the liquid crystal layer 6 in a direction perpendicular to the TFT substrate 21. In this way, each sub-pixel SPix can display a single color.

The color filter 32 may have a combination of other colors as long as the filter is colored in different colors. The color filter 32 may not be included. In this way, there may be a region where no color filter 32 exists, that is, there may be sub-pixels SPix that are not colored. The number of the sub-pixels SPix included in each pixel Pix may be four or more.

Figure 13:
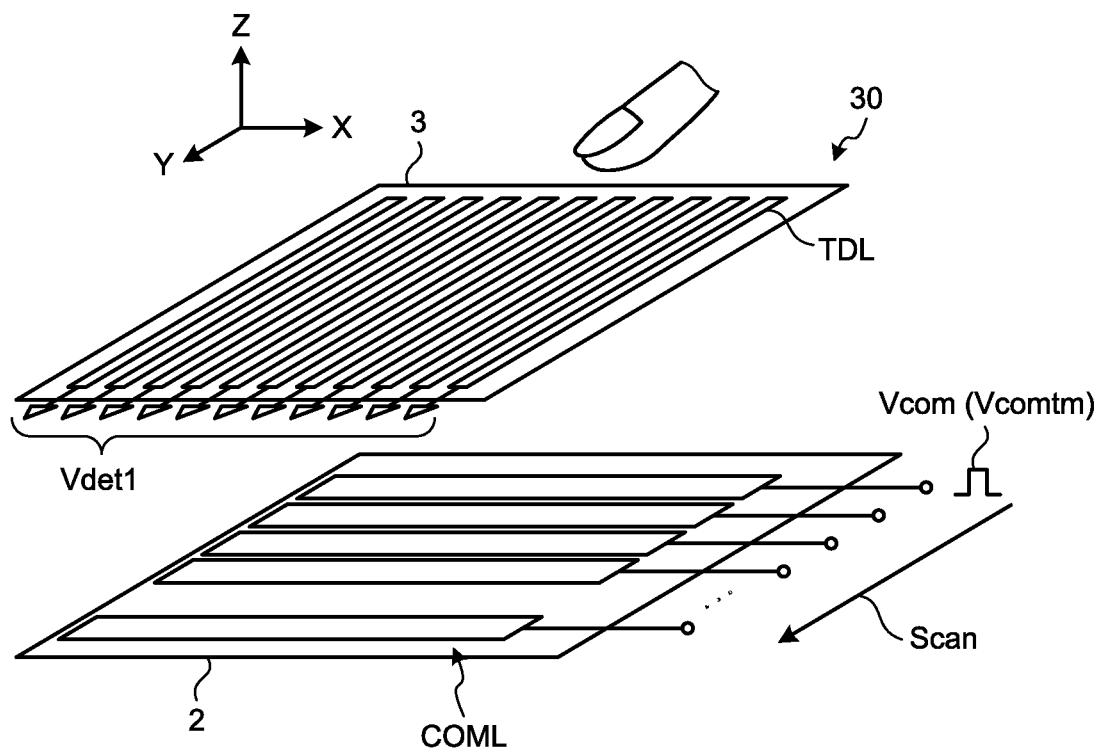
FIG. 13 is a perspective view illustrating a configuration example of drive electrodes and touch detection electrodes of the display device with a touch detection function.

FIG. 13 is a perspective view illustrating a configuration example of the drive electrodes and the touch detection electrodes of the display device with a touch detection function. The drive electrode COML according to the present configuration example functions as a drive electrode of the liquid crystal display device 20 and also functions as a drive electrode of the touch detection device 30.

The drive electrode COML faces the pixel electrode 22 in the direction perpendicular to the surface of the TFT substrate 21. The touch detection device 30 is made up of the drive electrode COML provided in the pixel substrate 2 and the touch detection electrode TDL provided in the counter substrate 3.

The touch detection electrodes TDL are configured such that stripe electrode patterns extend in a direction intersecting with the extending direction of the electrode patterns of the drive electrodes COML. The touch detection electrodes TDL face the drive electrodes COML in the direction perpendicular to the surface of the TFT substrate 21. The electrode patterns of the touch detection electrodes TDL are coupled with an input side of the touch detection signal amplifier 42 of the touch detection controller 40.

The electrode patterns in which the drive electrodes COML and the touch detection electrodes TDL intersect with each other cause capacitance in an intersecting portion. In the touch detection device 30, when the drive electrode driver 14 applies the drive signal Vcomtm to the drive electrode COML, the touch detection electrode TDL outputs the detection signal Vdet1, and the touch detection is performed.

Figure 4:
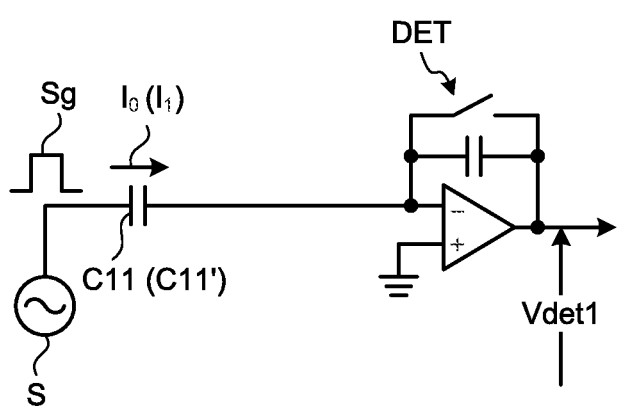
FIG. 4 is an explanatory diagram illustrating an example of an equivalent circuit of mutual-capacitive touch detection.

That is, the drive electrode COML corresponds to the drive electrode E1 in the basic principle of the mutual-capacitance touch detection illustrated in FIGS. 3 to 5, and the touch detection electrode TDL corresponds to the touch detection electrode E2. Then, the touch detection device 30 detects the touch according to the basic principles.

In this way, the touch detection device 30 includes the touch detection electrode TDL that forms mutual-capacitance with one (for example, the drive electrode COML) of the pixel electrode 22 and the drive electrode COML, and performs the touch detection on the basis of change of the mutual-capacitance.

The electrode patterns in which the drive electrodes COML and the touch detection electrodes TDL intersect with each other form a mutual-capacitance touch sensor in a matrix (row-column configuration). Therefore, the touch detection controller 40 can detect a position and a contact area where the object to be detected OBJ is in contact with or in proximity to, by scanning the entire input surface IS of the touch detection device 30.

That is, in the touch detection device 30, the drive electrode driver 14 drives the drive electrode blocks B to sequentially linearly scan the drive electrodes block B illustrated in FIG. 10 in a time division manner, in performing the touch detection operation. With this operation, the drive electrode block B (one detection block) of the drive electrode COML is sequentially selected in a scanning direction Scan. Then, the touch detection device 30 outputs the detection signal Vdet1 from the touch detection electrode TDL. In this way, the touch detection device 30 performs the touch detection of one detection block.

The number of lines in the display output with respect to the detection block is arbitrary. However, in the present embodiment, a touch detection region corresponding to the display region Ad of two lines is the one detection block. In other words, although the relationship between the detection block and any of the pixel electrode, the scanning signal line, and the pixel signal line facing the detection block is arbitrary, two pixel electrodes or two scanning signal lines face one drive electrode COML in the present embodiment.

The shape of the touch detection electrodes TDL or the drive electrodes COML (drive electrode block B) is not limited to a shape with which the touch detection electrodes TDL or the drive electrodes COML are divided into the plurality of stripe patterns. For example, each of the touch detection electrodes TDL or the drive electrodes COML (drive electrode block B) may be formed into a comb teeth shape. Alternatively, each of the touch detection electrodes TDL or the drive electrodes COML (drive electrode block B) may have any shape that just enables the touch detection electrodes TDL or the drive electrodes COML to be divided into a plurality of patterns, and the shape of the slit that divides the drive electrodes COML may be a straight line or a curved line.

As an example of a method of operating the display apparatus 1 with a touch detection function, the display apparatus 1 with a touch detection function performs the touch detection operation (touch detection period) and the display operation (display operation period) in a time division manner. The touch detection operation and the display operation can be performed in any division manner.

2. Configuration Example of Force Detector

Figure 14:
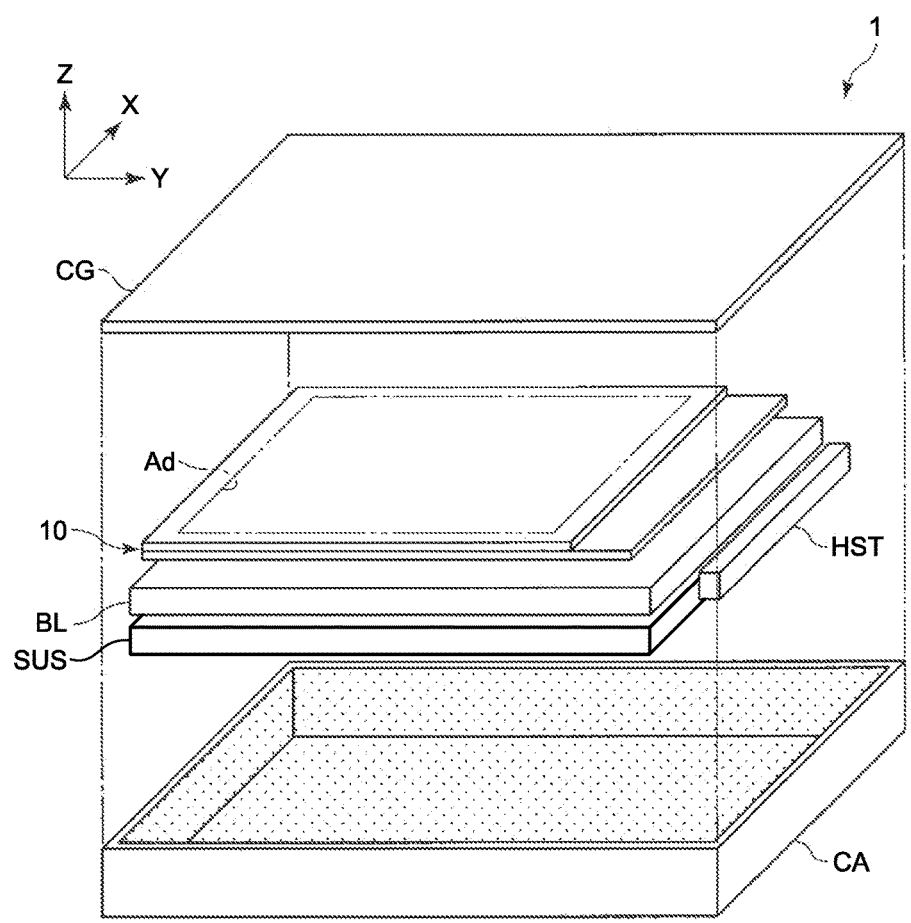
FIG. 14 is an exploded perspective view illustrating a configuration example of the display apparatus with a touch detection function according to the embodiment.

FIG. 14 is an exploded perspective view illustrating a configuration example of the display apparatus with a touch detection function according to the embodiment. As illustrated in FIG. 14, the display apparatus 1 with a touch detection function includes the display device 10 with a touch detection function, a lighting apparatus (for example, a backlight apparatus BL), an electrode SUS, the host HST, a casing CA, and the cover member CG. The lighting apparatus illuminates the display device 10 with a touch detection function. The host HST controls the display device 10 with a touch detection function and the backlight apparatus BL.

The display device 10 with a touch detection function includes a plane parallel to an X-Y plane defined by an X direction as a first direction and a Y direction as a second direction, the first direction and the second direction being perpendicular to each other. In the present configuration example, the X direction as the first direction and the Y direction as the second direction are perpendicular to each other. However, the first direction and the second direction may intersect with each other at an angle other than 90°. A Z direction as a third direction is perpendicular to the X direction as the first direction and the Y direction as the second direction. The Z direction as the third direction is a thickness direction of the display device 10 with a touch detection function.

The casing CA has a box shape having an opening in an upper portion, and houses the display device 10 with a touch detection function, the backlight apparatus BL, and the host HST. The casing CA may be formed of a conductor such as metal. Alternatively, the casing CA may be formed of a resin and a surface layer of the casing CA is formed of a conductor such as metal.

The cover member CG blocks the opening of the casing CA, and covers the display device 10 with a touch detection function, the backlight apparatus BL, and the host HST.

A dimension of the cover member CG is larger than a dimension of the second substrate and a dimension of the first substrate in X-Y plane view. Examples of the cover member CG include substrates having light transmission properties such as a glass substrate and a resin substrate. When the cover member CG is the glass substrate, the cover member CG may be referred to as cover glass.

The display device 10 with a touch detection function, the backlight apparatus BL, and the electrode SUS are positioned between a bottom surface of the casing CA and the cover member CG, and the backlight apparatus BL and the electrode SUS are positioned between the casing CA and the display device 10 with a touch detection function, in the Z direction as the third direction. The backlight apparatus BL and the electrode SUS may be arranged with a space from the display device 10 with a touch detection function. The backlight apparatus BL and the electrode SUS may be arranged with a space from the casing CA.

A force detection region where the force detector SE2 detects force may be the same as the display region Ad.

Figure 15:
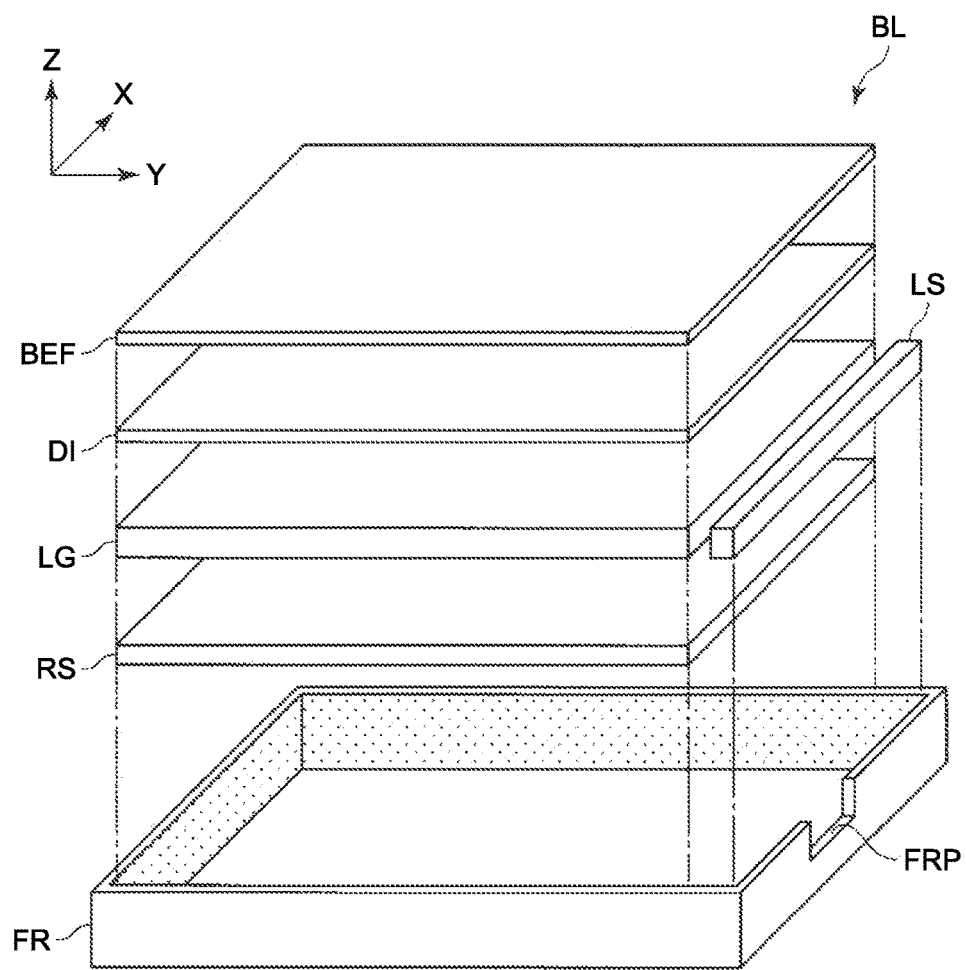
FIG. 15 is an exploded perspective view illustrating a backlight apparatus.

FIG. 15 is an exploded perspective view illustrating a backlight apparatus. The backlight apparatus BL includes a light guide LG, a light source LS, a light reflector RS, a light diffusion sheet DI, a brightness enhancement film BEF, and a frame FR. The backlight apparatus BL has shape and size corresponding to the display device 10 with a touch detection function.

The light guide LG is arranged between the display device 10 with a touch detection function and the casing CA. In the present configuration example, the light guide LG is formed into a flat rectangular shape. The light source LS emits light to the light guide LG. In the present configuration example, a light-emitting diode (LED) is used as the light source LS, and is arranged to face one side surface of the light guide LG.

The light reflector RS is arranged between the light guide LG and the casing CA. The light reflector RS reflects the light emitted from a first side of the light guide LG to cause the light to travel toward the display device 10 with a touch detection function. The first side of the light guide LG is a side opposite to a second side of the light guide LG facing the display device 10 with a touch detection function. The light reflector RS can decrease a loss of light to improve a brightness level of a display image. In the present configuration example, the light reflector RS is formed into a rectangular sheet shape. The area of the light reflector RS is substantially the same as the area of the light guide LG in the X-Y plane. For example, the light reflector RS may have a multilayer film structure using a polyester-based resin.

The light diffusion sheet DI is arranged between the light guide LG and the display device 10 with a touch detection function. The light diffusion sheet DI diffuses the light incident from the light guide LG side and causes the diffused light to travel toward the display device 10 with a touch detection function. That is, the light that passes through the light diffusion sheet DI is diffused. Therefore, the light diffusion sheet DI can reduce unevenness in brightness in the X-Y plane of the light emitted from the backlight apparatus BL. In the present configuration example, the light diffusion sheet DI is formed into a rectangular sheet shape. The area of the light diffusion sheet DI is substantially the same as the area of the light guide LG in the X-Y plane.

The brightness enhancement film BEF is arranged between the light diffusion sheet DI and the display device 10 with a touch detection function. The brightness enhancement film BEF has a function to improve the brightness level of the light emitted from the backlight apparatus BL. In the present configuration example, the brightness enhancement film BEF is formed into a rectangular film shape. The area of the brightness enhancement film BEF is substantially the same as the area of the light guide LG in the X-Y plane.

The frame FR is used for modularization of the backlight apparatus BL. The light guide LG, the light source LS, the light reflector RS, the light diffusion sheet DI, and the brightness enhancement film BEF are attached to the frame FR. With this modularization, relative positions of the light guide LG and the light source LS are fixed.

In the present configuration example, the frame FR is formed into a rectangular frame shape. The frame FR surrounds aggregate of the light guide LG and the light source LS in whole in the X-Y plane. A path FRP, through which the flexible printed substrate T coupled with the light source LS passes, is arranged in the frame FR. The frame FR may be formed of a conductive material such as metal.

The frame FR in the X-Y plane can be deformed into any shape that does not disturb the illumination of the display device 10 with a touch detection function. For example, examples of the shape of the frame FR in the X-Y plan include an L shape in which the frame FR faces two adjacent sides of the light guide LG, an Π shape in which the frame FR faces three adjacent sides of the light guide LG, and a II shape in which the frame FR faces two facing sides of the light guide LG.

Although the backlight apparatus BL is exemplarily illustrated in FIG. 15, various forms are applicable as the backlight apparatus BL. For example, the backlight apparatus BL may be formed excluding at least a part of the light reflector RS, the light diffusion sheet DI, and the brightness enhancement film BEF. Alternatively, the backlight apparatus BL may be formed adding an optical member not illustrated in FIG. 15. The backlight apparatus BL may just be configured to emit light to the display device 10 with a touch detection function.

When the display device 10 with a touch detection function is a reflective liquid crystal display apparatus including a reflection functional layer, or when the display device 10 is an display apparatus using a self-light emitting element OLED as a display functional layer, the backlight apparatus BL is omitted. The examples of the reflection functional layer include a layer of the pixel electrodes made with reflective electrodes of metal or the like. As the lighting apparatus, a frontlight apparatus that irradiates a front surface of the display device 10 with a touch detection function with light may be employed.

Figure 16:
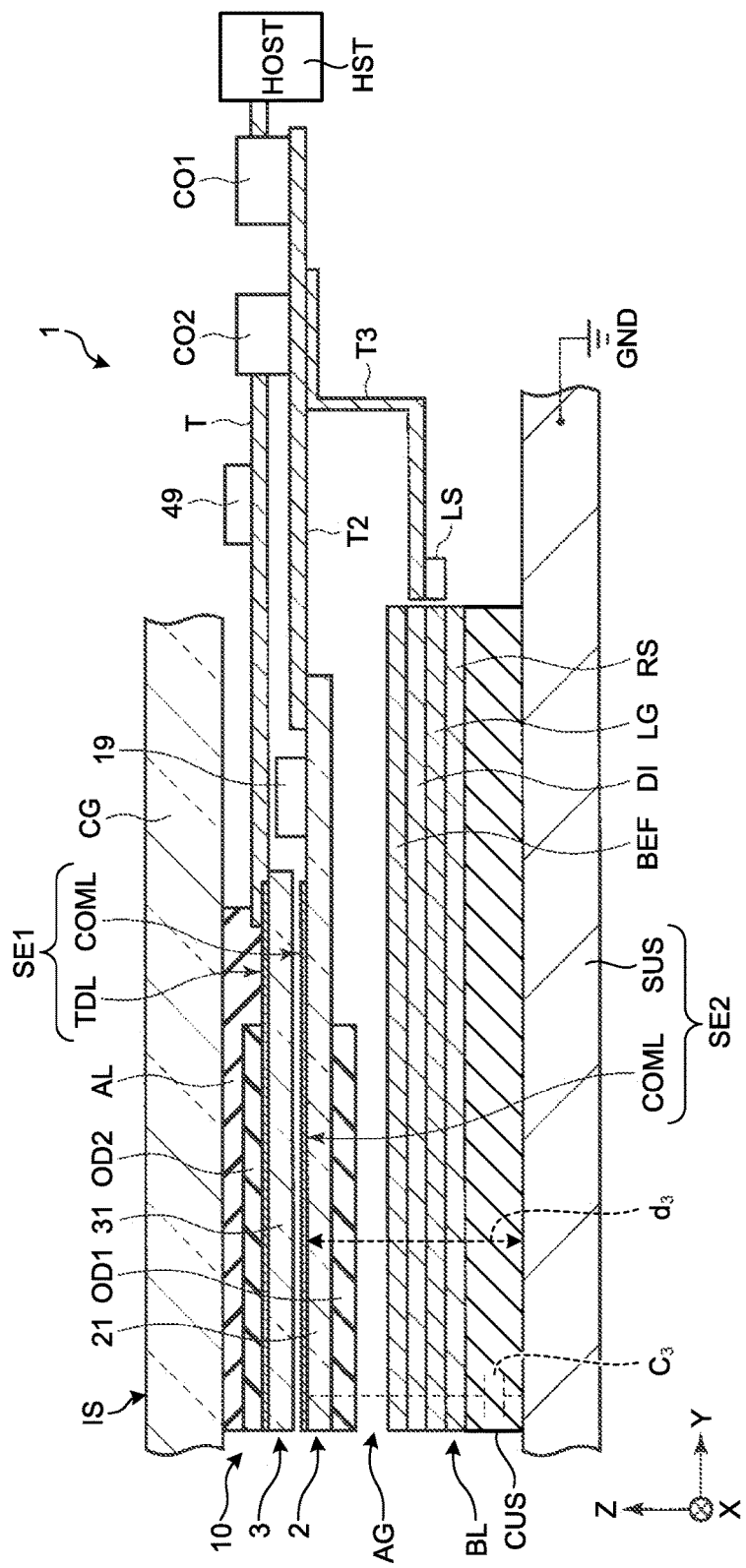
FIG. 16 is a sectional view illustrating a configuration example of the display apparatus with a touch detection function according to the embodiment.

FIG. 16 is a sectional view illustrating a configuration example of the display apparatus with a touch detection function according to the embodiment. As illustrated in FIG. 16, the display apparatus 1 with a touch detection function includes the display device 10 with a touch detection function, the COG 19, the cover member CG, a first optical element OD1, a second optical element OD2, the touch IC 49, the backlight apparatus BL, a first printed substrate, a second printed substrate, and a third printed substrate (for example, flexible printed substrates T, T2, and T3), a cushion layer CUS, and the electrode SUS.

The COG 19 is mounted on the pixel substrate 2 of the display device 10 with a touch detection function. The flexible printed substrate T2 is coupled with the pixel substrate 2. A connector CO1 and a connector CO2 are mounted on the flexible printed substrate T2. The flexible printed substrate T2 is coupled with the host HST through the connector CO1.

The flexible printed substrate T couples the touch detection electrode TDL with the connector CO2. The COG 19 is coupled with the touch IC 49 through the flexible printed substrate T2, the connector CO2, and the flexible printed substrate T. Exemplarily illustrating an arrangement of the touch IC 49, the touch IC 49 may be mounted on any one of the flexible printed substrates T, T2, and T3, and the counter substrate 3, or may be divided and mounted on any two of the aforementioned substrates.

The flexible printed substrate T3 couples the light source LS with the flexible printed substrate T2. The host HST is coupled with the light source LS through the connector CO1 and the flexible printed substrate T3, supplies power to the light source LS, and controls driving of the light source LS. The light source LS may be coupled with the COG 19 through the flexible printed substrate T3 and the flexible printed substrate T2, and controlled by the COG 19. In other words, the display controller 11 may include a light source controller that controls the light source.

Means to couple the host HST, the display device 10 with a touch detection function, the touch detection electrode TDL, the light source LS, the intermediate electrode ELC, and the electrode SUS are not limited to the above, and other means may be employed.

For example, one flexible printed substrate may be used in place of the three independent flexible printed substrates T, T2, and T3 and the connectors CO1 and CO2. In this case, the one flexible printed substrate can be coupled with the host HST, a first branch portion of the one flexible printed substrate can be coupled with the display device 10 with a touch detection function, a second branch portion of the one flexible printed substrate can be coupled with the touch detection electrode TDL, and a third branch portion of the one flexible printed substrate can be coupled with the light source LS. The flexible printed substrates, or the flexible printed substrate and the host HST or the substrate may be coupled with one another through connectors such as the connectors CO1 and CO2, or may be coupled by soldering in place of the connectors.

The host HST, the COG 19, and the touch IC 49 function as the controller CTRL that controls the touch detector SE1 including the drive electrode COML and the touch detection electrode TDL of the display device 10 with a touch detection function.

The host HST, the COG 19, and the touch IC 49 function as the controller CTRL that controls the force detector SE2 including the drive electrode COML and the electrode SUS of the display device 10 with a touch detection function.

The host HST can be rephrased as application processor. The touch IC 49 can provide a timing signal, which gives drive timing of the touch detector SE1 and the force detector SE2, to the COG 19. Alternatively, the COG 19 can provide a timing signal, which gives drive timing of the drive electrode COML, to the touch IC 49. Alternatively, the host HST can provide a timing signal to the COG 19 and the touch IC 49. With this timing signal, driving of the COG 19 and driving of the touch IC 49 can be synchronized.

The cover member CG is positioned outside the display device 10 with a touch detection function and faces the counter substrate 3. In this configuration example, the input surface IS of the display apparatus 1 with a touch detection function is a surface of the cover member CG. The display apparatus 1 with a touch detection function can detect a position and a contact area of the object to be detected OBJ when the object to be detected OBJ comes in contact with the input surface IS.

The force detector SE2 of the display apparatus 1 with a touch detection function can output a signal according to force to the controller CTRL when the force is applied to the input surface IS by the object to be detected OBJ. The signal according to force is a signal according to force of the object to be detected OBJ that presses the input surface IS, and is a signal changed according to the magnitude of the force.

An air layer (air gap) AG is provided between the display device 10 with a touch detection function and the backlight apparatus BL.

The cushion layer CUS is provided between the backlight apparatus BL and the electrode SUS. The cushion layer CUS is a nonconductor, and polyurethane is exemplified. A potential of the electrode SUS is a reference potential (for example, a ground potential GND).

When weak force is applied to the input surface IS, only the air layer AG becomes thin, and the cushion layer CUS is not deformed. Therefore, the display apparatus 1 with a touch detection function can favorably detect the weak force. When strong force is applied to the input surface IS, the thickness of the air layer AG reaches zero, and the cushion layer CUS is elastically deformed according to the force. Therefore, the display apparatus 1 with a touch detection function can favorably detect the strong force.

The first optical element OD1 is arranged between the pixel substrate 2 and the backlight apparatus BL. The first optical element OD1 is bonded to the pixel substrate 2.

The second optical element OD2 is arranged between the display device 10 with a touch detection function and the cover member CG. The second optical element OD2 is bonded to the counter substrate 3 and the touch detection electrode TDL.

Each of the first optical element OD1 and the second optical element OD2 includes at least a polarizing plate and may include a phase difference plate, as needed. An absorption axis of the polarizing plate included in the first optical element OD1 and an absorption axis of the polarizing plate included in the second optical element OD2 intersect with each other. For example, the absorption axis of the polarizing plate included in the first optical element OD1 and the absorption axis of the polarizing plate included in the second optical element OD2 are perpendicular to each other.

The cover member CG is bonded to the second optical element OD2 with an adhesive layer AL. Examples of the adhesive layer AL include an optically clear resin (OCR). The display device 10 with a touch detection function detects force, and thus the adhesive layer AL may be elastically deformed as long as the adhesive layer AL can transfer the force applied from the cover member CG to the second optical element OD2.

The touch detection electrode TDL is arranged between the drive electrode COML and the cover member CG. In this configuration example, the touch detection electrode TDL is provided on the upper side of a surface of the counter substrate 3, the surface facing the second optical element OD2. The touch detection electrode TDL may be in contact with the counter substrate 3 or may be separated from the counter substrate 3. When touch detection electrode TDL is separated from the counter substrate 3, a member such as an insulating film (not illustrated) lies between the counter substrate 3 and the touch detection electrode TDL. The touch detection electrode TDL extends in the Y direction as the second direction.

The drive electrode COML and the touch detection electrode TDL form the mutual-capacitive and self-capacitive touch detectors SE1. The drive electrode COML functions as a display electrode and also functions as a sensor drive electrode. The touch detector SE1 is used to detect the position and the contact area of the object to be detected OBJ.

In the present configuration example, the electrode SUS is formed of a conductor (for example, aluminum). The potential of the electrode SUS is the reference potential. As the reference potential, the ground potential GND is exemplified. Any of the touch IC 49, the COG 19, and the host HST is electrically coupled with the electrode SUS by wiring or the like, and the reference potential may be supplied from any of the touch IC 49, the COG 19, and the host HST to the electrode SUS.

The electrode SUS is arranged with a space from the display device 10 with a touch detection function. In the present configuration example, the cushion layer CUS is provided between the display device 10 with a touch detection function and the electrode SUS. That is, the display apparatus 1 with a touch detection function includes the air layer AG between the display device 10 with a touch detection function and the backlight apparatus BL, and the cushion layer CUS between the backlight apparatus BL and the electrode SUS.

The air layer AG and the cushion layer CUS are provided between the electrode SUS and the drive electrode COML. With the existence of the air layer AG and the cushion layer CUS, the thickness of the space between the electrode SUS and the drive electrode COML is changeable according to the magnitude of the force applied to the input surface IS. When the force applied to the input surface IS is removed, the thickness of the space between the electrode SUS and the drive electrode COML returns to the original thickness as time proceeds.

The drive electrode COML is an example of "electrode" of the present invention. The electrode SUS is an example of "conductor" of the present invention. The air layer AG is an example of "first layer" of the present invention. The cushion layer CUS is an example of "second layer" of the present invention.

In the present configuration example, the air layer AG is provided between the display device 10 with a touch detection function and the backlight apparatus BL. However, the embodiment is not limited thereto. A resin layer having high transmittance of light emitted from the backlight apparatus BL may be provided between the display device 10 with a touch detection function and the backlight apparatus BL, in place of the air layer AG. In this case, the degree of change of the thickness of the resin layer with respect to the force may be larger than the degree of change of the thickness of the cushion layer CUS with respect to the force. That is, the resin layer may be softer than the cushion layer CUS. In this case, the resin layer is an example of "first layer" of the present invention.

A distance $d_3$ from the electrode SUS to the drive electrode COML is a distance in the Z direction as the third direction, and is a distance from a surface of the electrode SUS to a surface of the drive electrode COML. The surface of the electrode SUS is a surface facing the drive electrode COML, and the surface of the drive electrode COML is a surface facing the electrode SUS. The distance $d_3$ is changed according to the magnitude of the force applied to the cover member CG and the position where the force is applied.

Capacitance $C_3$ exists between the drive electrode COML and the electrode SUS. That is, the drive electrode COML is capacitively coupled with the electrode SUS. The capacitance $C_3$ is changed corresponding to the distance $d_3$. Therefore, the COG 19 can detect the change of the capacitance $C_3$ to detect force information. A principle of the force detection will be described in detail below.

The force detection controller 50 drives the drive electrode COML to obtain the force information based on the change of the capacitance $C_3$ from the drive electrode COML. For example, the force detection controller 50 is included in the COG 19, and the COG 19 outputs a signal to the drive electrode COML and reads a signal based on the change of the capacitance $C_3$ from the drive electrode COML. The force detection controller 50 may be included in the touch IC 49 or the host HST. The display controller 11, the touch detection controller 40, the force detection controller 50, and the host HST may control the touch detector SE1, the display device DP, and the force detector SE2 in cooperation with one another.

In the present configuration example, the drive electrode COML is shared among the touch detector SE1, the display device DP, and the force detector SE2.

Figure 17:
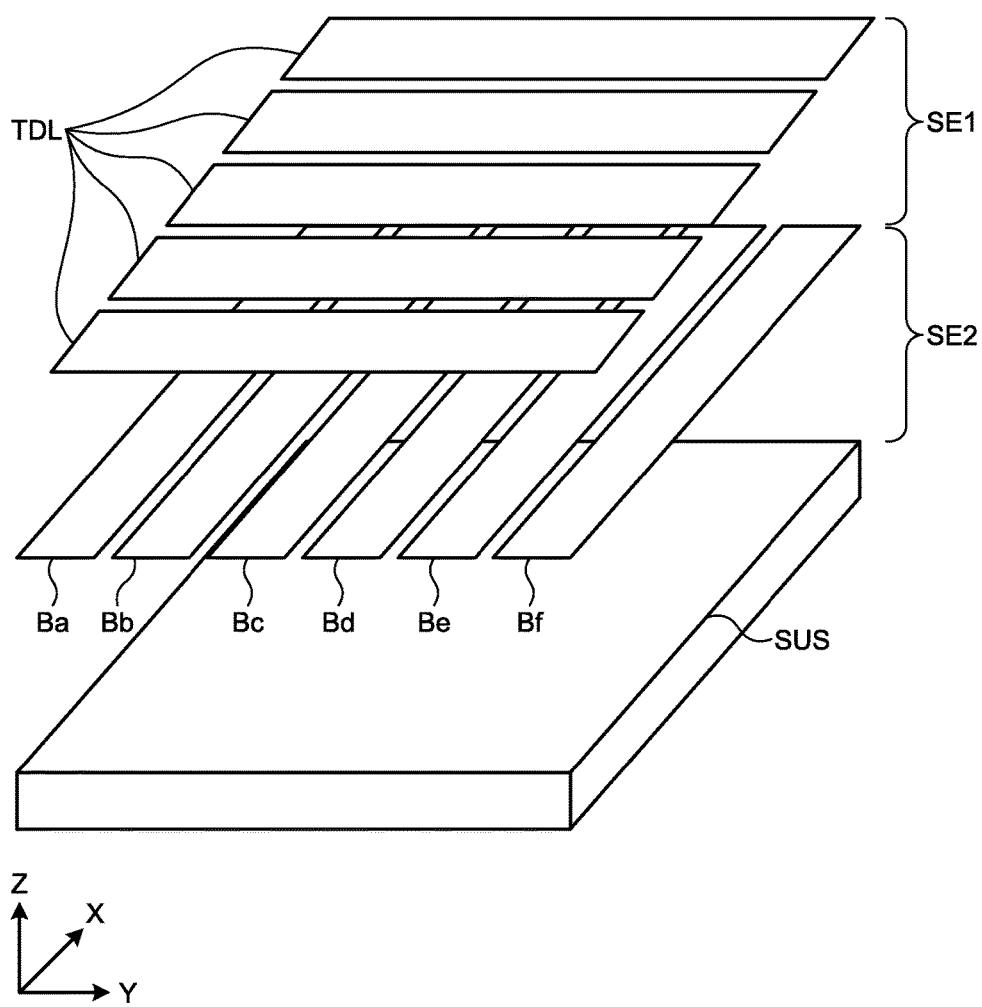
FIG. 17 is a perspective view illustrating the touch detection electrodes, drive electrode blocks, an intermediate electrode, and an electrode of the display apparatus with a touch detection function according to the embodiment.

FIG. 17 is a perspective view illustrating the touch detection electrodes, drive electrode blocks, an intermediate electrode, and an electrode of the display apparatus with a touch detection function according to the embodiment. A plurality of the touch detection electrodes TDL and drive electrode blocks Ba, Bb, Bc, Bd, Be, and Bf form the touch detector SE1 of FIG. 1.

The drive electrode blocks Ba, Bb, Bc, Bd, Be, and Bf and the electrode SUS form the force detector SE2 of FIG. 1.

In the present embodiment, the unit of the drive electrode blocks driven in the touch detector SE1 and the unit of drive electrode blocks driven in the force detector SE2 are the same. However, the embodiment is not limited thereto. For example, the touch detector SE1 may individually drive the drive electrode blocks, and the force detector SE2 may drive all the drive electrode blocks or two or more drive electrode blocks at the same time.

Figure 18:
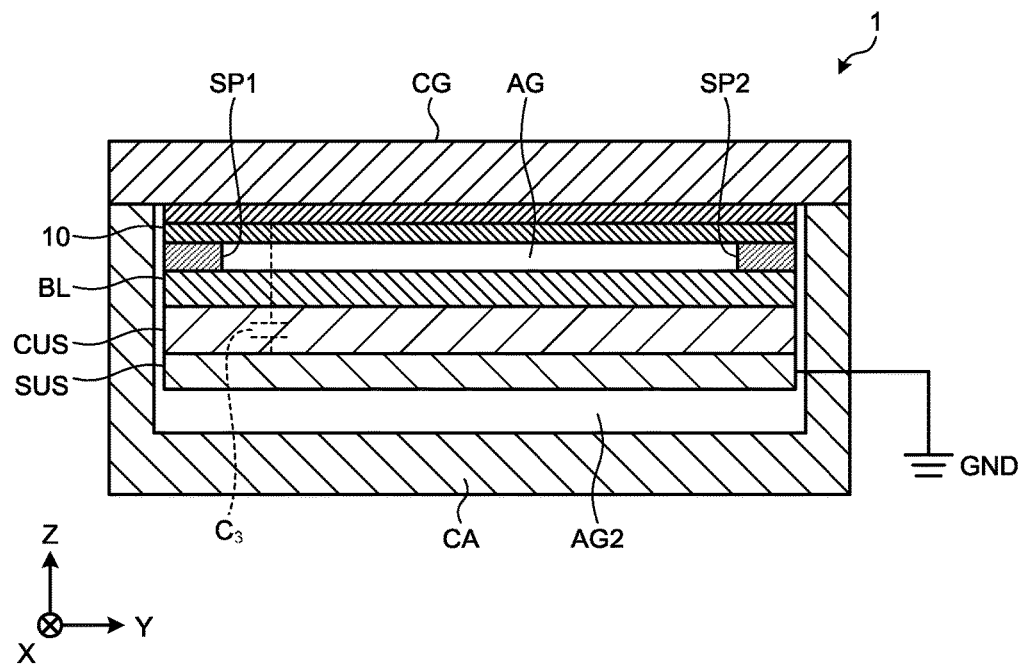
FIG. 18 is a sectional view illustrating an example of an overall configuration of the display apparatus with a touch detection function according to the embodiment.

FIG. 18 is a sectional view illustrating an example of an overall configuration of the display apparatus with a touch detection function according to the embodiment. In the configuration example illustrated in FIG. 18, end portions of the display device 10 with a touch detection function and the backlight apparatus BL are coupled by spacers SP1 and SP2, and the air layer AG is provided between the display device 10 with a touch detection function and the backlight apparatus BL.

The cushion layer CUS is provided between the backlight apparatus BL and the electrode SUS. The configuration example illustrated in FIG. 18 is not provided with the frame FR illustrated in FIG. 15. An air layer AG2 is provided between the electrode SUS and the casing CA.

Figure 19:
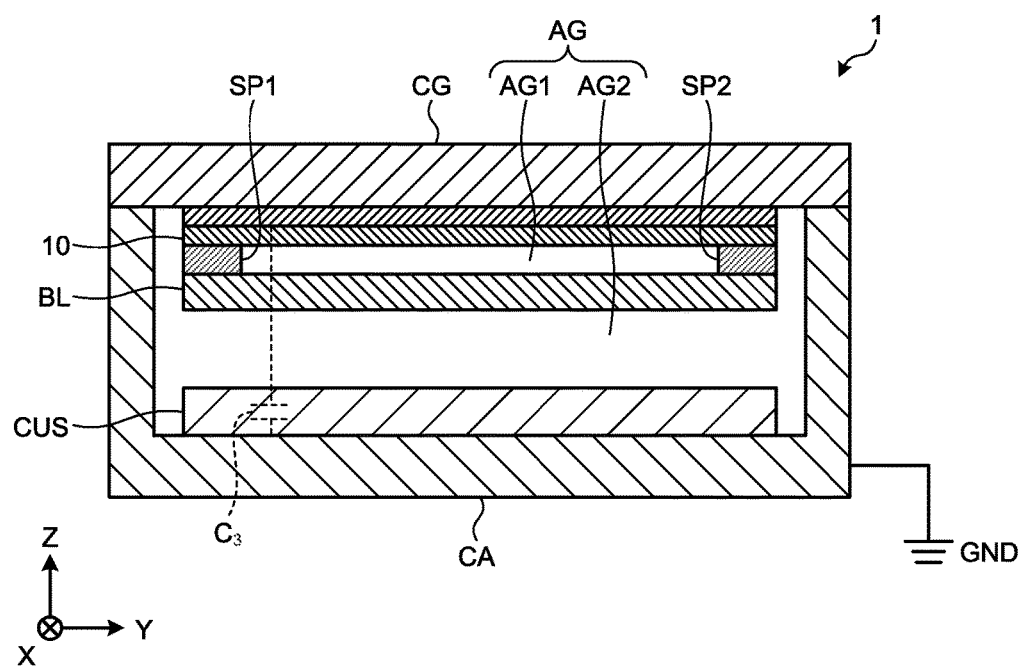
FIG. 19 is a sectional view illustrating another example of the overall configuration of the display apparatus with a touch detection function according to the embodiment.

FIG. 19 is a sectional view illustrating another example of the overall configuration of the display apparatus with a touch detection function according to the embodiment. In the configuration example illustrated in FIG. 19, end portions of the display device 10 with a touch detection function and the backlight apparatus BL are coupled by spacers SP1 and SP2, and an air layer AG1 lies between the display device 10 with a touch detection function and the backlight apparatus BL.

The casing CA is made to have the reference potential. The cushion layer CUS is provided on a bottom surface of the casing CA. An air layer AG2 lies between the backlight apparatus BL and the cushion layer CUS. The air layers AG1 and AG2 form the air layer AG between the drive electrode COML and the cushion layer CUS. In the configuration example illustrated in FIG. 19, the casing CA becomes a substitute for the electrode SUS. Therefore, the configuration example illustrated in FIG. 19 is not provided with the electrode SUS illustrated in FIGS. 14, 16, and 17.

In the configuration example illustrated in FIG. 19, the casing CA is an example of "conductor" in the present invention.

3. Principle of Force Detection 3-1. Basic Principle

Figure 20:
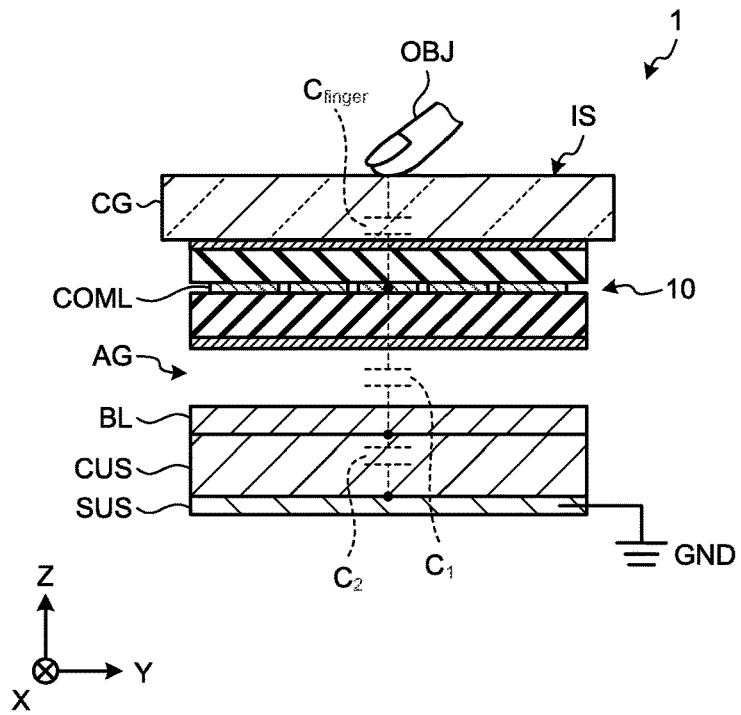
FIG. 20 is a sectional view illustrating a configuration of the display apparatus with a touch detection function according to the embodiment.

FIG. 20 is a sectional view illustrating a configuration of the display apparatus with a touch detection function according to the embodiment. Capacitance $C_1$ exists between the drive electrode COML and the cushion layer CUS, and capacitance $C_2$ exists between the cushion layer CUS and the electrode SUS.

As illustrated in FIG. 20, when the object to be detected (finger) OBJ comes in contact with the input surface IS, capacitance $C_{finger}$ occurs between the drive electrode COML and the object to be detected OBJ.

Figure 21:
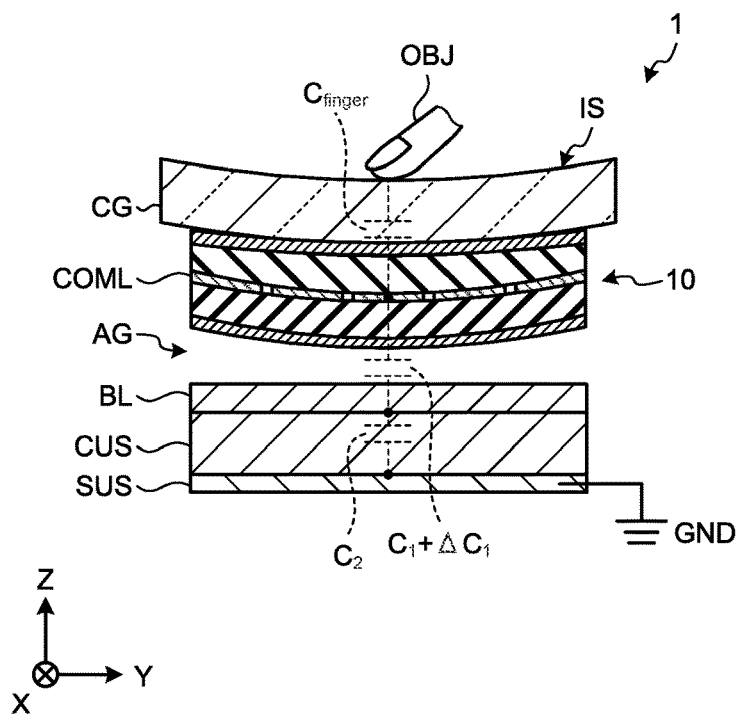
FIG. 21 is a sectional view illustrating a configuration of the display apparatus with a touch detection function according to the embodiment.

FIG. 21 is a sectional view illustrating a configuration of the display apparatus with a touch detection function according to the embodiment. As illustrated in FIG. 21, when the object to be detected OBJ applies force to the input surface IS, the display device 10 with a touch detection function is bent. When the display device 10 with a touch detection function is bent, the air layer AG becomes thin and the distance between the drive electrode COML and the cushion layer CUS becomes short. Therefore, the capacitance between the drive electrode COML and the cushion layer CUS is increased by $\Delta C_1$ to become $(C_1 + \Delta C_1)$. Therefore, the capacitance between the drive electrode COML and the electrode SUS becomes the capacitance $C_3 = 1/(1/(C_1 + \Delta C_1) + 1/C_2)$. The display apparatus 1 with a touch detection function detects the force on the basis of the capacitance $C_3$ between the drive electrode COML and the electrode SUS.

Figure 22:
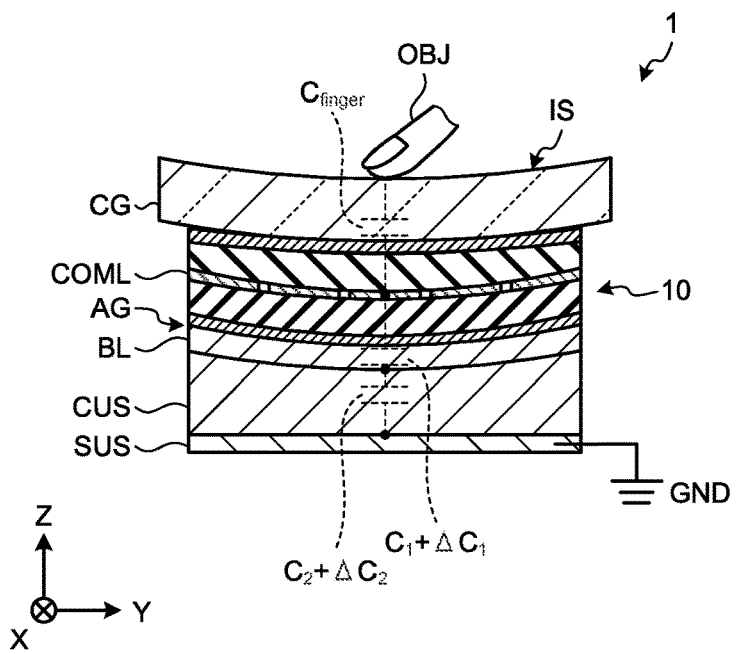
FIG. 22 is a sectional view illustrating a configuration of the display apparatus with a touch detection function according to the embodiment.

FIG. 22 is a sectional view illustrating a configuration of the display apparatus with a touch detection function according to the embodiment. As illustrated in FIG. 22, when the object to be detected OBJ further applies strong force to the input surface IS, the display device 10 with a touch detection function is bent, the thickness of the air layer AG reaches zero, the display device 10 with a touch detection function comes in contact with the backlight apparatus BL, and the cushion layer CUS is compressed and elastically deformed.

When the cushion layer CUS is compressed and elastically deformed, the distance between the cushion layer CUS and the electrode SUS becomes short, and thus the capacitance between the cushion layer CUS and the electrode SUS is increased by $\Delta C_2$ to become $(C_2 + \Delta C_2)$. Therefore, the capacitance between the drive electrode COML and the electrode SUS becomes the capacitance $C_3=1/(1/(C_1+\Delta C_1)+1/(C_2+\Delta C_2))$. The display apparatus 1 with a touch detection function detects the force on the basis of the capacitance $C_3$ between the drive electrode COML and the electrode SUS.

Figure 23:
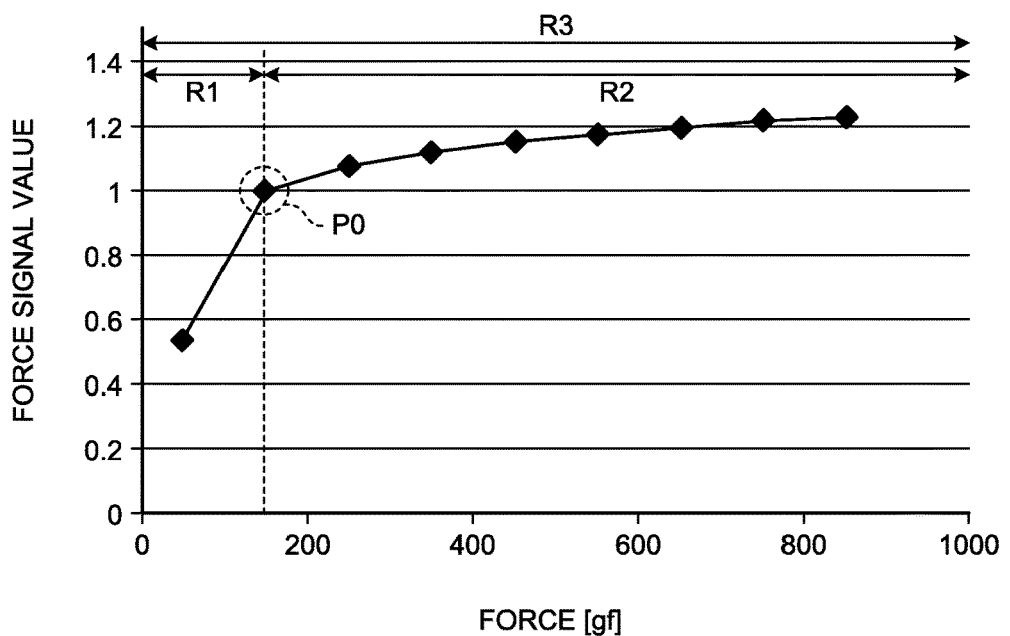
FIG. 23 is a graph for describing a relationship between force applied to the display apparatus with a touch detection function and a force signal value according to the embodiment.

FIG. 23 is a graph for describing a relationship between force applied to the display apparatus with a touch detection function and a force signal value according to the embodiment. In FIG. 23, the horizontal axis represents the force (g weight) applied to the input surface IS. The vertical axis represents a force signal value $C_{sig}$ detected on the basis of the capacitance $C_3$ between the drive electrode COML and the electrode SUS. The force signal value $C_{sig}$ is a signal value on the basis of the detection signal Vdet3 output from the drive electrode COML according to the basic principle of the self-capacitive touch detection.

The force signal value $C_{sig}$ is an example of "force signal value before correction" of the present invention.

In a first range R1 of force in which only the air layer AG becomes thin and the cushion layer CUS is not deformed, the relationship between the force and the force signal value becomes linear.

Similarly, in second range R2 of force in which the thickness of the air layer AG reaches zero and the cushion layer CUS is elastically deformed according to force, the relationship between the force and the force signal value becomes linear.

However, permittivity of the air layer AG and permittivity of the cushion layer CUS are different. The degree of change of the thickness of the air layer AG with respect to the force and the degree of change of the thickness of the cushion layer CUS with respect to the force are different. Examples of the degree of change of the thickness of the cushion layer CUS with respect to the force include Young's modulus. The cushion layer CUS is less easily deformed than the air layer AG. Therefore, in a boundary between the first range R1 and the second range R2, an inflection point P0 occurs in the relationship between the force and the force signal value. Therefore, in the entire range R3 that is a combination of the first range R1 and the second range R2, the relationship between the force and the force signal value is not linear. Therefore, the display apparatus 1 with a touch detection function cannot favorably detect the force. That is, the display apparatus 1 with a touch detection function cannot improve detection accuracy of the force.

In FIG. 23, the scales of the vertical axis are normalized, where the force signal value at the inflection point P0 is "1".

Figure 24:
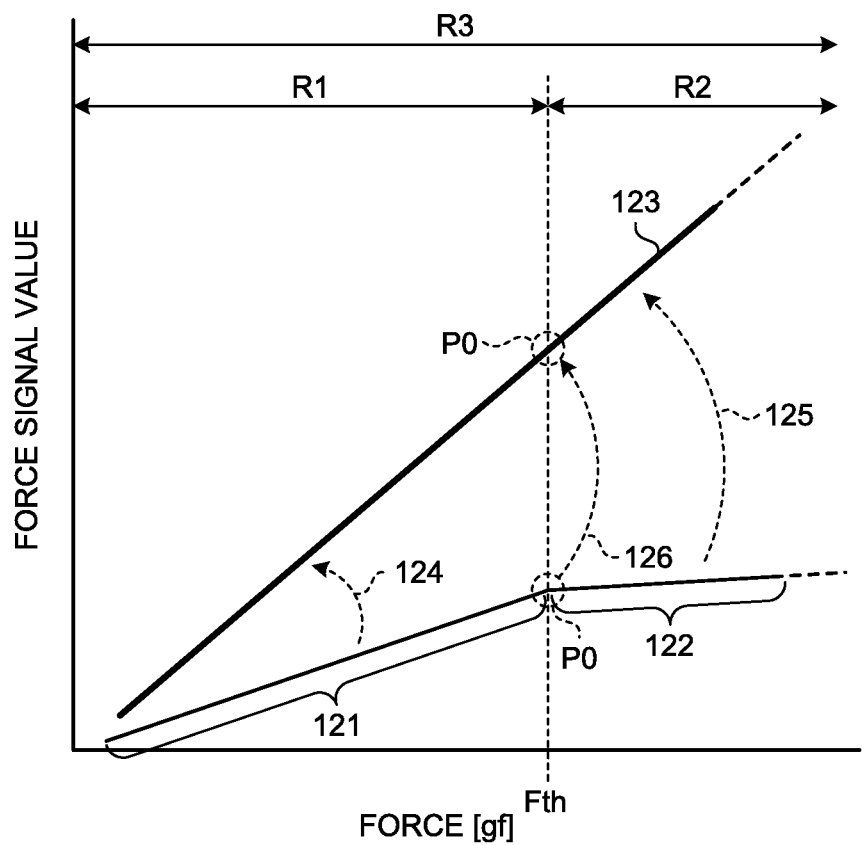
FIG. 24 is a diagram for describing a principle of force detection of the display apparatus with a touch detection function according to the embodiment.

FIG. 24 is a graph for describing a principle of force detection of the display apparatus with a touch detection function according to the embodiment. In FIG. 24, the horizontal axis represents the force (g weight) and the vertical axis represents the force signal value. The force at the inflection point P0 is a force threshold Fth. The force threshold Fth indicates the boundary between the first range R1 and the second range R2.

When force $F_{sig}$ calculated on the basis of the force signal value $C_{sig}$ falls within the first range R1 of the force threshold Fth or less, the force detection controller 50 changes an inclination of a line 121 that indicates the relationship between the force and the force signal value toward an inclination of a target straight line 123. For example, the force detection controller 50 calculates a force signal value $C_{force}$ after correction, by the following expression (1):

$$C_{force}=\alpha \cdot F_{sig} \qquad (1)$$

In the expression (1), $\alpha$ is a predetermined first constant. The first constant $\alpha$ is a value that changes the inclination of the line 121 that indicates the relationship between the force and the force signal value toward the inclination of the target straight line 123 in the first range R1 of force, the first range R1 being a range in which only the thickness of the air layer AG becomes thin and the cushion layer CUS is not deformed. The line 121 is shifted in the direction of an arrow 124 to overlap with the target straight line 123 according to $\alpha \cdot F_{sig}$ on the right side of the expression (1).

When the force $F_{sig}$ calculated on the basis of the force signal value $C_{sig}$ falls within the second range R2 that is larger than the force threshold Fth, the force detection controller 50 changes an inclination of a line 122 that indicates the relationship between the force and the force signal value toward the inclination of the target straight line 123. For example, the force detection controller 50 calculates the force signal value $C_{force}$ after correction, by the following expression (2):

$$C_{force}=\alpha \cdot Fth + \beta(F_{sig}-Fth) \qquad (2)$$

In the expression (2), $\beta$ is a predetermined second constant. The second constant $\beta$ is a value that changes the inclination of the line 122 that indicates the relationship between the force and the force signal value toward the inclination of the target straight line 123 in the second range R2 of force, the second range R2 being a range in which the thickness of the air layer AG reaches zero and the cushion layer CUS is elastically deformed according to the force.

The inflection point P0 is shifted in the direction of an arrow 126 to overlap with the target straight line 123 according to the first term $\alpha \cdot Fth$ on the right side of the expression (2). The line 122 is shifted in the direction of an arrow 125 to overlap with the target straight line 123 according to the second term $\beta(F_{sig}-Fth)$ on the right side of the expression (2).

The inclination of the target straight line 123 can be an arbitrary inclination. The first constant $\alpha$ can be determined in advance on the basis of the inclination of the target straight line 123 and the inclination of the line 121. The second constant $\beta$ can be determined in advance on the basis of the inclination of the target straight line 123 and the inclination of the line 122.

Therefore, the relationship between the force and the force signal value overlaps with the target straight line 123 in the entire range R3 that is a combination of the first range R1 and the second range R2. That is, the display apparatus 1 with a touch detection function can make the relationship between the force and the force signal value linear. Therefore, the display apparatus 1 with a touch detection function can favorably detect the force. That is, the display apparatus 1 with a touch detection function can improve the detection accuracy of the force.

3-2. Further Solvable First Problem and Solution Principle

Figure 25:
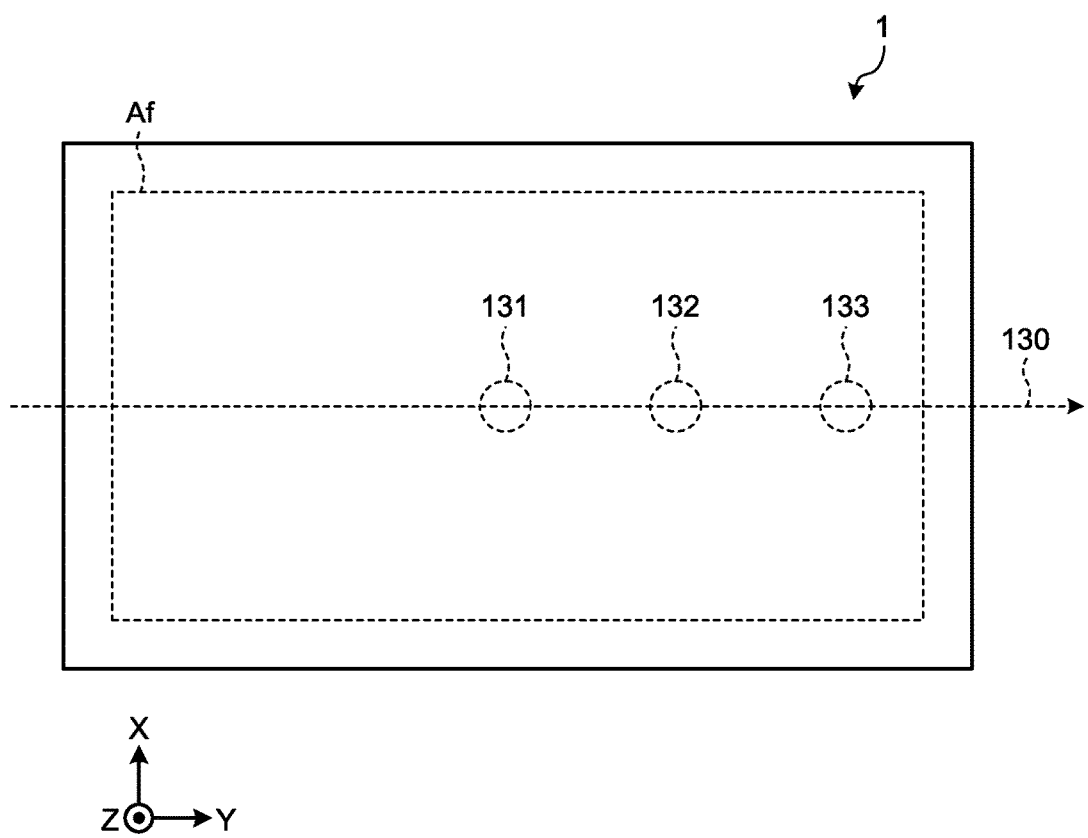
FIG. 25 is a plan view of the display apparatus with a touch detection function according to the embodiment.

FIG. 25 is a plan view of the display apparatus with a touch detection function according to the embodiment. In a force detection region Af, assume a straight line 130 parallel to the Y-axis direction and passing through the center of the force detection region Af in the X-axis direction.

A region 131 is a region positioned on the straight line 130 and in a central portion of the force detection region Af. A region 133 is a region positioned on the straight line 130 and in a peripheral portion of the force detection region Af. A region 132 is a region on the straight line 130 and between the region 131 and the region 133.

A region in or near the central portion of the display device 10 with a touch detection function is more easily bent than a region in or near the peripheral portion. In other words, a bending amount (deformation amount) of the display device 10 with a touch detection function when a certain force is applied to a region in or near the central portion of the display device 10 with a touch detection function is larger than a bending amount of the display device 10 with a touch detection function when the same force is applied to a region in or near the peripheral portion of the display device 10 with a touch detection function.

That is, the bending amount of the display device 10 with a touch detection function when a certain force is applied to the region 131 is larger than the bending amount of the display device 10 with a touch detection function when the same force is applied to the region 132. The bending amount of the display device 10 with a touch detection function when the same force is applied to the region 132 is smaller than the bending amount of the display device 10 with a touch detection function when the same force is applied to the region 131, and is larger than the bending amount of the display device 10 with a touch detection function when the same force is applied to the region 133.

Figure 26:
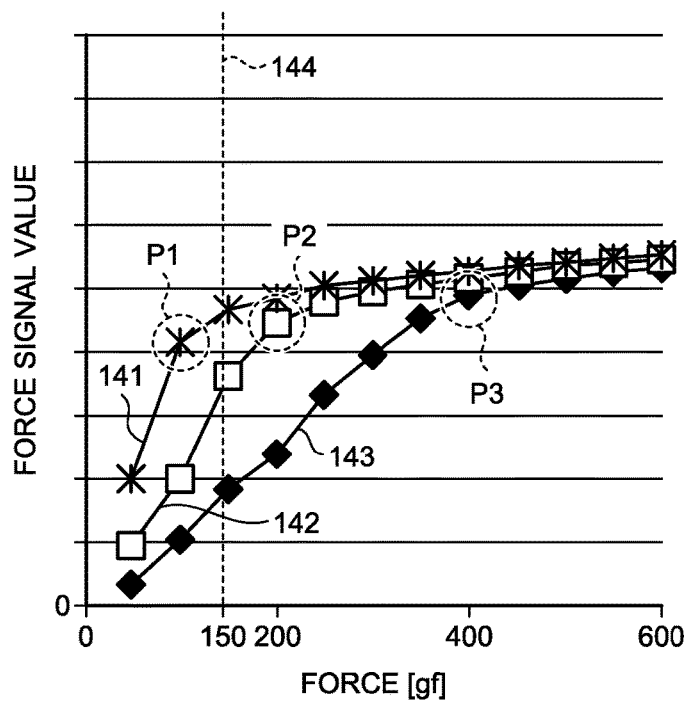
FIG. 26 is a graph for describing a relationship between force applied to the display apparatus with a touch detection function and a force signal value according to the embodiment.

FIG. 26 is a graph for describing a relationship between force applied to the display apparatus with a touch detection function and a force signal value according to the embodiment. In FIG. 26, the horizontal axis represents the force (g weight) and the vertical axis represents the force signal value.

In FIG. 26, a line 141 indicates the relationship between the force and the force signal value in the region 131 (see FIG. 25). A line 142 indicates the relationship between the force and the force signal value in the region 132 (see FIG. 25). A line 143 indicates the relationship between the force and the force signal value in the region 133 (see FIG. 25).

The region 131 of the display device 10 with a touch detection function is more easily bent than the region 132. That is, a force by which the thickness of the air layer AG reaches zero when the force is applied to the region 131 of the display device 10 with a touch detection function is smaller than a force by which the thickness of the air layer AG reaches zero when the force is applied to the region 132. Therefore, the force at an inflection point P1 of the line 141 is smaller than the force at an inflection point P2 of the line 142.

The region 132 of the display device 10 with a touch detection function is more easily bent than the region 133. That is, a force by which the thickness of the air layer AG reaches zero when the force is applied to the region 132 of the display device 10 with a touch detection function is smaller than a force by which the thickness of the air layer AG reaches zero when the force is applied to the region 133. Therefore, the force at the inflection point P2 of the line 142 is smaller than the force at an inflection point P3 of the line 143.

Consider use of 150 g weight as the force threshold Fth for all the regions 131, 132, and 133. A line 144 indicates the force threshold Fth equal to 150 g weight.

Figure 27:
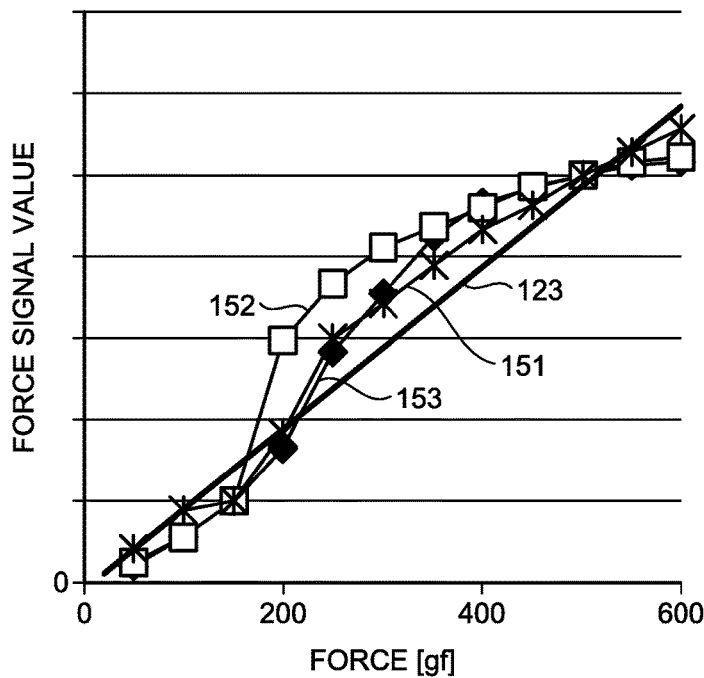
FIG. 27 is a graph for describing the principle of force detection of the display apparatus with a touch detection function according to the embodiment.

FIG. 27 is a graph for describing the principle of force detection of the display apparatus with a touch detection function according to the embodiment. In FIG. 27, the horizontal axis represents the force (g weight) and the vertical axis represents the force signal value.

In FIG. 27, a line 151 is obtained by correcting the line 141 (see FIG. 26) that indicates the relationship between the force and the force signal value in the region 131 (see FIG. 25), by the expressions (1) and (2), using the force threshold Fth equal to 150 g weight.

A line 152 is obtained by correcting the line 142 (see FIG. 26) that indicates the relationship between the force and the force signal value in the region 132 (see FIG. 25), by the expressions (1) and (2), using the force threshold Fth equal to 150 g weight.

A line 153 is obtained by correcting the line 143 (see FIG. 26) that indicates the relationship between the force and the force signal value in the region 133 (see FIG. 25), by the expressions (1) and (2), using the force threshold Fth equal to 150 g weight.

As illustrated in FIG. 27, the lines 151, 152, and 153 have a first problem that an amount of deviation from the target straight line 123 is large and the lines become curved. This is because the force threshold Fth equal to 150 g weight is used in all the regions 131, 132, and 133.

Therefore, the display apparatus 1 with a touch detection function solves the first problem by use of a different force threshold for every set of coordinates to which force is applied.

Figure 28:
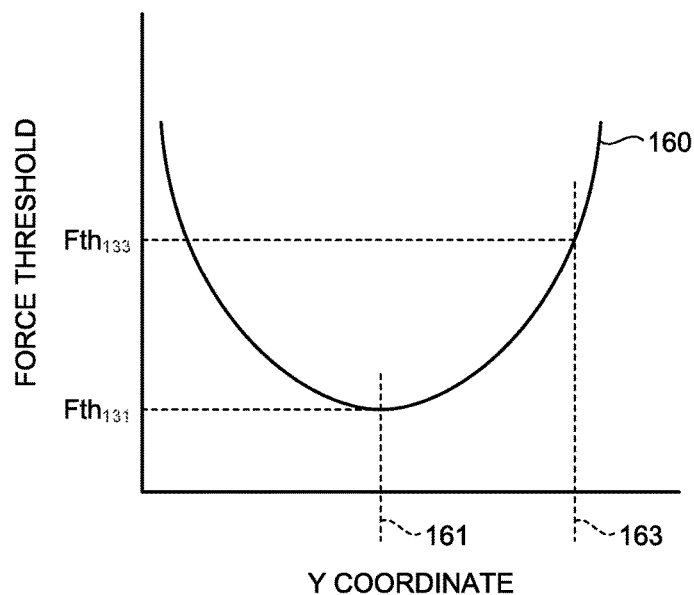
FIG. 28 is a graph for describing a relationship between a Y coordinate of a region to which force is applied and a force threshold, of the display apparatus with a touch detection function according to the embodiment.

FIG. 28 is a graph for describing a relationship between a Y coordinate of a region to which force is applied and a force threshold, of the display apparatus with a touch detection function according to the embodiment. In FIG. 28, the horizontal axis represents the Y coordinate and the vertical axis represents the force threshold.

In FIG. 28, a line 160 indicates the force threshold in the Y coordinates. A line 161 indicates the Y coordinate of the region 131, and a line 163 indicates the Y coordinate of the region 133.

The region 131 of the display device 10 with a touch detection function is most easily bent. Therefore, the line 160 is minimized at a point intersecting with the line 161. The force threshold for this point is $Fth_{131}$.

The region 133 of the display device 10 with a touch detection function is less easily bent than the region 131. The force threshold for a point where the line 160 and the line 161 intersect is $Fth_{133}$.

Figure 29:
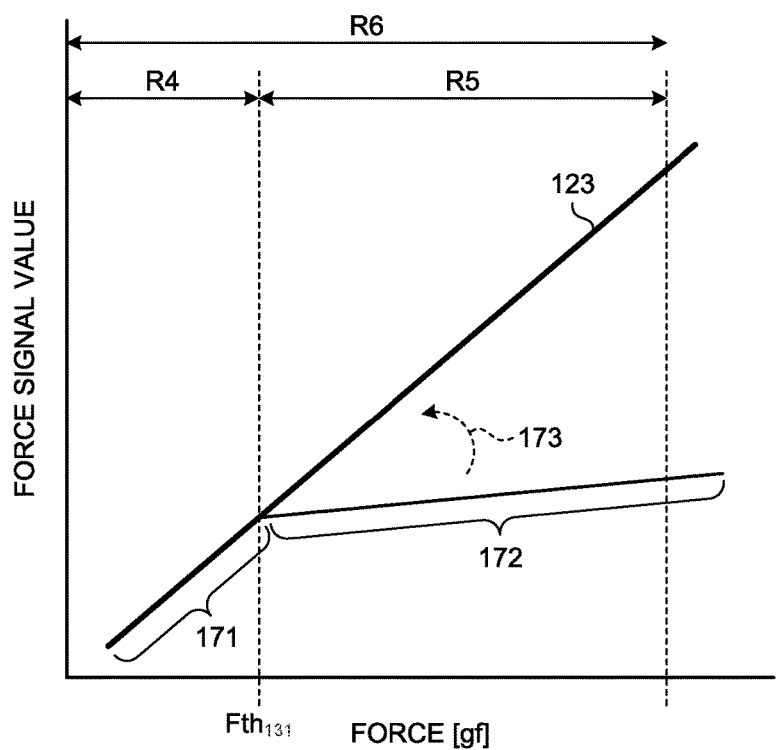
FIG. 29 is a graph for describing the principle of force detection of the display apparatus with a touch detection function according to the embodiment.

FIG. 29 is a graph for describing the principle of force detection of the display apparatus with a touch detection function according to the embodiment. In FIG. 29, the horizontal axis represents the force (g weight) and the vertical axis represents the force signal value. FIG. 29 is a graph illustrating the relationship between the force and the force signal value in the region 131 (see FIG. 25).

The display apparatus 1 with a touch detection function changes an inclination of a line 171 that indicates the relationship between the force and the force signal value toward the inclination of the target straight line 123 when the force $F_{sig}$ calculated on the basis of the force signal value $C_{sig}$ falls within a first range R4 of a force threshold $Fth_{131}$ or less. To be specific, the display apparatus 1 with a touch detection function calculates the force signal value $C_{force}$ after correction, by the expression (1). In the example of FIG. 29, the line 171 coincides with the target straight line 123, and thus the first constant α=1.

When the force $F_{sig}$ calculated on the basis of the force signal value $C_{sig}$ falls within a second range R5 that is larger than the force threshold $Fth_{131}$, the display apparatus 1 with a touch detection function changes the inclination of a line 172 that indicates the relationship between the force and the force signal value toward the inclination of the target straight line 123. To be specific, the display apparatus 1 with a touch detection function calculates the force signal value $C_{force}$ after correction, by the expression (2). With this change, the line 172 is shifted in the direction of an arrow 173 to overlap with the target straight line 123.

Therefore, the relationship between the force and the force signal value overlaps with the target straight line 123 in the entire range R6 that is a combination of the first range R4 and the second range R5. That is, the display apparatus 1 with a touch detection function can make the relationship between the force and the force signal value linear. Therefore, the display apparatus 1 with a touch detection function can favorably detect the force. That is, the display apparatus 1 with a touch detection function can improve the detection accuracy of the force.

Figure 30:
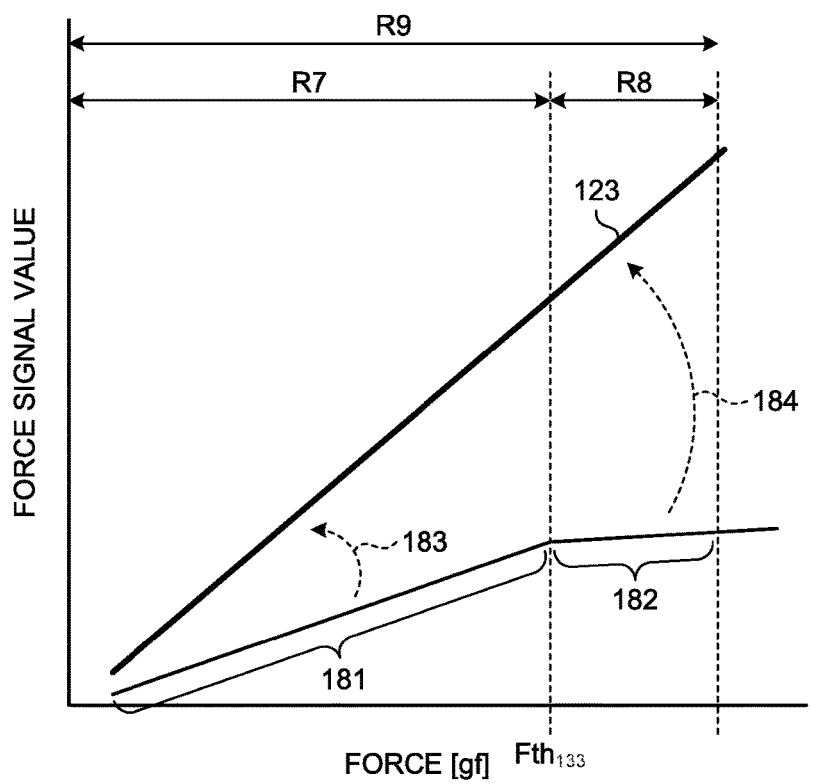
FIG. 30 is a graph for describing the principle of force detection of the display apparatus with a touch detection function according to the embodiment.

FIG. 30 is a graph for describing the principle of force detection of the display apparatus with a touch detection function according to the embodiment. In FIG. 30, the horizontal axis represents the force (g weight) and the vertical axis represents the force signal value. FIG. 30 is a graph illustrating the relationship between the force and the force signal value in the region 133 (see FIG. 25).

When the force $F_{sig}$ calculated on the basis of the force signal value $C_{sig}$ falls within a first range R7 of a force threshold $Fth_{133}$ or less, the display apparatus 1 with a touch detection function changes an inclination of a line 181 that indicates the relationship between the force and the force signal value toward the inclination of the target straight line 123. To be specific, the display apparatus 1 with a touch detection function calculates the force signal value $C_{force}$ after correction, by the expression (1). With this change, the line 181 is shifted in the direction of an arrow 183 to overlap with the target straight line 123.

When the force $F_{sig}$ calculated on the basis of the force signal value $C_{sig}$ falls within a second range R8 that is larger than the force threshold $Fth_{133}$, the display apparatus 1 with a touch detection function changes an inclination of a line 182 that indicates the relationship between the force and the force signal value toward the inclination of the target straight line 123. To be specific, the display apparatus 1 with a touch detection function calculates the force signal value $C_{force}$ after correction, by the expression (2). With this change, the line 182 is shifted in the direction of an arrow 184 to overlap with the target straight line 123.

Therefore, in the entire range R9 that is a combination of the first range R7 and the second range R8, the relationship between the force and the force signal value overlaps with the target straight line 123. That is, the display apparatus 1 with a touch detection function can make the relationship between the force and the force signal value linear. Therefore, the display apparatus 1 with a touch detection function can favorably detect the force. That is, display apparatus 1 with a touch detection function can improve the detection accuracy of the force.

Figure 31:
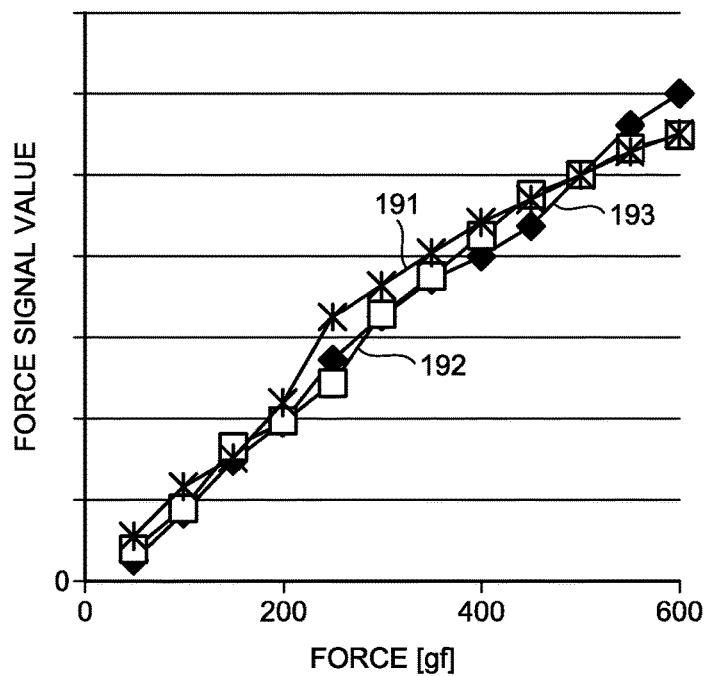
FIG. 31 is a graph for describing the principle of force detection of the display apparatus with a touch detection function according to the embodiment.

FIG. 31 is a graph for describing the principle of force detection of the display apparatus with a touch detection function according to the embodiment. In FIG. 31, the horizontal axis represents the force (g weight) and the vertical axis represents the force signal value.

In FIG. 31, a line 191 is obtained by correcting the line 141 (see FIG. 26) that indicates the relationship between the force and the force signal value in the region 131 (see FIG. 25), by the expressions (1) and (2), using the force threshold $Fth_{131}$ illustrated in FIG. 28.

A line 192 is obtained by correcting the line 142 (see FIG. 26) that indicates the relationship between the force and the force signal value in the region 132 (see FIG. 25), by the expressions (1) and (2), using the force threshold illustrated in FIG. 28.

A line 193 is obtained by correcting the line 143 (see FIG. 26) that indicates the relationship between the force and the force signal value in the region 133 (see FIG. 25), by the expressions (1) and (2), using the force threshold $Fth_{133}$ illustrated in FIG. 28.

Comparing FIGS. 27 and 31, the lines 191, 192, and 193 illustrated in FIG. 31 are nearly linear, unlike the lines 151, 152, and 153 of FIG. 27. This is because a different force threshold is used in each region 131, 132, and 133.

In this way, the display apparatus 1 with a touch detection function can solve the first problem by use of the different force threshold for each coordinate to which the force is applied.

In the above description, the case in which the regions 131, 132, and 133 exist on the straight line 130 (see FIG. 25) has been described. However, in reality, the force detection region Af is two dimensional, as illustrated in FIG. 25. Therefore, the display apparatus 1 with a touch detection function uses a different force threshold for every X-Y coordinates set to which the force is applied.

Figure 32:
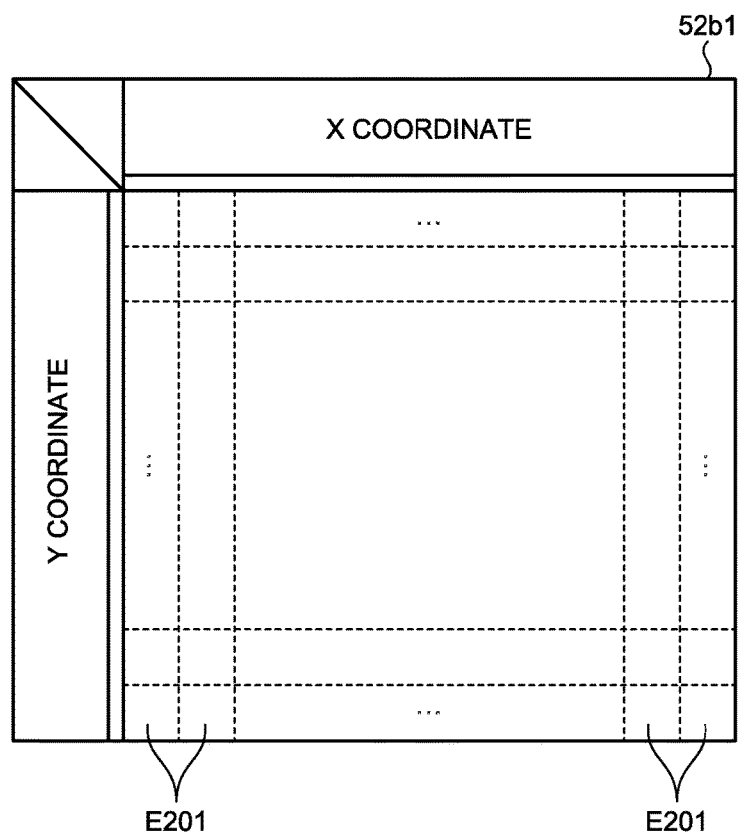
FIG. 32 is a diagram illustrating a force threshold table of the display apparatus with a touch detection function according to the embodiment.

FIG. 32 is a diagram illustrating a force threshold table of the display apparatus with a touch detection function according to the embodiment. A force threshold table 52b1 is a two-dimensional table stored in a storage 52 described below in the force detection controller 50. The horizontal direction of the force threshold table 52b1 corresponds to the X coordinate, and the vertical direction corresponds to the Y coordinate. Each of elements E201 in the force threshold table 52b1 stores the force threshold corresponding to coordinates identified by the X coordinate and the Y coordinate. The force threshold table 52b1 stores a plurality of the force thresholds, each of which indicates a boundary between the first range and the second range in association with the coordinates of the force detection region Af. The first range is a range of force in which the air layer AG is deformed and the cushion layer CUS is not deformed, and the second range is a range of force in which the air layer AG and the cushion layer CUS are deformed.

Figure 33:
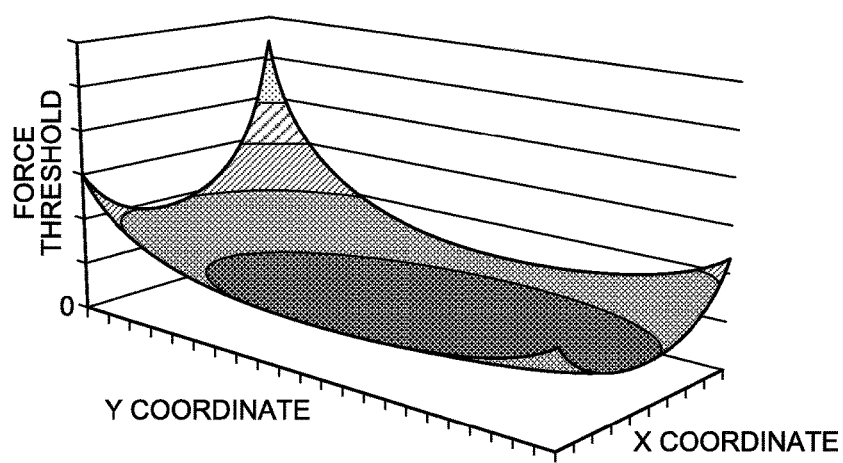
FIG. 33 is a graph plotting a plurality of force thresholds stored in a force threshold table of the display apparatus with a touch detection function according to the embodiment.

FIG. 33 is a graph plotting a plurality of force thresholds stored in a force threshold table of the display apparatus with a touch detection function according to the embodiment. FIG. 33 is a graph plotting the plurality of force thresholds stored in the elements E201 in the force threshold table 52b1, in association with the X coordinates and the Y coordinates corresponding to the elements E201.

As illustrated in FIG. 33, the force threshold is large in peripheral portions of coordinates, that is, in the peripheral portions of the force detection region Af, and is small in a central portion of coordinates, that is, in the central portion of the force detection region Af.

Figure 34:
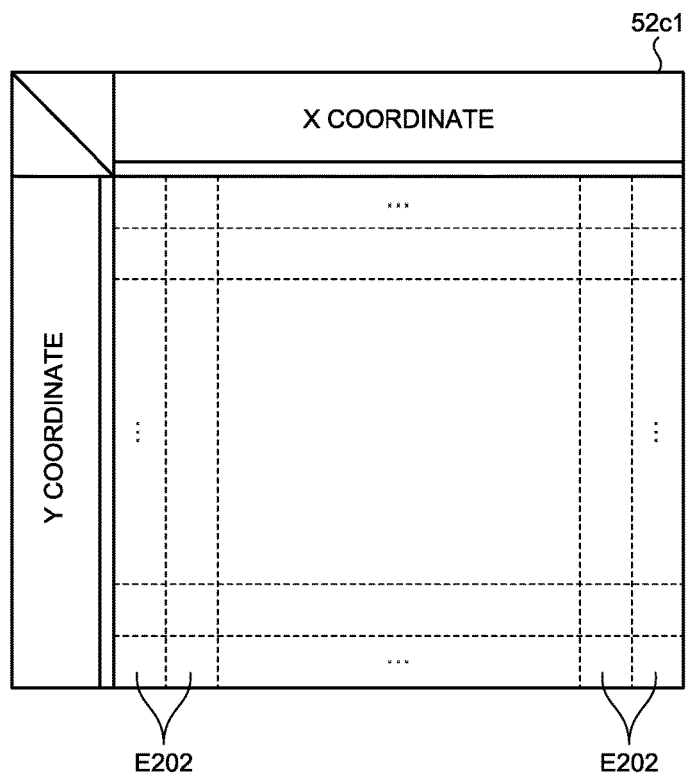
FIG. 34 is a diagram illustrating a first constant table of the display apparatus with a touch detection function according to the embodiment.

FIG. 34 is a diagram illustrating a first constant table of the display apparatus with a touch detection function according to the embodiment. A first constant table 52c1 is a two-dimensional table stored in the storage 52 described below in the force detection controller 50. The horizontal direction of the first constant table 52c1 corresponds to the X coordinate and the vertical direction corresponds to the Y coordinate. Each of elements E202 in the first constant table 52c1 stores a first constant α corresponding to coordinates identified by the X coordinate and the Y coordinate. The first constant table 52c1 stores a plurality of the predetermined first constants α, in association with the coordinates of the force detection region Af.

Figure 35:
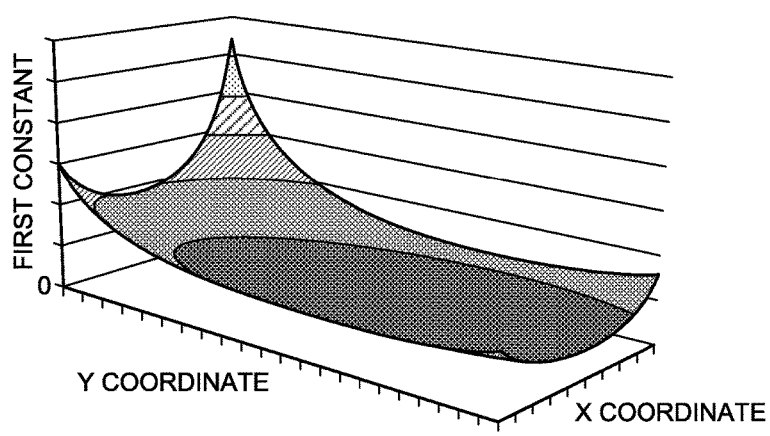
FIG. 35 is a graph plotting a plurality of first constants stored in the first constant table of the display apparatus with a touch detection function according to the embodiment.

FIG. 35 is a graph plotting a plurality of first constants stored in the first constant table of the display apparatus with a touch detection function according to the embodiment. FIG. 35 is a graph plotting the plurality of first constants α stored in the elements E202 in the first constant table 52c1, in association with the X coordinates and the Y coordinates corresponding to the elements E202.

As illustrated in FIG. 35, the first constant α is large in peripheral portions of coordinates, that is, in the peripheral portions of the force detection region Af, and is small in a central portion of coordinates, that is, in the central portion of the force detection region Af.

Figure 36:
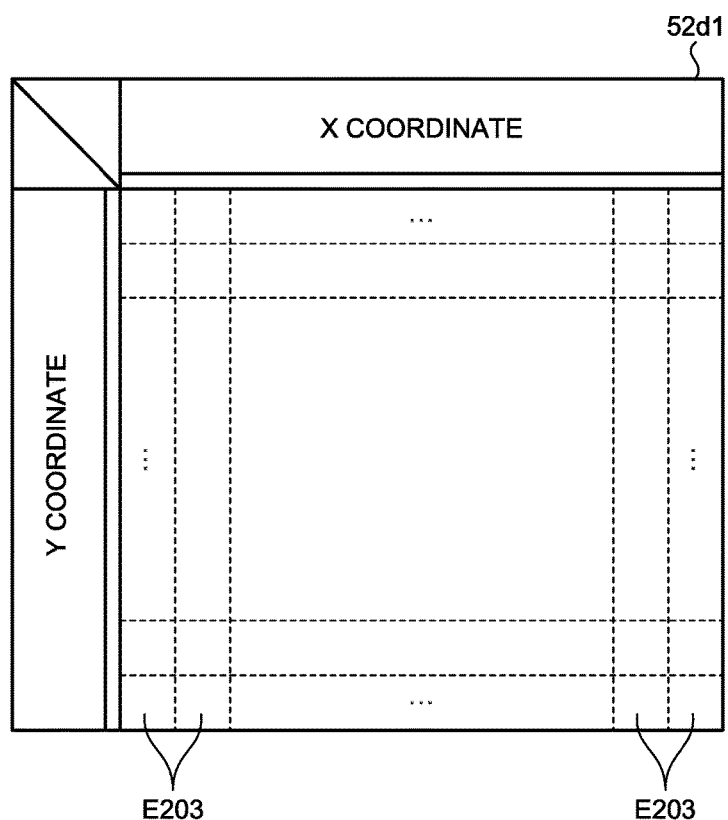
FIG. 36 is a diagram illustrating a second constant table of the display apparatus with a touch detection function according to the embodiment.

FIG. 36 is a diagram illustrating a second constant table of the display apparatus with a touch detection function according to the embodiment. A second constant table 52$d$1 is a two-dimensional table stored in the storage 52 described below in the force detection controller 50. The horizontal direction of the second constant table 52$d$1 corresponds to the X coordinate and the vertical direction corresponds to the Y coordinate. Each of elements E203 in the second constant table 52$d$1 stores the second constant β corresponding to coordinates identified by the X coordinate and the Y coordinate. The second constant table 52$d$1 stores a plurality of the predetermined second constants β, in association with the coordinates of the force detection region Af.

Figure 37:
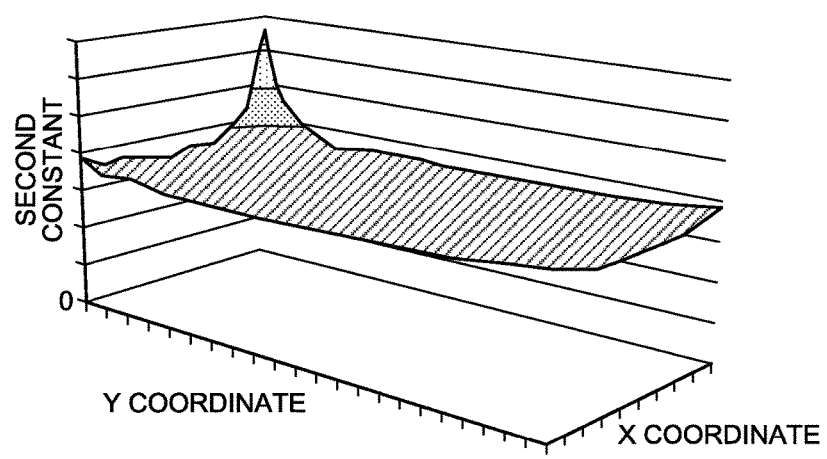
FIG. 37 is a graph plotting a plurality of second constants stored in the second constant table of the display apparatus with a touch detection function according to the embodiment.

FIG. 37 is a graph plotting a plurality of second constants stored in the second constant table of the display apparatus with a touch detection function according to the embodiment. FIG. 37 is a graph plotting the plurality of second constants β stored in the elements E203 in the second constant table 52$d$1, in association with the X coordinates and the Y coordinates corresponding to the elements E203.

As illustrated in FIG. 37, the second constant β is large in peripheral portions of coordinates, that is, in the peripheral portions of the force detection region Af, and is small in a central portion of coordinates, that is, in the central portion of the force detection region Af.

3-3. Further Solvable Second Problem and Solution Principle

The display apparatuses 1 with a touch detection function have individual differences. To be specific, the display apparatuses 1 with a touch detection function vary in the thickness of the air layer AG, that is, a gap length of the air layer AG. If the thickness of the air layer AG is different, the force by which the thickness of the air layer AG reaches zero is different. That is, the above-described position of the inflection point is different.

In the embodiment, a design value of the thickness of the air layer AG while no force is applied is 80 μm.

Figure 38:
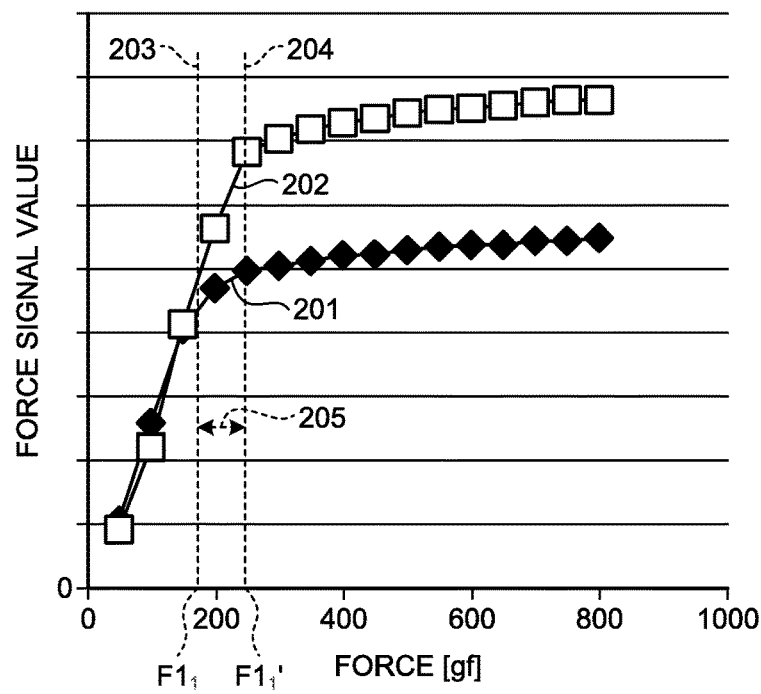
FIG. 38 is a graph for describing a relationship between force applied to the display apparatus with a touch detection function and a force signal value according to the embodiment.

FIG. 38 is a graph for describing a relationship between force applied to the display apparatus with a touch detection function and a force signal value according to the embodiment. In FIG. 38, the horizontal axis represents the force (g weight) and the vertical axis represents the force signal value.

In FIG. 38, a line 201 indicates the relationship between the force and the force signal value in the region 131 (see FIG. 25) of an individual display apparatus with the air layer AG having the thickness of the design value (80 μm). A line 202 indicates the relationship between the force and the force signal value in the region 131 of an individual display apparatus with the air layer AG having the thickness of 180 μm.

A line 203 indicates force (force threshold) $F1_1$ by which the thickness of the air layer AG reaches zero in the region 131 of the individual display apparatus with the air layer AG having the thickness of the design value (80 μm). That is, the inflection point in the region 131 of the individual display apparatus with the air layer AG having the thickness of design value (80 μm) is positioned at an intersection of the line 201 and the line 203.

A line 204 indicates force (force threshold) $F1_1'$ by which the thickness of the air layer AG reaches zero in the region 131 of the individual display apparatus with the air layer AG having the thickness of 180 μm. That is, the inflection point in the region 131 of the individual display apparatus with the air layer AG having the thickness of 180 μm is positioned at an intersection of the line 202 and the line 204.

As illustrated in FIG. 38, the force $F1_1'$ by which the thickness of the air layer AG reaches zero in the region 131 of the individual display apparatus with the air layer AG having the thickness of 180 μm is larger than the force $F1_1$ by which the thickness of the air layer AG reaches zero in the region 131 of the individual display apparatus with the air layer AG having the thickness of the design value (80 μm). That is, the inflection point in the region 131 of the individual display apparatus with the air layer AG having the thickness of 180 μm is positioned on a higher force side by a difference 205 than the inflection point in the region 131 of the individual display apparatus with the air layer AG having the thickness of the design value (80 μm).

Figure 39:
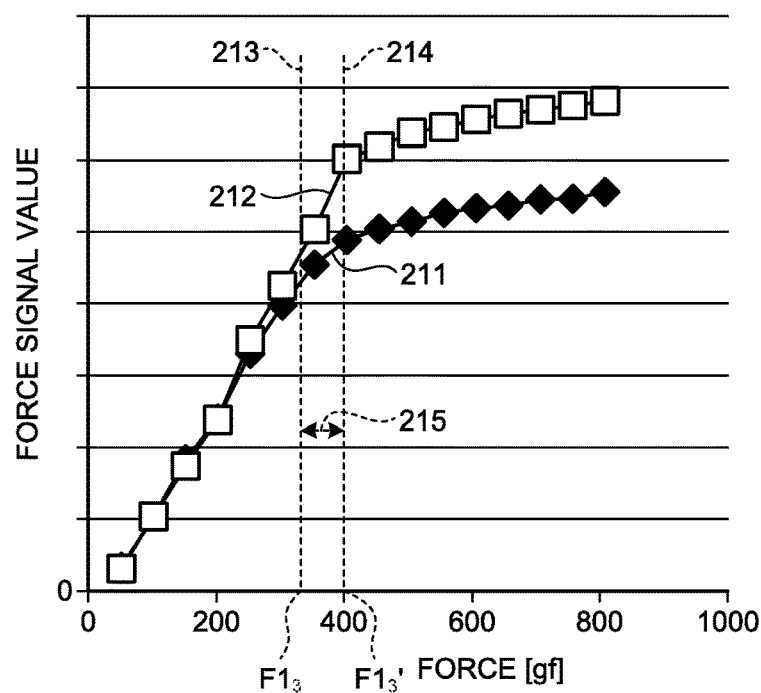
FIG. 39 is a graph for describing a relationship between force applied to the display apparatus with a touch detection function and a force signal value according to the embodiment.

FIG. 39 is a graph for describing a relationship between force applied to the display apparatus with a touch detection function and a force signal value according to the embodiment. In FIG. 39, the horizontal axis represents the force (g weight) and the vertical axis represents the force signal value.

In FIG. 39, a line 211 indicates the relationship between the force and the force signal value in the region 133 (see FIG. 25) of the individual display apparatus with the air layer AG having the thickness of the design value (80 μm).

A line 212 indicates the relationship between the force and the force signal value, in the region 133 of the individual display apparatus with the air layer AG having the thickness of 180 μm.

A line 213 indicates force (force threshold) $F1_3$ by which the thickness of the air layer AG reaches zero in the region 133 of the individual display apparatus with the air layer AG having the thickness of the design value (80 μm). That is, the inflection point in the region 133 of the individual display apparatus with the air layer AG having the thickness of the design value (80 μm), is positioned at an intersection of the line 211 and the line 213.

A line 214 indicates force (force threshold) $F1_3'$ by which the thickness of the air layer AG reaches zero in the region 133 of the individual display apparatus with the air layer AG having the thickness of the 180 μm. That is, the inflection point in the region 133 of the individual display apparatus with the air layer AG having the thickness of 180 μm is positioned at an intersection of the line 212 and the line 214.

As illustrated in FIG. 39, the force $F1_3'$ by which the thickness of the air layer AG reaches zero in the region 133 of the individual display apparatus with the air layer AG having the thickness of 180 μm is larger than the force $F1_3$ by which the thickness of the air layer AG reaches zero in the region 133 of the individual display apparatus with the air layer AG having the thickness of the design value (80 μm). That is, the inflection point in the region 133 of the individual display apparatus with the air layer AG having the thickness of 180 μm is positioned on a higher force side by a difference 215 than the inflection point in the region 133 of the individual display apparatus with the air layer AG having the thickness of the design value (80 μm).

Figure 40:
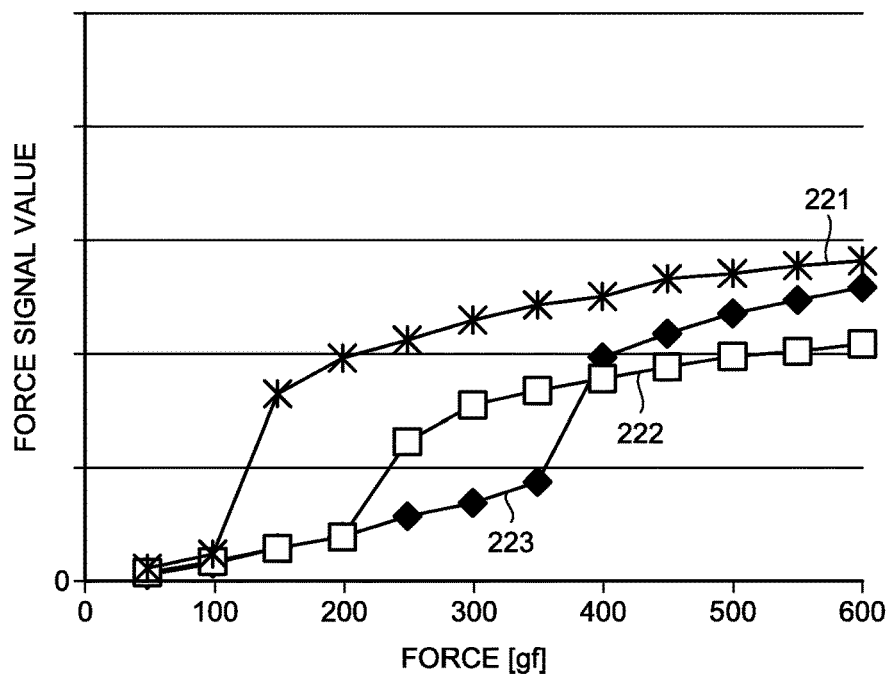
FIG. 40 is a graph for describing the principle of force detection of the display apparatus with a touch detection function according to the embodiment.

FIG. 40 is a graph for describing the principle of force detection of the display apparatus with a touch detection function according to the embodiment. In FIG. 40, the horizontal axis represents the force (g weight) and the vertical axis represents the force signal value.

In FIG. 40, a line 221 is obtained by correcting the line 202 (see FIG. 38) that indicates the relationship between the force and the force signal value in the region 131 (see FIG. 25) of the individual display apparatus with the air layer AG having the thickness of 180 μm, by the expressions (1) and (2), using the force threshold for the region 131 (see FIG. 25) of the individual display apparatus with the air layer AG having the thickness of the design value (80 μm).

A line 222 is obtained by correcting a line that indicates the relationship between the force and the force signal value in the region 132 (see FIG. 25) of the individual display apparatus with the air layer AG having the thickness of 180 μm, by the expressions (1) and (2), using the force threshold for the region 132 (see FIG. 25) of the individual display apparatus with the air layer AG having the thickness of the design value (80 μm).

A line 223 is obtained by correcting the line 212 (see FIG. 39) that indicates the relationship between the force and the force signal value in the region 133 (see FIG. 25) of the individual display apparatus with the air layer AG having the thickness of 180 μm, by the expressions (1) and (2), using the force threshold for the region 133 (see FIG. 25) of the individual display apparatus with the air layer AG having the thickness of the design value (80 μm).

As illustrated in FIG. 40, there is the second problem that the lines 221, 222, and 223 are not linear and become curved. This is because the force threshold of the individual display apparatus with the air layer AG having the thickness of the design value (80 μm) is used as the force threshold of the individual display apparatus with the air layer AG having the thickness of 180 μm.

Therefore, the display apparatus 1 with a touch detection function solves the second problem by adjustment of a plurality of the force thresholds stored in the force threshold table 52b1 in accordance with an individual display apparatus.

Figure 41:
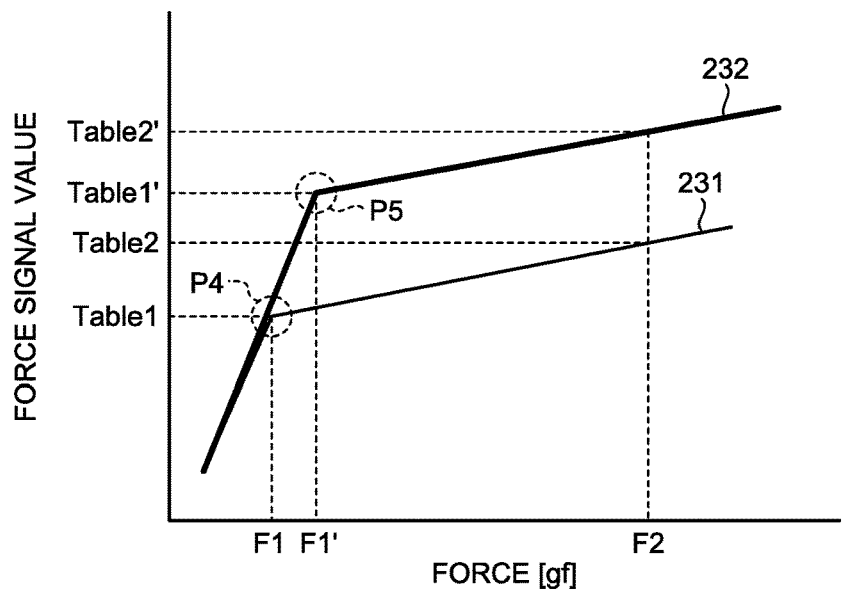
FIG. 41 is a graph for describing the principle of force detection of the display apparatus with a touch detection function according to the embodiment.

FIG. 41 is a graph for describing the principle of force detection of the display apparatus with a touch detection function according to the embodiment. In FIG. 41, the horizontal axis represents the force (g weight) and the vertical axis represents the force signal value.

In FIG. 41, a line 231 indicates the relationship between the force and the force signal value, in the individual display apparatus with the air layer AG having the thickness of the design value (80 μm). A line 232 indicates the relationship between the force and the force signal value, in the individual display apparatus with the air layer AG having the thickness (for example, 180 μm) different from the design value.

In the individual display apparatus with the air layer AG having the thickness of the design value (80 μm), the force at an inflection point P4 is F1, and the force signal value is Table1. The force F1 and the force signal value Table1 are known. In the individual display apparatus with the air layer AG having the thickness of the design value (80 μm), the force signal value at reference force F2 (note that F2>F1) is Table2. The reference force F2 and the force signal value Table2 are known.

In the individual display apparatus with the air layer AG having the thickness (for example, 180 μm) different from the design value, the force at an inflection point P5 is F1', and the force signal value is Table1'. The force F1' and the force signal value Table1' are unknown. In the individual display apparatus with the air layer AG having the thickness (for example, 180 μm) different from the design value, the force signal value at reference force F2 is Table2'. The reference force F2 is known and the force signal value Table2' is unknown.

For example, the position of the inflection point P5 can be identified by applying, with a jig, the force to the individual display apparatus with the air layer AG having the thickness (for example, 180 μm) different from the design value, while changing the force little by little approaching the force where the inflection point P5 is supposed to be positioned. That is, the force F1' and the force signal value Table1' at the inflection point P5 can be obtained. However, if the force is applied with a jig to the individual display apparatus with the air layer AG having the thickness (for example, 180 μm) different from the design value while changing the force little by little, the takt (time) becomes long, and it is thus not favorable.

In FIG. 41, the following expressions (3) and (4) are established:

$$\frac{(Table2' - Table1')}{(F2 - F1')} = \frac{(Table2 - Table1)}{(F2 - F1)} \qquad (3)$$

$$\frac{Table1'}{F1'} = \frac{Table1}{F1} \qquad (4)$$

The following expression (5) is derived from the expressions (3) and (4):

$$F1' = \frac{(Table2 - Table1) \cdot F2 - (F2 - F1) \cdot Table2'}{Table2 - \frac{F2}{F1} Table1} \qquad (5)$$

As illustrated in the expression (5), the force F1' can be calculated if the force signal value Table2' is obtained.

The following expression (6) is derived from the expressions (4) and (5):

$$Table1' = \frac{Table1}{F1} \cdot F1' \qquad (6)$$

As illustrated in the expression (6), the force signal value Table1' can be calculated if the force F1' can be calculated.

That is, the force F1' and the force signal value Table1' at the inflection point P5 can be calculated if the force signal value Table2' is obtained. The plurality of force thresholds stored in the force threshold table 52b1 can be adjusted in accordance with an individual display apparatus if the force F1' and the force signal value Table1' at the inflection point P5 can be calculated.

The force signal value Table2' is an example of "force signal value before correction at a reference force application" of the present invention.

As a technique to obtain the force signal value Table2', a technique to apply, with a jig, the reference force F2 to the display apparatus 1 with a touch detection function to detect the force signal value Table2' can be considered. However, this technique needs to apply the reference force F2 with a jig, and thus the takt time becomes long. Because of use of the jig, this technique needs to be performed at a preshipment inspection of the display apparatus 1 with a touch detection function. Therefore, there is a possibility that the plurality of force thresholds stored in the force threshold table 52b1 becomes unfavorable when the thickness of the air layer AG is changed due to temperature change or the like of the display apparatus 1 with a touch detection function, which is caused by use of the display apparatus 1 with a touch detection function by a user, after the shipment of the display apparatus 1 with a touch detection function.

Therefore, as another technique to obtain the force signal value Table2', the following technique can be considered.

The following technique can hold down an increase in the length of takt time because no jig is used. Because no jig is used, the plurality of force thresholds stored in the force threshold table 52b1 can be adjusted on a timely basis even if the thickness of the air layer AG is changed due to the temperature change or the like of the display apparatus 1 with a touch detection function after the shipment of the display apparatus 1 with a touch detection function.

Figure 42:
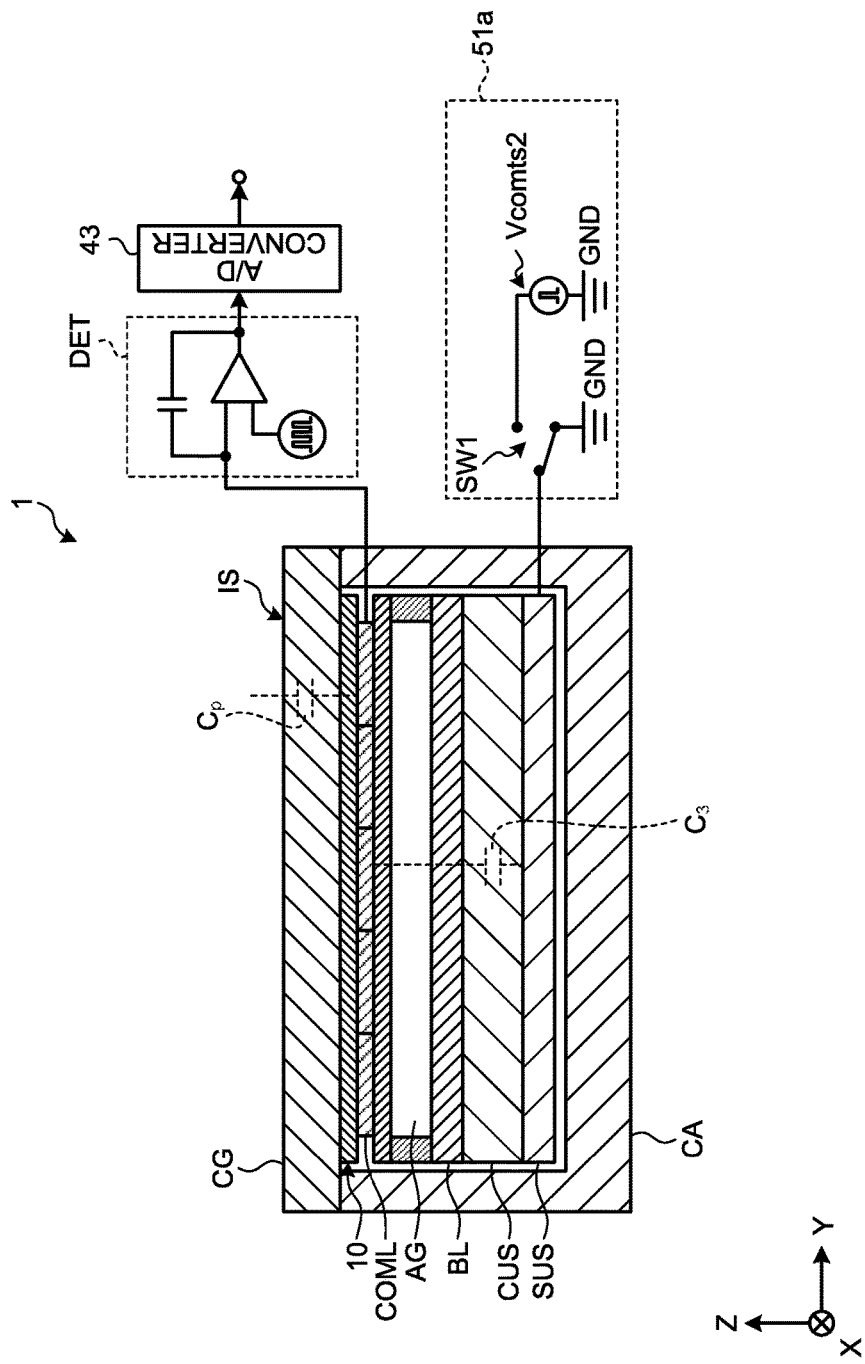
FIG. 42 is a diagram for describing the principle of force detection of the display apparatus with a touch detection function according to the embodiment.

FIG. 42 is a diagram illustrating the principle of force detection of the display apparatus with a touch detection function according to the embodiment. FIG. 42 illustrates the display apparatus 1 with a touch detection function when the object to be detected OBJ is neither in contact with nor in proximity to the input surface IS.

The drive electrode COML of the display apparatus 1 with a touch detection function is coupled with the voltage detector DET (see FIG. 8). An output signal of the voltage detector DET corresponds to the detection signal Vdet3 according to the basic principle of the self-capacitive touch detection. The A/D converter 43 (see FIG. 2) performs analog-to-digital conversion on the detection signal Vdet3, and the converted detection signal Vdet3 is input to the force detection controller 50 (see FIG. 1). The voltage detector DET and the A/D converter 43 can be used by the touch detection controller 40 (see FIG. 1) and the force detection controller 50.

The electrode SUS is coupled with a potential controller 51a. The potential controller 51a includes a switch SW1, and sets the potential of the electrode SUS to the reference potential (for example, the ground potential GND) or outputs a signal having the same phase and the same amplitude as the drive signal Vcomts2 to the electrode SUS. The potential controller 51a may be included in the force detection controller 50. In this disclosure, "the same phase" is the same phase or substantially the same phase, and "the same amplitude" is the same amplitude or substantially the same amplitude.

Parasitic capacitance $C_p$ due to a member included in the display apparatus 1 with a touch detection function exists in the drive electrode COML. When the object to be detected OBJ is neither in contact with nor in proximity to the input surface IS, the capacitance $C_3$ exists between the drive electrode COML and the electrode SUS.

When the potential controller 51a sets the potential of the electrode SUS to the reference potential, capacitance $C_{GND}$ caused in the drive electrode COML, which is detected by the voltage detector DET, is expressed by the following expression (7):

$$C_{GND}=C_p+C_3 \tag{7}$$

When the potential controller 51a outputs the signal having the same phase and the same amplitude as the drive signal Vcomts2 to the electrode SUS, both ends of the capacitance $C_3$ have the same phase and the same potential, and thus the capacitance $C_3$ can be considered to be zero. Therefore, capacitance $C_{Guard}$ caused in the drive electrode COML, which is detected by the voltage detector DET, is expressed by the following expression (8):

$$C_{Guard}=C_p \tag{8}$$

In this disclosure, "the same potential" is the same potential or substantially the same potential, and "zero" is zero or substantially zero.

The capacitance $C_3$ can be calculated by the following expression (9) derived from the expressions (7) and (8):

$$C_3=C_{GND}-C_{Guard} \tag{9}$$

Typically, capacitance C is defined by the following expression (10), using a counter area S of both electrodes, permittivity ε of a substance between both electrodes, and a distance d between both electrodes:

$$C=\varepsilon \cdot S/d \tag{10}$$

Therefore, the capacitance $C_3$ has a correlation with the distance between the drive electrode COML and the electrode SUS. Therefore, the capacitance $C_3$ has a correlation with the thickness of the air layer AG. Therefore, the capacitance $C_3$ has a correlation with the force signal value Table2'. Therefore, the thickness of the air layer AG has a correlation with the force signal value Table2'.

Therefore, a table that indicates information on the correlation between the capacitance $C_3$ and the force signal value Table2' is stored in the storage 52 described below in the force detection controller 50, and the force signal value Table2' can be obtained on the basis of the capacitance $C_3$ measured as described above.

Figures 43, 44:
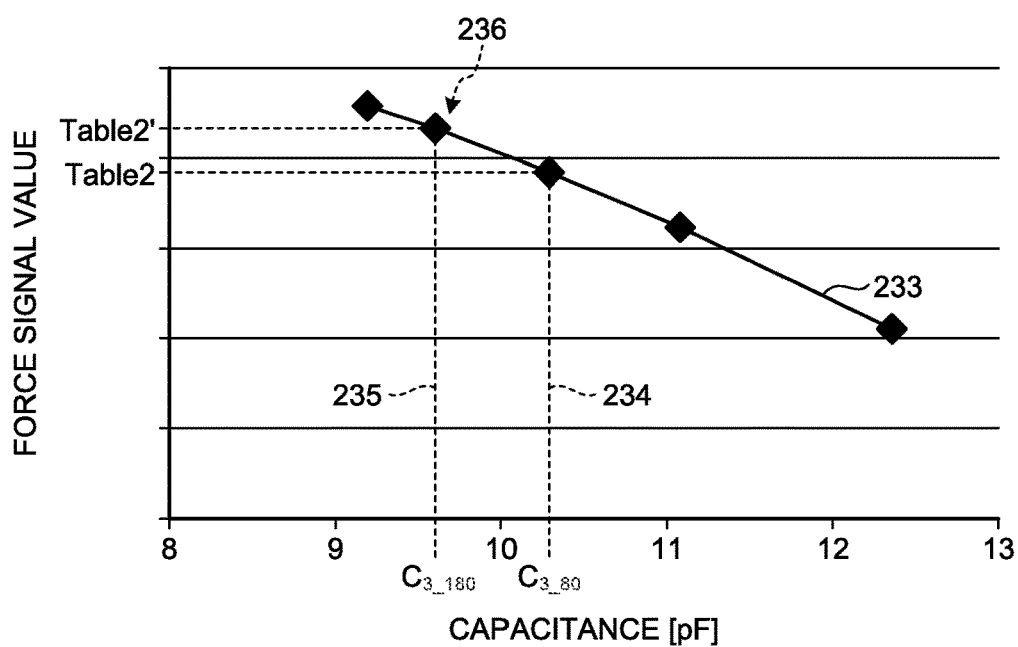
FIG. 43 is a diagram illustrating a correlation table of the display apparatus with a touch detection function according to the embodiment.
FIG. 44 is a graph plotting the correlation table of the display apparatus with a touch detection function according to the embodiment.

FIG. 43 is a diagram illustrating a correlation table of the display apparatus with a touch detection function according to the embodiment. A correlation table 52a1 is a one-dimensional table stored in the storage 52 described below in the force detection controller 50. In each of rows of the correlation table 52a1, the capacitance $C_3$ and the force signal value Table2' are stored in association with each other. The correlation table 52a1 indicates the correlation between the capacitance $C_3$ and the force signal value Table2'.

FIG. 44 is a graph plotting the correlation table of the display apparatus with a touch detection function according to the embodiment. In FIG. 44, the horizontal axis represents the capacitance (pF) and the vertical axis represents the force signal value. In FIG. 44, a line 233 indicates the correlation between the capacitance and the force signal value.

In FIG. 44, a line 234 indicates capacitance $C_{3\_80}$ of the individual display apparatus with the air layer AG having the thickness of the design value (80 μm). A line 235 indicates capacitance $C_{3\_180}$ of the individual display apparatus with the air layer AG having the thickness (for example, 180 μm) different from the design value.

The capacitance $C_{3\_180}$ of the individual display apparatus with the air layer AG having the thickness of 180 μm is smaller than the capacitance $C_{3\_80}$ of the individual display apparatus with the air layer AG having the thickness of the design value (80 μm). Therefore, the line 235 is positioned on a lower capacitance side relative to the line 234.

The force signal value Table1' of the individual display apparatus with the air layer AG having the thickness (for example, 180 μm) different from the design value can be obtained according to an intersection 236 of the line 233 and the line 235. Therefore, the force F1' and the force signal value Table1' at the inflection point P5 (see FIG. 41) can be calculated by the expressions (5) and (6). Since the force F1' and the force signal value Table1' at the inflection point P5 can be calculated, the force threshold can be adjusted in accordance with an individual display apparatus.

The plurality of force thresholds stored in the force threshold table 52b1 can be adjusted in accordance with an individual display apparatus by execution of calculation of the expressions (5) and (6) for the entire region of the force detection region Af.

Figure 45:
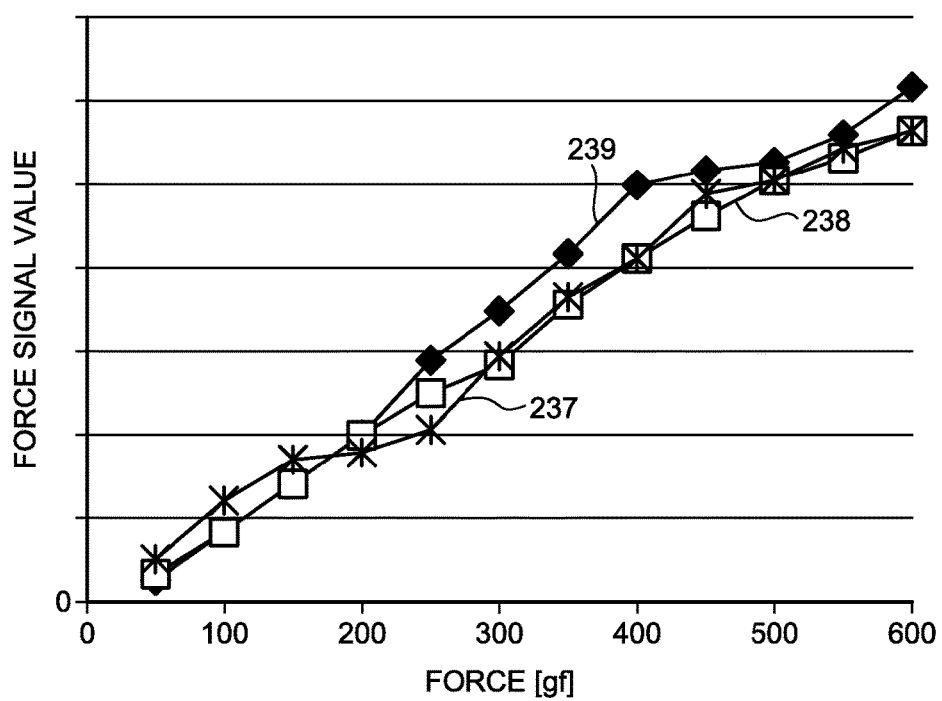
FIG. 45 is a graph for describing the principle of force detection of the display apparatus with a touch detection function according to the embodiment.

FIG. 45 is a graph for describing the principle of force detection of the display apparatus with a touch detection function according to the embodiment. In FIG. 45, the horizontal axis represents the force (g weight) and the vertical axis represents the force signal value.

In FIG. 45, a line 237 is obtained by correcting the line 202 (see FIG. 38) that indicates the relationship between the force and the force signal value in the region 131 (see FIG. 25) of the individual display apparatus with the air layer AG having the thickness (for example, 180 μm) different from the design value, by the expressions (1) and (2), using the force threshold table 52b1 after adjustment in accordance with the individual display apparatus.

A line 238 is obtained by correcting a line that indicates the relationship between the force and the force signal value in the region 132 (see FIG. 25) of the individual display apparatus with the air layer AG having the thickness (for example, 180 μm) different from the design value, by the expressions (1) and (2), using the force threshold table 52b1 after adjustment in accordance with the individual display apparatus.

A line 239 is obtained by correcting the line 212 (see FIG. 39) that indicates the relationship between the force and the force signal value in the region 133 (see FIG. 25) of the individual display apparatus with the air layer AG having the thickness (for example, 180 μm) different from the design value, by the expressions (1) and (2), using the force threshold table 52b1 after adjustment in accordance with the individual display apparatus.

Comparing FIGS. 40 and 45, the lines 237, 238, and 239 of FIG. 45 are nearly linear, unlike the lines 221, 222, and 223 of FIG. 40. This is because the force threshold table 52b1 after adjustment in accordance with the individual display apparatus is used.

In this way, the display apparatus 1 with a touch detection function can solve the second problem by adjustment of the plurality of force thresholds stored in the force threshold table 52b1 in accordance with an individual display apparatus.

4. Configuration and Operation of Force Detection Controller

Figure 46:
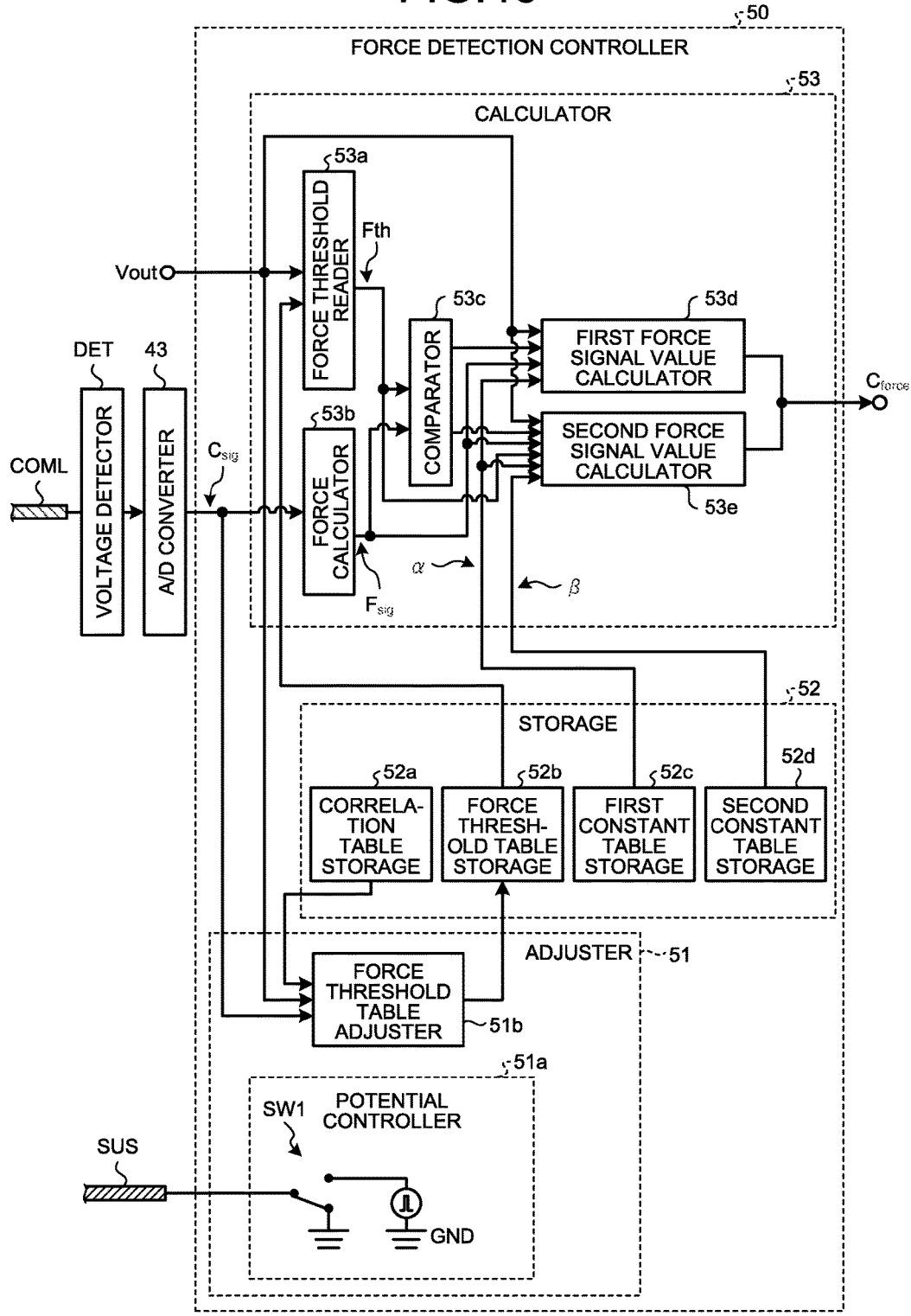
FIG. 46 is a diagram illustrating function blocks of a force detection controller of the display apparatus with a touch detection function according to the embodiment.

FIG. 46 is a diagram illustrating function blocks of the force detection controller of the display apparatus with a touch detection function according to the embodiment. The force detection controller 50 includes an adjuster 51, the storage 52, and a calculator 53.

In the first range in which the air layer AG is deformed and the cushion layer CUS is not deformed, the force detection controller 50 calculates the force signal value $C_{force}$ after correction, based on a product of the predetermined first constant α and the force $F_{sig}$. In the second range in which the air layer AG and the cushion layer CUS are deformed, the force detection controller 50 calculates the force signal value after correction, based on a sum of a first product and a second product. The first product is a product of the force threshold Fth and the first constant α, and the second product is a product of a difference between the force $F_{sig}$ and the force threshold Fth, and the second constant β.

The adjuster 51 includes a potential controller 51a and a force threshold table adjuster 51b. The storage 52 includes a correlation table storage 52a, a force threshold table storage 52b, a first constant table storage 52c, and a second constant table storage 52d. The calculator 53 includes a force threshold reader 53a, a force calculator 53b, a comparator 53c, a first force signal value calculator 53d, and a second force signal value calculator 53e.

The force threshold table adjuster 51b, the force threshold reader 53a, the force calculator 53b, the comparator 53c, the first force signal value calculator 53d, and the second force signal value calculator 53e may be realized by execution of programs by the COG 19, the touch IC 49, or the host HST. Alternatively, the force threshold table adjuster 51b, the force threshold reader 53a, the force calculator 53b, the comparator 53c, the first force signal value calculator 53d, and the second force signal value calculator 53e may be realized by execution of programs by two or more of the COG 19, the touch IC 49, and the host HST in cooperation with one another.

The switch SW1 of the potential controller 51a may be controlled by the host HST or may be controlled by the force threshold table adjuster 51b.

The force threshold table adjuster 51b checks the capacitance $C_3$ based on the force signal value $C_{sig}$ output from the A/D converter 43, against the correlation table 52a1 stored in the correlation table storage 52a, to obtain the force signal value Table2'. Then, the force threshold table adjuster 51b executes the calculation of the expressions (5) and (6) on the basis of the force signal value Table2', for the entire region of the force detection region Af, to adjust the plurality of force thresholds stored in the force threshold table 52b1 according to an individual display apparatus.

The force threshold reader 53a reads the force threshold Fth corresponding to the coordinates in the force detection region Af, to which the force is applied, from the force threshold table 52b1 stored in the force threshold table storage 52b on the basis of the signal Vout output from the touch detection controller 40 (see FIG. 2).

The force calculator 53b calculates the force $F_{sig}$ on the basis of the force signal value $C_{sig}$ output from the A/D converter 43.

The comparator 53c compares the force threshold Fth read by the force threshold reader 53a and the force $F_{sig}$ calculated by the force calculator 53b, and determines whether the force $F_{sig}$ is equal to or less than the force threshold Fth or whether the force $F_{sig}$ is larger than the force threshold Fth.

When the comparator 53c determines that the force $F_{sig}$ is equal to or less than the force threshold Fth, the first force signal value calculator 53d reads the first constant α corresponding to the coordinates in the force detection region Af, to which the force is applied, from the first constant table 52c1 stored in the first constant table storage 52c on the basis of the signal Vout output from the touch detection controller 40 (see FIG. 2). Then, the first force signal value calculator 53d executes the calculation of the expression (1), using the first constant α, to output the force signal value $C_{force}$ after correction.

When the comparator 53c determines that the force $F_{sig}$ is larger than the force threshold Fth, the second force signal value calculator 53e reads the first constant α corresponding to the coordinates in the force detection region Af, to which the force is applied, from the first constant table 52c1 stored in the first constant table storage 52c on the basis of the signal Vout output from the touch detection controller 40 (see FIG. 2). The second force signal value calculator 53e also reads the second constant β corresponding to the coordinates in the force detection region Af, to which the force is applied, from the second constant table 52d1 stored in the second constant table storage 52d on the basis of the signal Vout. Then, the second force signal value calculator 53e executes the calculation of the expression (2), using the force threshold Fth, the first constant α, and the second constant β, to output the force signal value $C_{force}$ after correction.

Examples of the storage 52 include a volatile memory and a rewritable non-volatile memory. Examples of the volatile memory include a random access memory (RAM). Examples of the re-writable non-volatile memory include a flash memory (registered trademark). When the storage 52 is the volatile memory, the correlation table 52*a*1, the force threshold table 52*b*1, the first constant table 52*c*1, and the second constant table 52*d*1 may be transferred from the host HST to the storage 52 at initialization (for example, at power-on or return from sleep of the display apparatus 1 with a touch detection function). When the storage 52 is the non-volatile memory, the correlation table 52*a*1, the force threshold table 52*b*1, the first constant table 52*c*1, and the second constant table 52*d*1 may be written in the storage 52 at shipment of the display apparatus 1 with a touch detection function.

Figure 47:
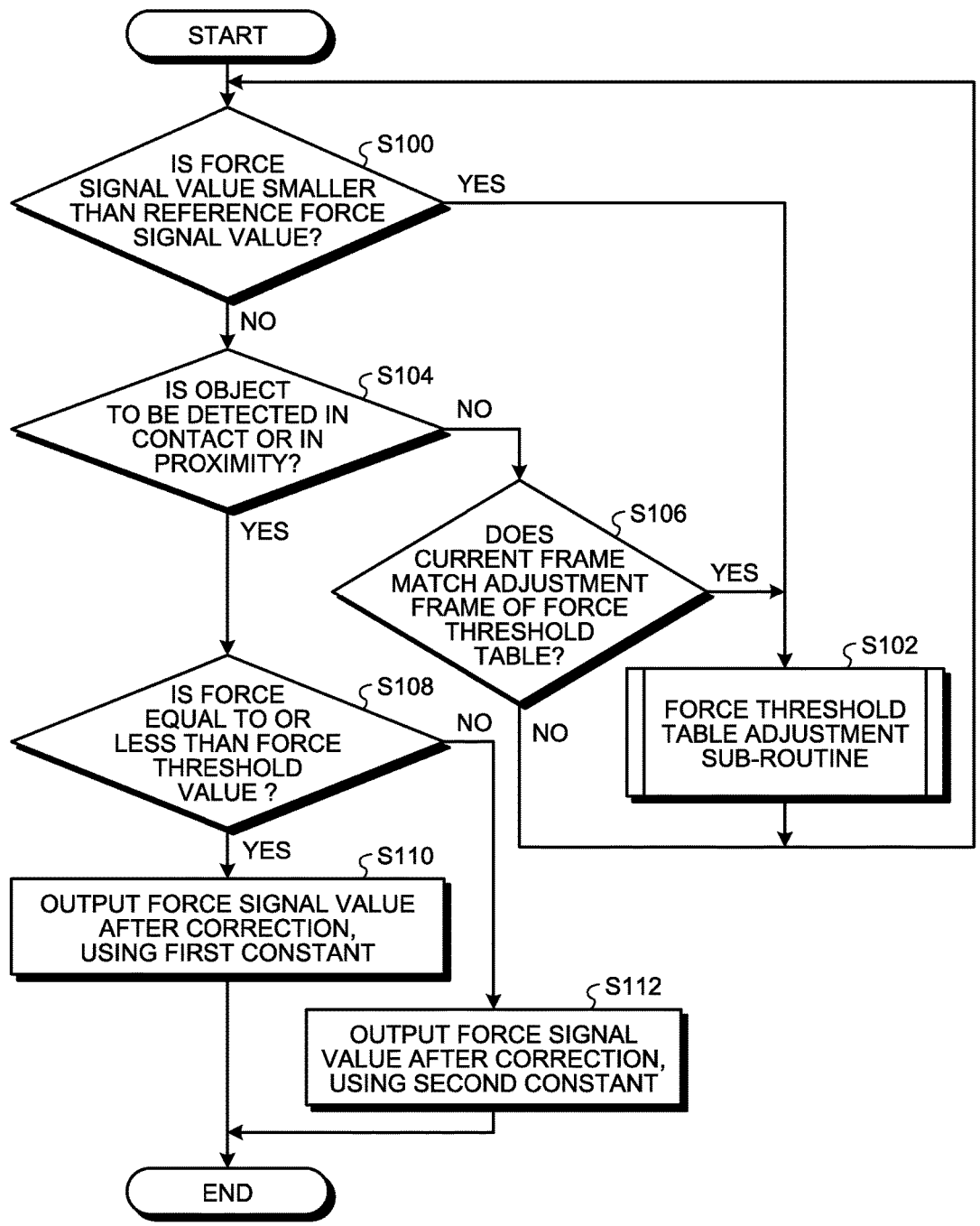
FIG. 47 is a flowchart illustrating processing executed by the force detection controller of the display apparatus with a touch detection function according to the embodiment.

FIG. 47 is a flowchart illustrating processing executed by the force detection controller of the display apparatus with a touch detection function according to the embodiment. Processing illustrated in FIG. 47 is executed at periodic or non-periodic force detection timing.

In Step S100, the force threshold table adjuster 51*b* determines whether the force signal value $C_{sig}$ is smaller than a reference force signal value (for example, 0). The reference force signal value is a force signal value when the force is not applied to the individual display apparatus with the air layer AG having the thickness of the design value (80 μm). When the force is applied to the force detection region Af, the force signal value $C_{sig}$ is increased but the force signal value $C_{sig}$ is not decreased. Therefore, the force threshold table adjuster 51*b* can determine that adjustment of the force threshold table 52*b*1 is necessary when the force signal value $C_{sig}$ is smaller than the reference force signal value.

When the force threshold table adjuster 51*b* determines that the force signal value $C_{sig}$ is smaller than the reference force signal value (Yes in Step S100), the force threshold table adjuster 51*b* executes a force threshold table adjustment sub-routine in Step S102.

FIG. 48 is a flowchart illustrating processing executed by the force detection controller of the display apparatus with a touch detection function according to the embodiment. FIG. 48 is a flowchart illustrating the force threshold table adjustment sub-routine.

In Step S200, the potential controller 51*a* outputs the signal having the same phase and the same amplitude as the drive signal Vcomts2 to the electrode SUS.

In Step S202, the force threshold table adjuster 51*b* calculates the capacitance $C_3$ on the basis of the force signal value $C_{sig}$.

In Step S204, the force threshold table adjuster 51*b* checks the capacitance $C_3$ against the correlation table 52*a*1 stored in the correlation table storage 52*a* to obtain the force signal value Table2'.

In Step S206, the force threshold table adjuster 51*b* executes the calculation of the expressions (5) and (6) on the basis of the force signal value Table2', for the entire region of the force detection region Af, to adjust the plurality of force thresholds stored in the force threshold table 52*b*1 in accordance with an individual display apparatus. The force threshold table adjuster 51*b* terminates the force threshold table adjustment sub-routine.

Referring back to FIG. 47, when the force threshold table adjuster 51*b* determines that the force signal value $C_{sig}$ is not smaller than the reference force signal value (No in Step S100), the force threshold table adjuster 51*b* determines whether the object to be detected OBJ is in contact with or in proximity to the input surface IS on the basis of the signal Vout output from the touch detection controller 40 (see FIG. 2), in Step S104.

When the object to be detected OBJ is neither in contact with nor in proximity to the input surface IS, the capacitance $C_{finger}$ does not occur between the drive electrode COML and the object to be detected OBJ, and thus it is favorable for adjustment of the force threshold table 52*b*1.

When the force threshold table adjuster 51*b* determines that the object to be detected OBJ is neither in contact with nor in proximity to the input surface IS (No in Step S104), the force threshold table adjuster 51*b* determines whether a current frame matches an adjustment frame of the force threshold table, in Step S106. The adjustment frame is a frame coinciding with predetermined timing.

When the force threshold table adjuster 51*b* determines that the current frame matches the adjustment frame of the force threshold table (Yes in Step S106), the force threshold table adjuster 51*b* executes the force threshold table adjustment sub-routine in Step S102.

When the force threshold table adjuster 51*b* determines that the current frame does not match the adjustment frame of the force threshold table (No in Step S106), the processing proceeds to Step S100.

When the force threshold table adjuster 51*b* determines that the object to be detected OBJ is in contact with or in proximity to the input surface IS (Yes in Step S104), the comparator 53*c* determines whether the force $F_{sig}$ calculated by the force calculator 53*b* is equal to or less than the force threshold Fth read by the force threshold reader 53*a* in Step S108.

When the comparator 53*c* determines that the force $F_{sig}$ is equal to or less than the force threshold Fth (Yes in Step S108), the first force signal value calculator 53*d* reads the first constant α corresponding to the coordinates in the force detection region Af, to which the force is applied, from the first constant table 52*c*1 stored in the first constant table storage 52*c* on the basis of the signal Vout output from the touch detection controller 40 (see FIG. 2) in Step S110. Then, the first force signal value calculator 53*d* executes the calculation of the expression (1), using the first constant α, to calculate and output the force signal value $C_{force}$ after correction. The force signal value $C_{force}$ is output to the host HST, for example.

When the comparator 53*c* determines that the force $F_{sig}$ is not equal to or less than the force threshold Fth (No in Step S108), the second force signal value calculator 53*e* reads the first constant α corresponding to the coordinates in the force detection region Af, to which the force is applied, from the first constant table 52*c*1 stored in the first constant table storage 52*c* on the basis of the signal Vout output from the touch detection controller 40 (see FIG. 2) in Step S112. The second force signal value calculator 53*e* reads the second constant β corresponding to the coordinates in the force detection region Af, to which the force is applied from the second constant table 52*d*1 stored in the second constant table storage 52*d* on the basis of the signal Vout. Then, the second force signal value calculator 53*e* executes the calculation of the expression (2), using the force threshold Fth, the first constant α, and the second constant β, to calculate and output the force signal value $C_{force}$ after correction. The force signal value $C_{force}$ is output to the host HST, for example.

The display apparatus 1 with a touch detection function calculates the force signal value $C_{force}$ by the expressions (1) and (2), thereby to make the relationship between the force and the force signal value $C_{force}$ linear in the entire range. For example, the host HST can receive the force signal value $C_{force}$ having the linear relationship with the force in the entire range. Therefore, the display apparatus 1 with a touch detection function can favorably detect the force. That is, the display apparatus 1 with a touch detection function can improve the detection accuracy of the force.

FIG. 49 is a graph plotting force signal values obtained when the same force is applied to each region in a force detection region of the display apparatus with a touch detection function. FIG. 49 illustrates the force signal value $C_{sig}$ occurring when the same force is applied to each region in the force detection region Af of the display apparatus 1 with a touch detection function.

A region in or near the central portion of the display device 10 with a touch detection function is more easily bent than a region in or near the peripheral portion. In other words, the bending amount (deformation amount) of the display device 10 with a touch detection function when a certain force is applied to the region in or near the central portion of the display device 10 with a touch detection function is larger than the bending amount of the display device 10 with a touch detection function when the same force is applied to the region in or near the peripheral portion of the display device 10 with a touch detection function. Therefore, as illustrated in FIG. 49, the force signal value $C_{sig}$ of a region in or near the central portion is large and the force signal value $C_{sig}$ of a region in or near the peripheral portion is small when the same force is applied to each region in the force detection regions Af of the display apparatus 1 with a touch detection function.

Figure 50:
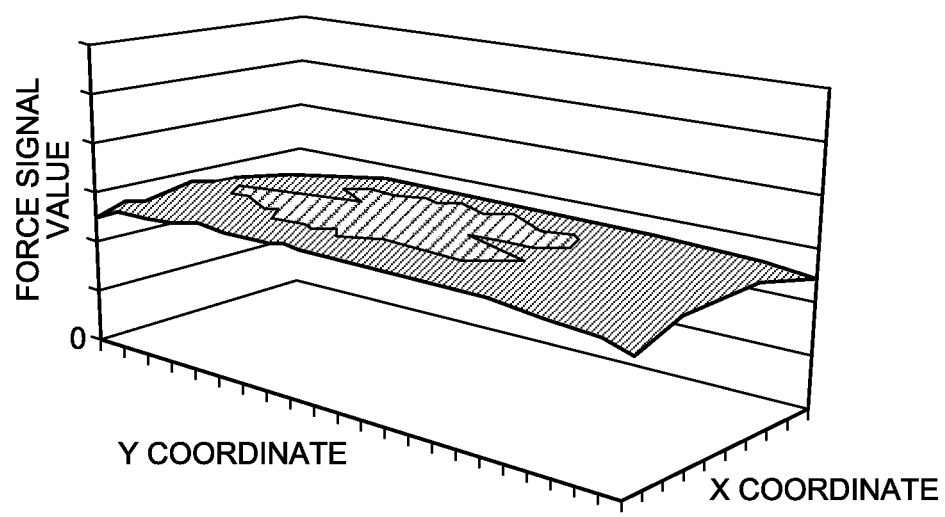
FIG. 50 is a graph plotting force signal values obtained when the same force is applied to each region in the force detection region of the display apparatus with a touch detection function.

FIG. 50 is a graph plotting force signal values obtained when the same force is applied to each region in a force detection region of the display apparatus with a touch detection function. FIG. 50 illustrates the force signal value $C_{force}$ output from the force detection controller 50 when the same force is applied to each region in the force detection region Af of the display apparatus 1 with a touch detection function.

As illustrated in FIG. 50, the force signal value $C_{force}$ of a region in or near the central portion and the force signal value $C_{force}$ of a region in or near the peripheral portion are substantially the same when the same force is applied to each region in the force detection region Af of the display apparatus 1 with a touch detection function.

In this way, the display apparatus 1 with a touch detection function can make the relationship between the force and the force signal value $C_{force}$ linear, regardless of the coordinates to which the force is applied, by use of a different force threshold for each set of coordinates to which the force is applied. Therefore, the display apparatus 1 with a touch detection function can favorably detect the force. That is, the display apparatus 1 with a touch detection function can improve the detection accuracy of the force.

The display apparatus 1 with a touch detection function can make the relationship between the force and the force signal value $C_{force}$ linear, regardless of an individual display apparatus, by adjustment of the plurality of force thresholds stored in the force threshold table 52b1 in accordance with an individual display apparatus. Therefore, the display apparatus 1 with a touch detection function can favorably detect the force. That is, the display apparatus 1 with a touch detection function can improve the detection accuracy of the force.

5. Modification 5-1. First Modification

Figure 51:
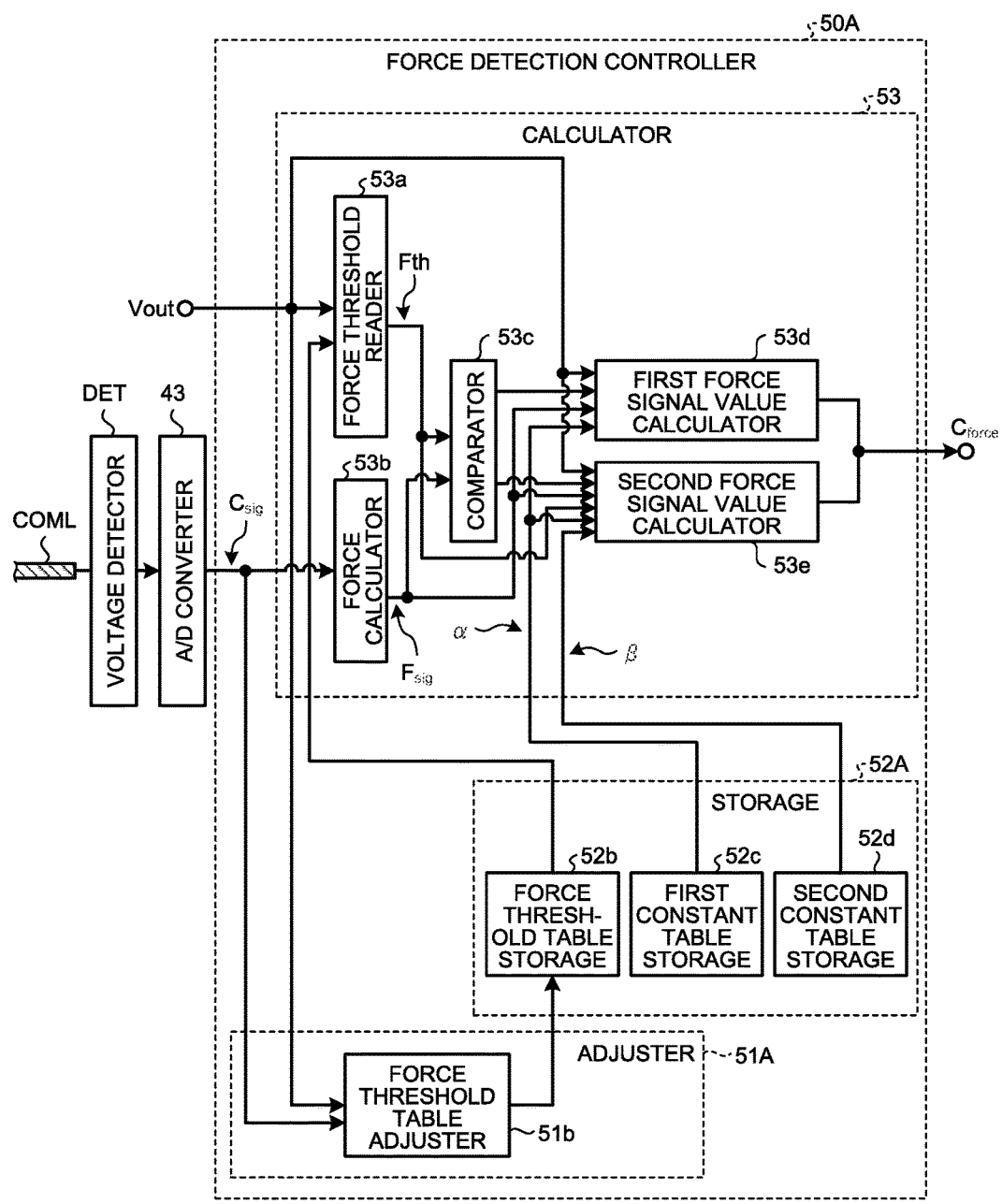
FIG. 51 is a diagram illustrating function blocks of a force detection controller of a display apparatus with a touch detection function according to a first modification.

FIG. 51 is a diagram illustrating function blocks of a force detection controller of a display apparatus with a touch detection function according to a first modification. In the first modification, the same elements as those in the embodiment are denoted with the same reference signs, and description is appropriately omitted.

A force detection controller 50A includes an adjuster 51A, a storage 52A, and a calculator 53. The adjuster 51A does not include the potential controller 51a included in the adjuster 51 illustrated in FIG. 46. The storage 52A does not include the correlation table storage 52a included in the storage 52 illustrated in FIG. 46.

Figure 52:
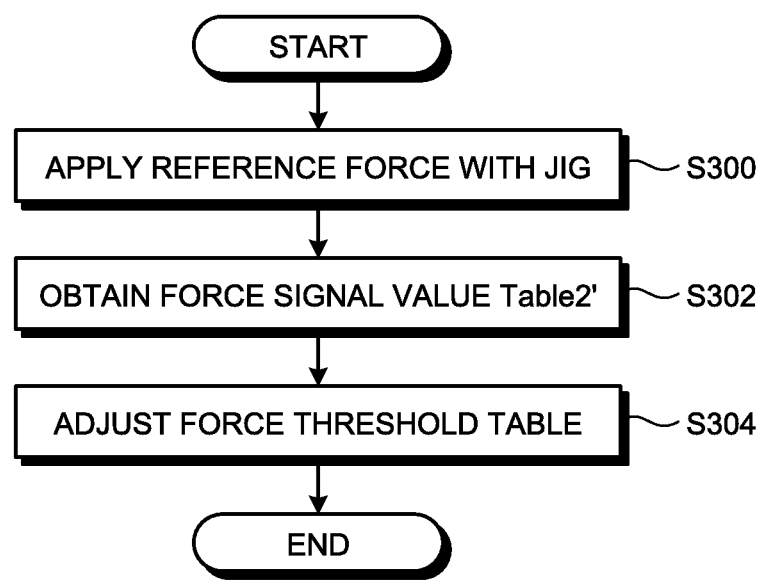
FIG. 52 is a flowchart illustrating processing executed by a force threshold table adjuster of the force detection controller of the display apparatus with a touch detection function according to the first modification.

FIG. 52 is a flowchart illustrating processing executed by a force threshold table adjuster of the force detection controller of the display apparatus with a touch detection function according to the first modification. Processing illustrated in FIG. 52 is executed at a pre-shipment inspection of a display apparatus 1 with a touch detection function.

In Step S300, reference force F2 is applied with a jig.

In Step S302, the force threshold table adjuster 51b obtains a force signal value Table2'. Here, a force signal value $C_{sig}$ output from an A/D converter 43 is the force signal value Table2'.

In Step S304, the force threshold table adjuster 51b executes calculation of the above-described expressions (5) and (6) on the basis of the force signal value Table2', for the entire region of a force detection region Af, to adjust a plurality of force thresholds stored in a force threshold table 52b1 in accordance with an individual display apparatus.

The force detection controller 50A according to the first modification can function without the potential controller 51a and the correlation table storage 52a (see FIG. 46). Therefore, the force detection controller 50A can reduce a circuit scale and can thus decrease cost.

5-2. Second Modification

Figure 53:
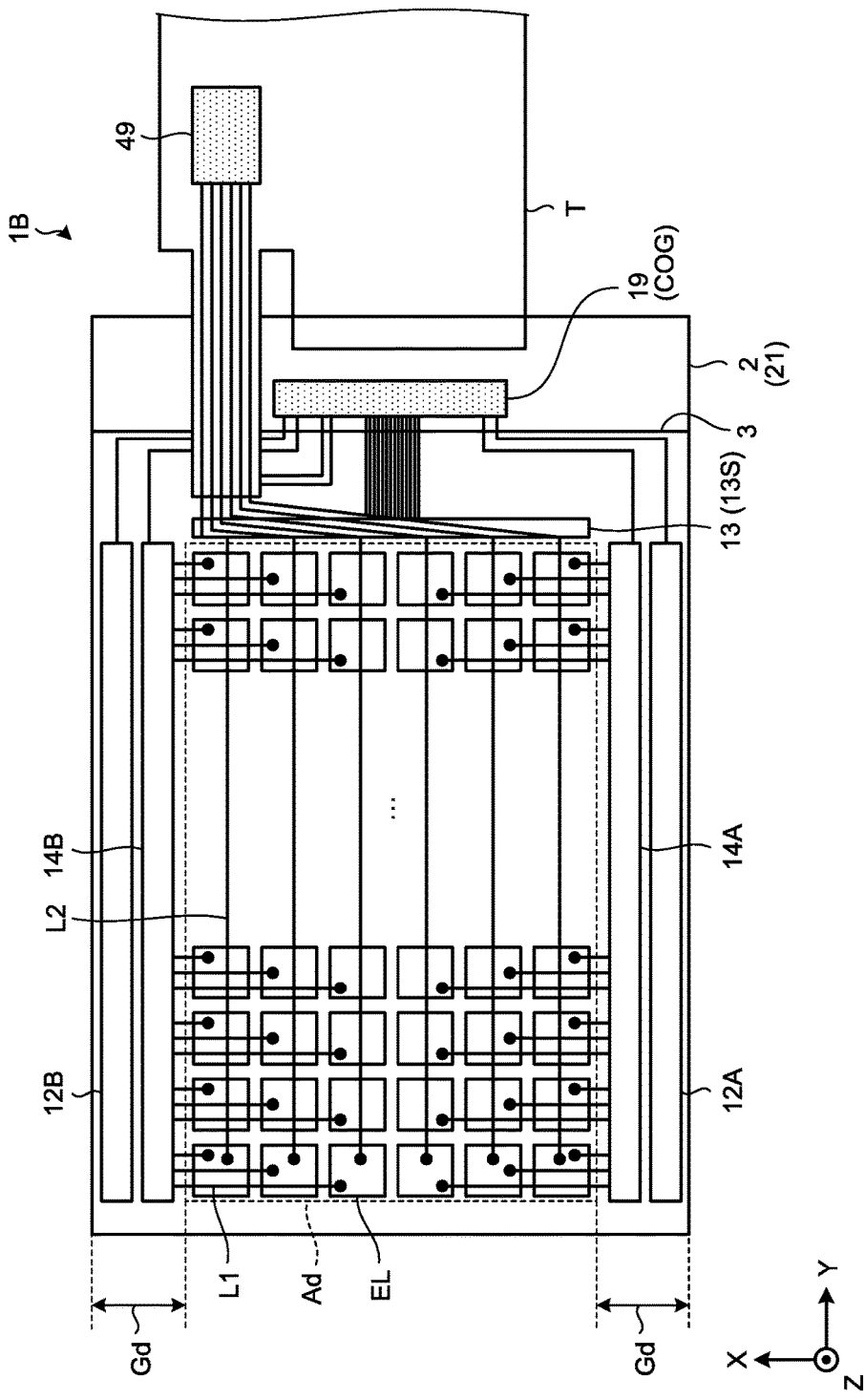
FIG. 53 is a diagram illustrating an example of a module on which a display apparatus with a touch detection function according to a second modification is mounted.

FIG. 53 is a diagram illustrating an example of a module on which a display apparatus with a touch detection function according to a second modification is mounted. In the second modification, the same elements as those in the embodiment are denoted with the same reference signs and, description is appropriately omitted.

A display apparatus 1B with a touch detection function according to the second modification performs touch detection on the basis of a self-capacitive basic principle. In a case of the self-capacitive touch detection, a plurality of electrodes EL provided in a matrix (row-column configuration) may be used as electrodes that function as both the touch detection electrodes TDL and the drive electrodes COML. In this case, the plurality of electrodes EL are coupled with the drive electrode scanners 14A and 14B and the touch detection controller 40 through coupling portions such as wiring L1 and L2. FIG. 53 illustrates only the wiring L2 provided for a part of the electrodes EL. In reality, the wiring L2 or similar coupling portions are individually provided for all the electrodes EL.

In the second modification, the electrode EL is an example of "electrode" of the present invention.

Although the shape and the size of the electrode EL are arbitrary, the size of the electrode EL may correspond to the size of a pixel, for example. In this case, one of electrodes making up the pixel (for example, a pixel electrode 22 or a drive electrode COML as a counter electrode in the pixel of a liquid crystal display apparatus) may be used as the electrode EL. That is, the electrode EL may be used as an electrode provided in each of a plurality of pixels of a display apparatus.

Figure 54:
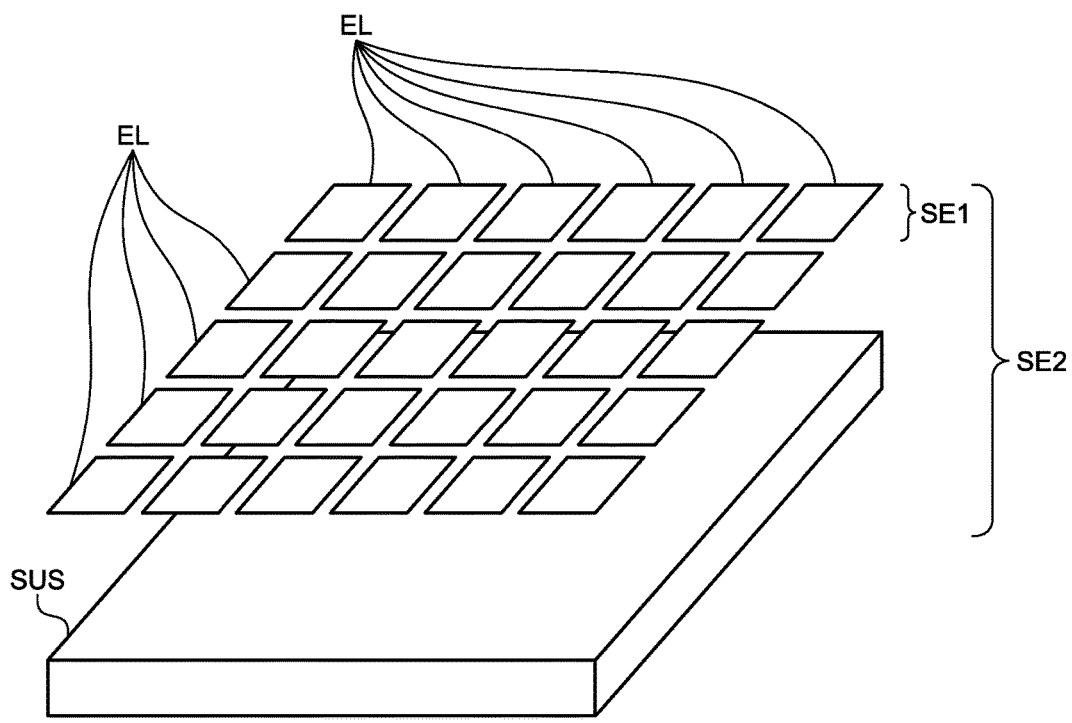
FIG. 54 is a perspective view illustrating electrodes of the display apparatus with a touch detection function according to the second modification.

FIG. 54 is a perspective view illustrating electrodes of the display apparatus with a touch detection function according to the second modification. The plurality of electrodes EL make up the touch detector SE1 of FIG. 1. The plurality of electrodes EL, an intermediate electrode ELC, and an electrode SUS are included in the configuration of a force detector SE2 of FIG. 1.

Favorable embodiments of the present invention have been described. However, the present invention is not limited by these embodiments. The content disclosed in the embodiments is merely an example, and various modifications can be made without departing from the gist of the present invention. The appropriate modifications made without departing from the gist of the present invention obviously belong to the technical scope of the present invention.

For example, in the embodiment, the case in which the air layer AG as the first layer and the cushion layer CUS as the second layer exist between the drive electrode COML and the electrode SUS has been described. However, a third layer may further exist between the drive electrode COML and the electrode SUS. In the case where the third layer exists, the number of inflection points in the graph illustrating the relationship between the force and the force signal value becomes two. Therefore, the storage 52 may just include another force threshold storage table storage, in addition to the force threshold table storage 52b. Further, the storage 52 may just include another third constant table storage, in addition to the first constant table storage 52c and the second constant table storage 52d. Further, the calculator 53 may just include another third force signal value calculator, in addition to the first force signal value calculator 53d and the second force signal value calculator 53e.

What is claimed is:

1. A force detection apparatus comprising:
    a force detector that outputs a force signal value before correction that indicates a force applied to an input surface by an object to be detected; and
    a force detection controller that outputs a force signal value after correction having a linear relationship with the force,
    wherein the force detector includes
        an electrode facing the input surface, and
        a conductor facing the electrode across a first layer and a second layer that are deformable by the force, and
    wherein, in a first range of force in which the first layer is deformed and the second layer is not deformed, the force detection controller calculates the force signal value after correction, based on a product of the force and a predetermined first constant, and
    wherein, in a second range of force in which the first layer and the second layer are deformed, the force detection controller calculates the force signal value after correction, based on a sum of a first product and a second product, the first product being a product of a force threshold indicating a boundary between the first range and the second range and the first constant, and the second product being a product of a difference between the force and the force threshold and a predetermined second constant, wherein the force detection apparatus further comprises:
    a touch detector that detects contact or proximity of the object to be detected with or to the input surface; and
    a touch detection controller that calculates a coordinate with or to which the object to be detected is in contact or in proximity,
    wherein the force detection controller includes:
        a force threshold table storage that stores a force threshold table that stores a plurality of the force thresholds in association with a coordinate of a force detection region;
        a first constant table storage that stores a first constant table that stores a plurality of the first constants in association with the coordinate of the force detection region;
        a second constant table storage that stores a second constant table that stores a plurality of the second constants in association with the coordinate of the force detection region;
        a force threshold reader that reads the force threshold corresponding to the coordinate with or to which the object to be detected is in contact or in proximity, from the force threshold table;
        a force calculator that calculates force based on the force signal value before correction;
        a comparator that compares the force threshold read by the force threshold reader and the force calculated by the force calculator to determine whether the force is equal to or less than the force threshold, or is larger than the force threshold;
        a first force signal value calculator that calculates, when the comparator determines that the force is equal to or less than the force threshold, the force signal value after correction, using the first constant corresponding to the coordinate with or to which the object to be detected is in contact or in proximity; and
        a second force signal value calculator that calculates, when the comparator determines that the force is larger than the force threshold, the force signal value after correction, using the first constant and the second constant corresponding to the coordinate with or to which the object to be detected is in contact or in proximity.

2. The force detection apparatus according to claim 1, wherein the force detection controller further includes:
    a correlation table storage that stores a correlation table that indicates a correlation between capacitance between the electrode and the conductor, and the force signal value before correction;
    a potential controller that controls a potential of the conductor to be a reference potential, or applies a signal having a same phase and a same amplitude as a drive signal to be applied to the electrode, to the conductor; and
    a force threshold table adjuster that
        calculates the capacitance between the electrode and the conductor according to a difference between the force signal value before correction when the potential of the conductor is controlled to be the reference potential, and the force signal value before correction when the signal having the same phase and the same amplitude as the drive signal to be applied to the electrode is applied to the conductor,
        checks the capacitance against the correlation table to acquire a force signal value before correction at a reference force application that is the force signal value before correction when the reference force is applied, and
        adjusts the plurality of force thresholds stored in the force threshold table based on the force signal value before correction at the reference force application.

3. The force detection apparatus according to claim 1, wherein the force detection controller further includes
    a force threshold table adjuster that
        acquires a force signal value before correction at a reference force application that is the force signal value before correction when the reference force is applied with a jig, and adjusts the plurality of force thresholds stored in the force threshold table based on the force signal value before correction at the reference force application.

4. The force detection apparatus according to claim 1, wherein
the first layer is an air layer, and
the second layer is a cushion layer.

* * * * *